United States Patent
Larson

(10) Patent No.: US 9,740,028 B1
(45) Date of Patent: Aug. 22, 2017

(54) OPHTHALMIC COLOR-ENHANCING LENSES AND MATERIALS

(71) Applicant: OptimEyes4u, Inc., Redmond, OR (US)

(72) Inventor: Charles P. Larson, Redmond, OR (US)

(73) Assignee: OptimEyes4u, Inc., Redmond, OR (US)

( * ) Notice: Subject to any disclaimer, the term of this patent is extended or adjusted under 35 U.S.C. 154(b) by 0 days.

(21) Appl. No.: 15/588,087

(22) Filed: May 5, 2017

Related U.S. Application Data

(63) Continuation of application No. 15/515,589, filed as application No. PCT/US2015/047997 on Sep. 1, 2015.

(Continued)

(51) Int. Cl.
   *G02C 7/12* (2006.01)
   *G02C 7/10* (2006.01)

(52) U.S. Cl.
   CPC ............. *G02C 7/104* (2013.01); *G02C 7/12* (2013.01); *G02C 2202/06* (2013.01)

(58) Field of Classification Search
   CPC .......... G02C 7/04; G02C 7/108; G02C 7/107; G02C 7/10; G02C 7/02; G02C 7/024; G02C 7/06; G02C 7/12

(Continued)

(56) References Cited

U.S. PATENT DOCUMENTS

| | | |
|---|---|---|
| 3,300,436 A | 1/1967 | Marks et al. |
| 3,684,641 A | 8/1972 | Murphy |

(Continued)

FOREIGN PATENT DOCUMENTS

| | | |
|---|---|---|
| CA | 2661465 | 5/2015 |
| DE | 19804703 A1 | 10/1999 |

(Continued)

OTHER PUBLICATIONS

Beatty, et al., "The Role of Oxidative Stress in the Pathogenesis of Age-Related Macular Degeneration", "Survey of Ophthalmology", Sep.-Oct. 2000, pp. 115-134, vol. 45, No. 2.

(Continued)

*Primary Examiner* — Hung Dang
(74) *Attorney, Agent, or Firm* — Charles A. Lemaire; Jonathan M. Rixen; Lemaire Patent Law Firm, P.L.L.C.

(57) ABSTRACT

An ophthalmic spectacle lens having transmittance properties that block UV and violet light and partially block certain cyan wavelengths to enhance contrast between blue versus green and partially block certain yellow wavelengths to enhance contrast between green versus red, and keep in accordance with the tristimulus values. Adding wavelength-selective organic dyes provides the entire functional attributes of the current invention or improves the contrast-enhancing attributes provided by a glass wafer having functional rare-earth oxides, either of which improve multi-band spectrum that is balanced in blocking UV light, and adding contrast between the primary colors to optimize color-enhancing functions. When using organic dyes for all functional attributes it is possible to integrate these dyes into plastic ophthalmic materials. Some lenses are polarized. Unlike other color-enhancing sunglass lenses, this invention may help protect the eyes from over-exposure to some high-energy visible blue light, which may lead to age-related macular degeneration (AMD).

20 Claims, 36 Drawing Sheets

Related U.S. Application Data

(60) Provisional application No. 62/146,558, filed on Apr. 13, 2015, provisional application No. 62/105,202, filed on Jan. 19, 2015.

(58) Field of Classification Search
USPC ............... 351/49, 44, 159.6, 159.29, 159.32, 351/159.65, 159.24, 159.27, 159.3
See application file for complete search history.

(56) References Cited

U.S. PATENT DOCUMENTS

| | | | |
|---|---|---|---|
| 3,877,797 | A | 4/1975 | Thornton, Jr. |
| 4,176,299 | A | 11/1979 | Thornton, Jr. |
| 4,334,782 | A | 6/1982 | Thornton, Jr. et al. |
| 4,549,894 | A | 10/1985 | Araujo et al. |
| 4,826,286 | A | 5/1989 | Thornton, Jr. |
| 4,979,976 | A | 12/1990 | Havens et al. |
| 5,646,781 | A | 7/1997 | Johnson, Jr. |
| 5,793,467 | A | 8/1998 | Bailey |
| 6,089,712 | A | 7/2000 | Harris |
| 6,102,539 | A | 8/2000 | Tucker |
| 6,113,811 | A | 9/2000 | Kausch et al. |
| 6,145,984 | A | 11/2000 | Farwig |
| 6,334,680 | B1 | 1/2002 | Larson |
| 6,604,824 | B2 | 8/2003 | Larson |
| 6,773,816 | B2 | 8/2004 | Tsutsumi |
| 7,029,118 | B2 | 4/2006 | Ishak |
| 7,044,599 | B2 | 5/2006 | Kumar et al. |
| 7,066,596 | B2 | 6/2006 | Ishak |
| 7,372,640 | B2 | 5/2008 | Fung |
| 7,506,977 | B1 | 3/2009 | Aiiso |
| 7,520,608 | B2 | 4/2009 | Ishak et al. |
| 7,597,441 | B1 | 10/2009 | Farwig |
| 8,210,678 | B1 | 7/2012 | Farwig |
| 8,403,478 | B2 | 3/2013 | Ishak |
| 8,414,127 | B2 | 4/2013 | Harris |
| 8,733,929 | B2 | 5/2014 | Chiou et al. |
| 8,746,879 | B2 | 6/2014 | Jiang et al. |
| 8,770,749 | B2 | 7/2014 | McCabe et al. |
| 8,916,233 | B2 | 12/2014 | Mosse et al. |
| 9,134,547 | B2 | 9/2015 | McCabe |
| 9,313,482 | B2 | 4/2016 | Lippey et al. |
| 9,370,883 | B2 | 6/2016 | Boinard et al. |
| 9,383,594 | B2 | 7/2016 | McCabe et al. |
| 9,545,304 | B2 * | 1/2017 | Ishak ..................... G02C 7/12 |
| 9,575,335 | B1 | 2/2017 | McCabe et al. |
| 2004/0070726 | A1 | 4/2004 | Ishak |
| 2007/0216861 | A1 | 9/2007 | Ishak et al. |
| 2007/0236809 | A1 | 10/2007 | Lippey et al. |
| 2014/0233105 | A1 | 8/2014 | Schmeder et al. |
| 2016/0041408 | A1 | 2/2016 | Carlson et al. |
| 2016/0048037 | A1 | 2/2016 | McCabe et al. |
| 2016/0070119 | A1 | 3/2016 | McCabe et al. |
| 2017/0068113 | A1 | 3/2017 | McCabe et al. |
| 2017/0102558 | A1 | 4/2017 | Saylor et al. |

FOREIGN PATENT DOCUMENTS

| | | |
|---|---|---|
| DE | 102005052812 A1 | 12/2006 |
| WO | WO 2007075520 | 7/2007 |
| WO | WO 2008024414 | 2/2008 |
| WO | WO 2008067109 | 6/2008 |
| WO | WO2013169987 | 11/2013 |

OTHER PUBLICATIONS

Hunterlab, "CIE L*C*h Color Scale", "Downloaded from internet: http://r.search.yahoo.com/_ylt=A0LEVxNqWuRYewUApHpXNyoA;_ylu=X3oDMTByOHZyb21tBGNvbG8DYmYxBHBvcwMxBHZ0a-WQDBHNIYwNzcg—/RV=2", 2008.

Stockman, et al., "The spectral sensitivities of the middle- and long-wavelength-sensitive cones derived from measurements in observers of known genotype", "Vision Research", Jun. 16, 2000, pp. 1711-1737, vol. 40, No. 13.

Thornton, "Luminosity and Color-Rendering Capability of White Light", "Journal of the Optical Society of America", Sep. 1971, pp. 1155-1163, vol. 619.

Thornton, "Color-Discrimination Index", "Journal of the Optical Society of America", Feb. 1972, pp. 191-194, vol. 62, No. 2.

Thornton, "Three-Color Visual Response", "Journal of the Optical Society of America", Mar. 1972, pp. 457-459, vol. 62, No. 3.

X-Rite, Incorporated, "A Guide to Understanding Color Communication", "http://www.xrite.com/-/media/xrite/files/whitepaper_pdfs/I10-001_a_guide_to_understanding_color_communication/I10-001_understand_color_en.pdf", 2007, Publisher: Downloaded from internet web-address.

* cited by examiner

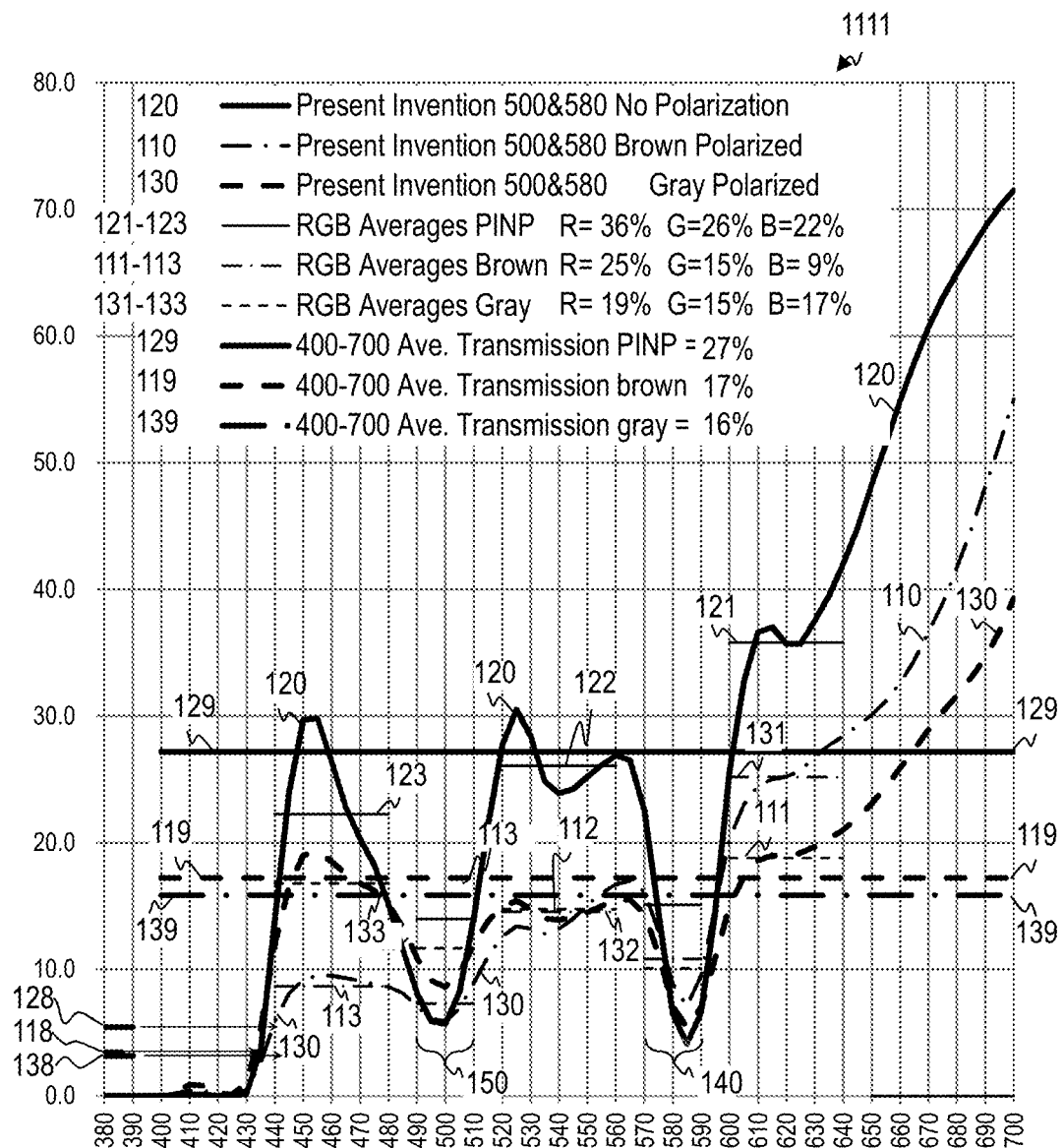
*FIG. 1A1*

*FIG. 1A2*
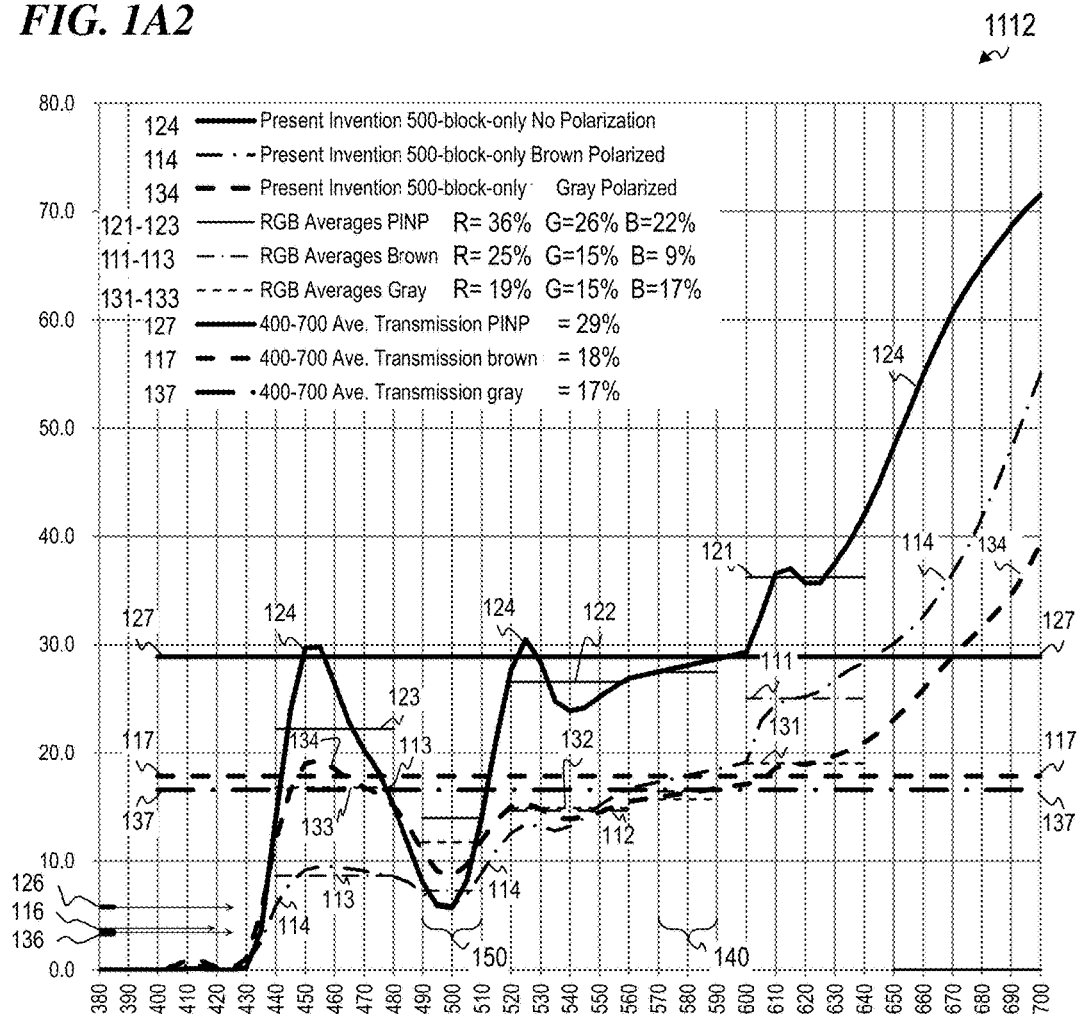
*FIG. 1A3*    *FIG. 1A4*    *FIG. 1A5*
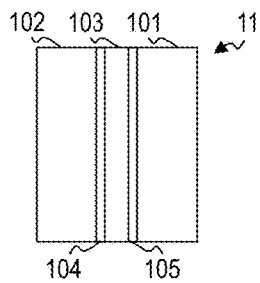
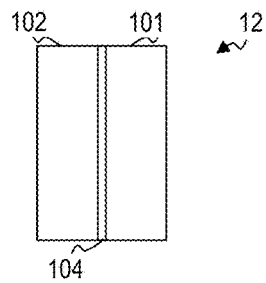
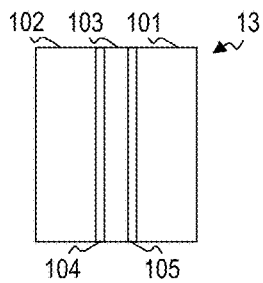

*FIG. 1C1*
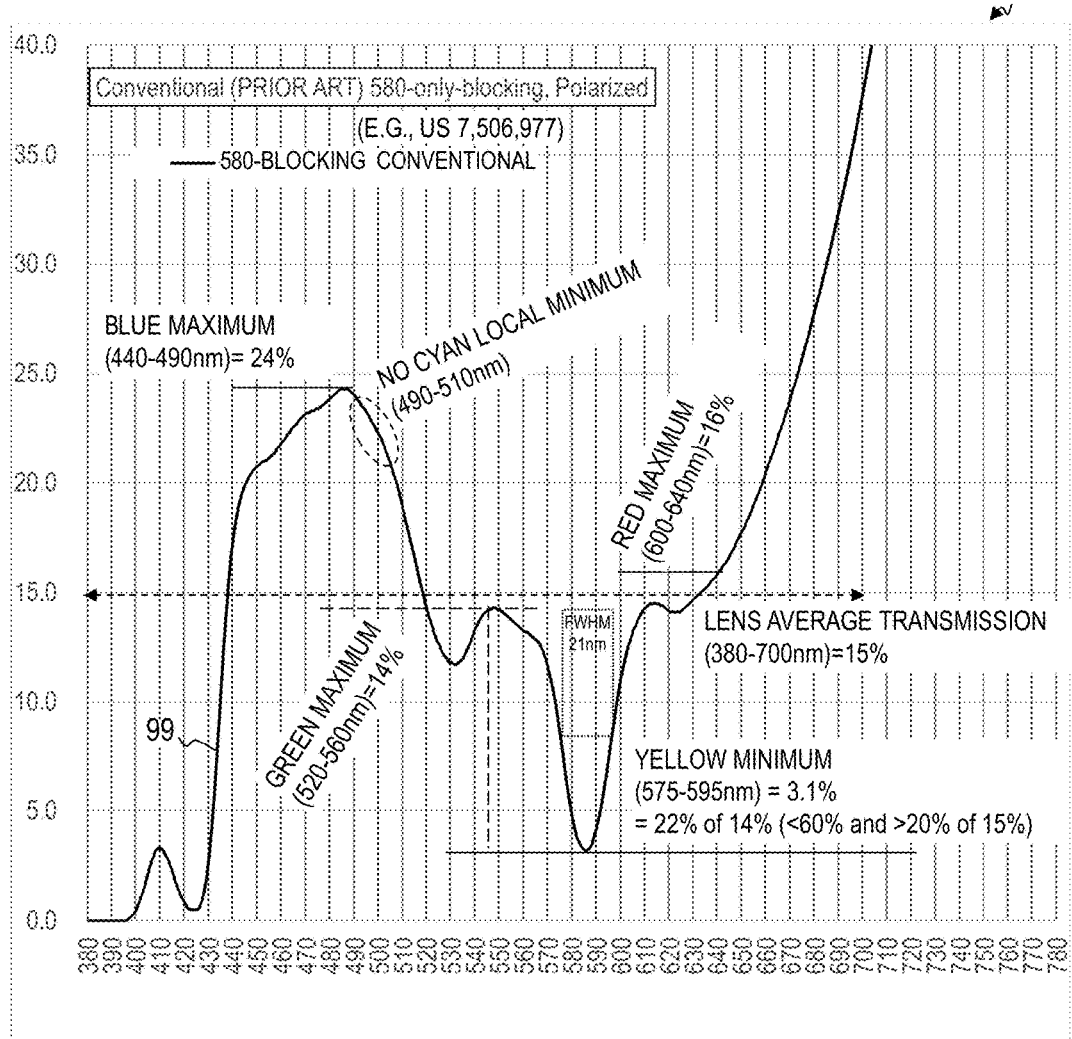

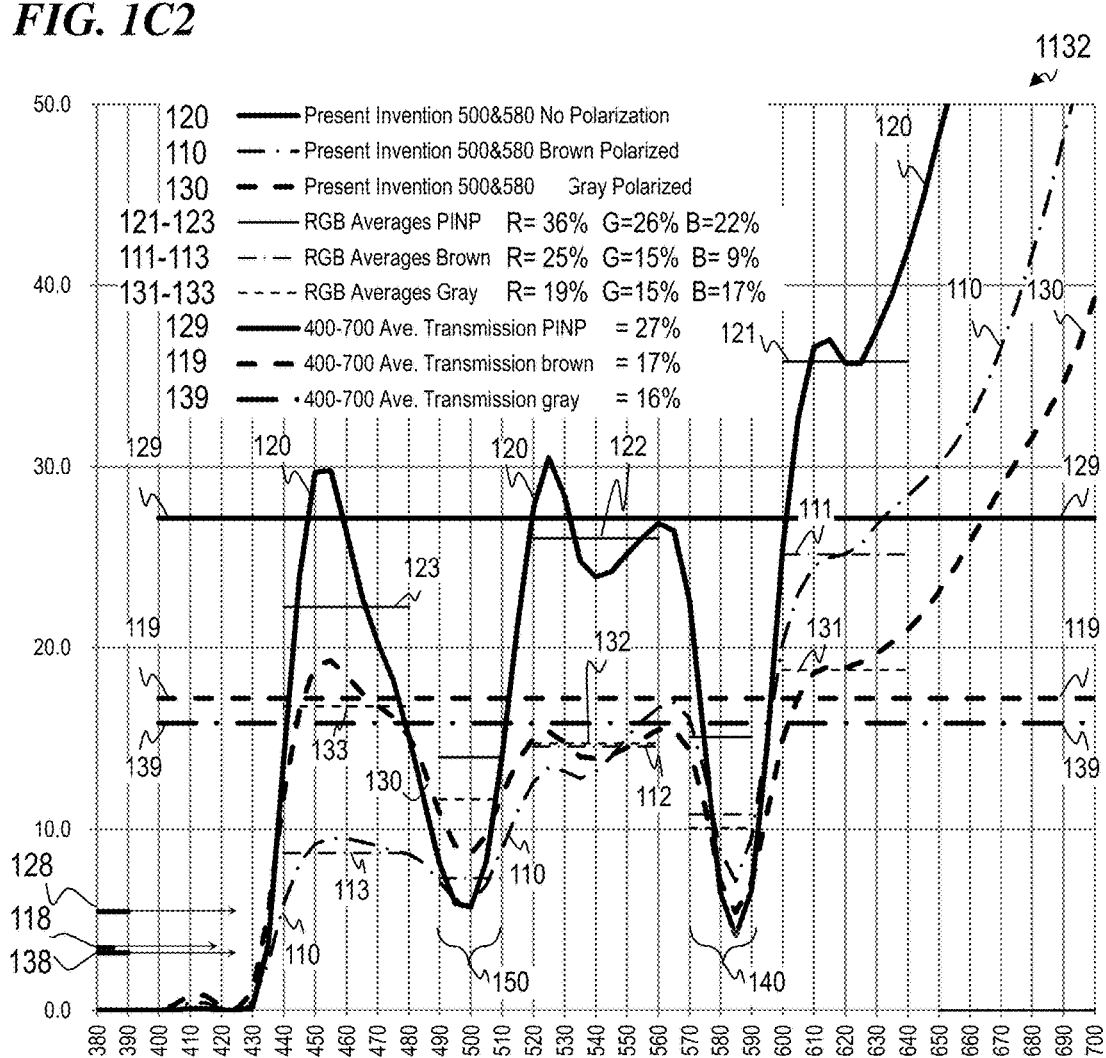

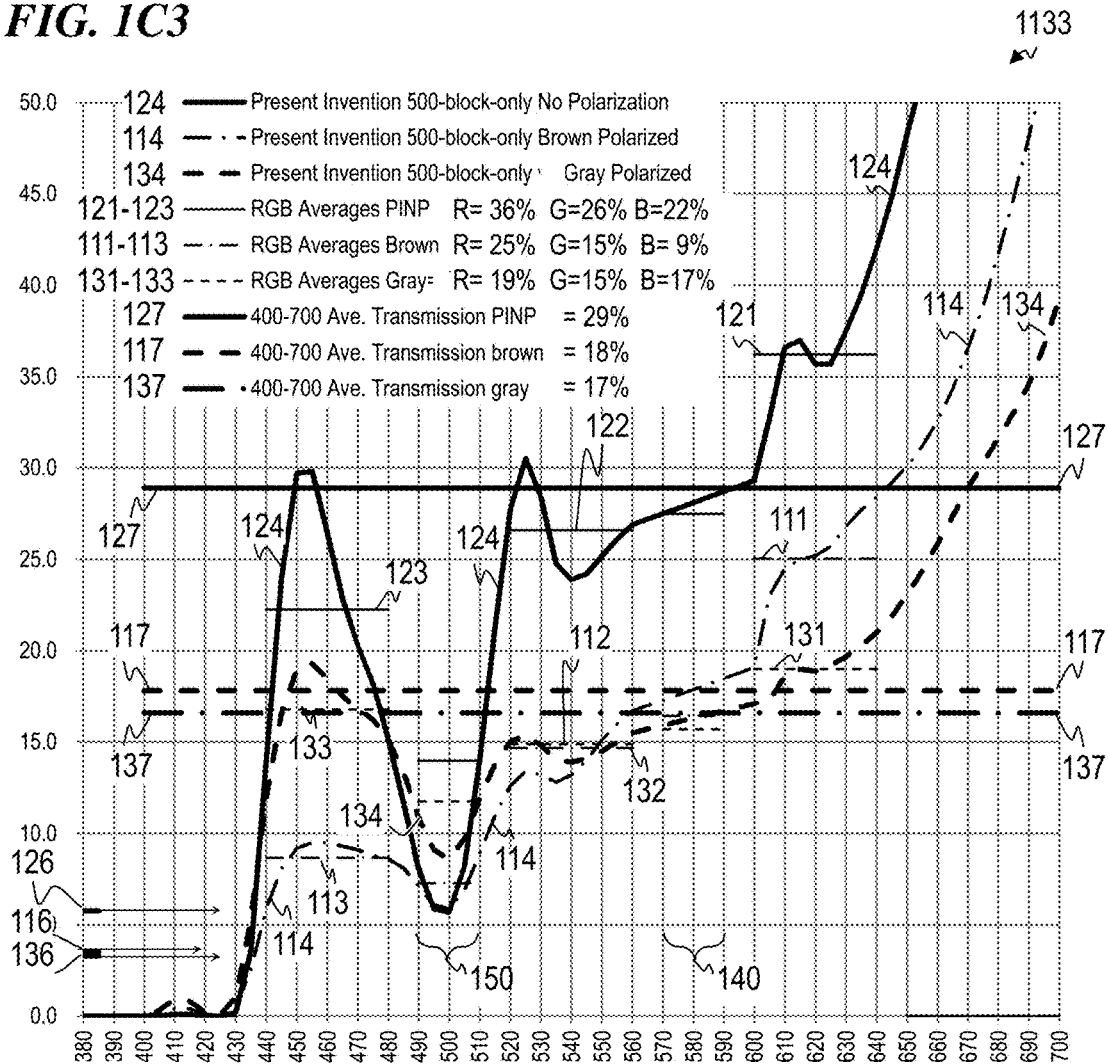
FIG. 1C3

*FIG. 1D1*
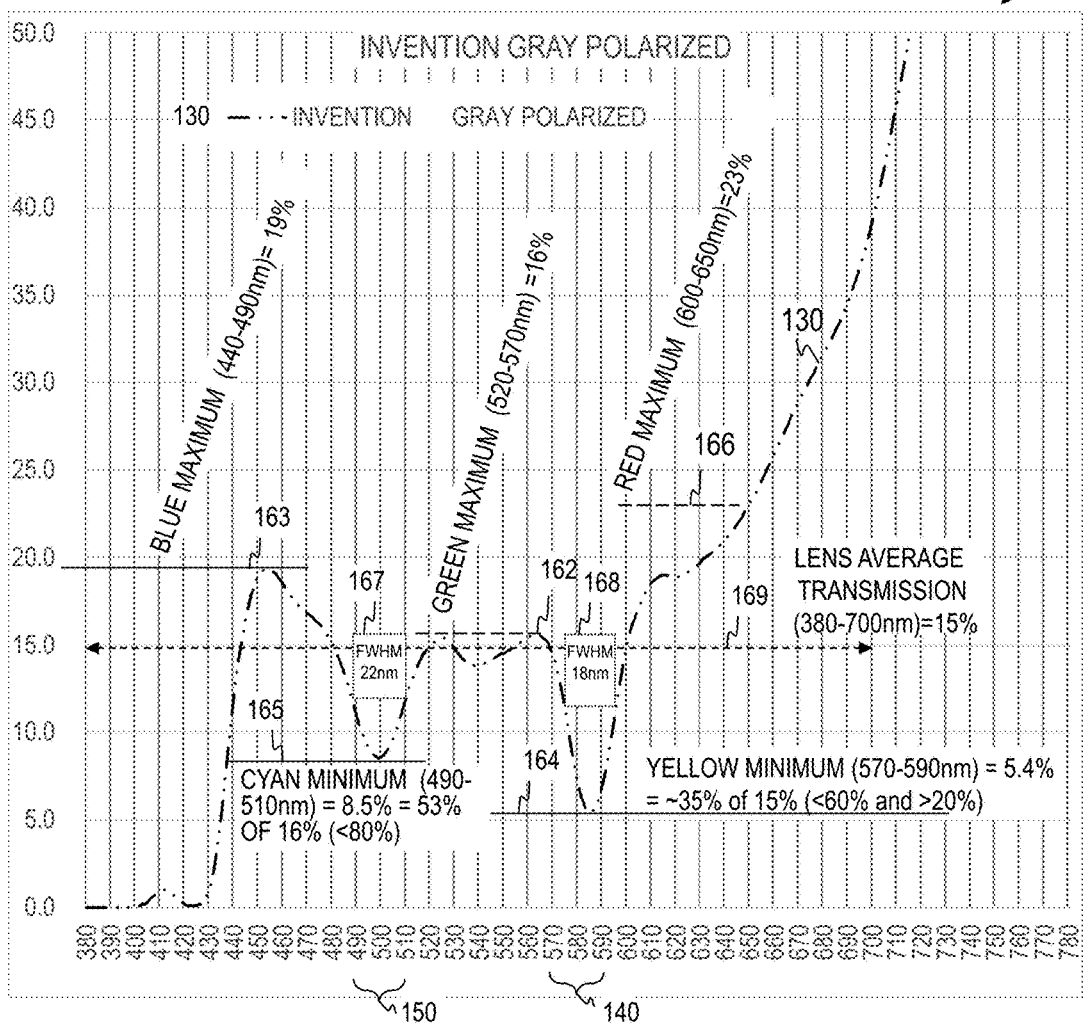

*FIG. 1D2*
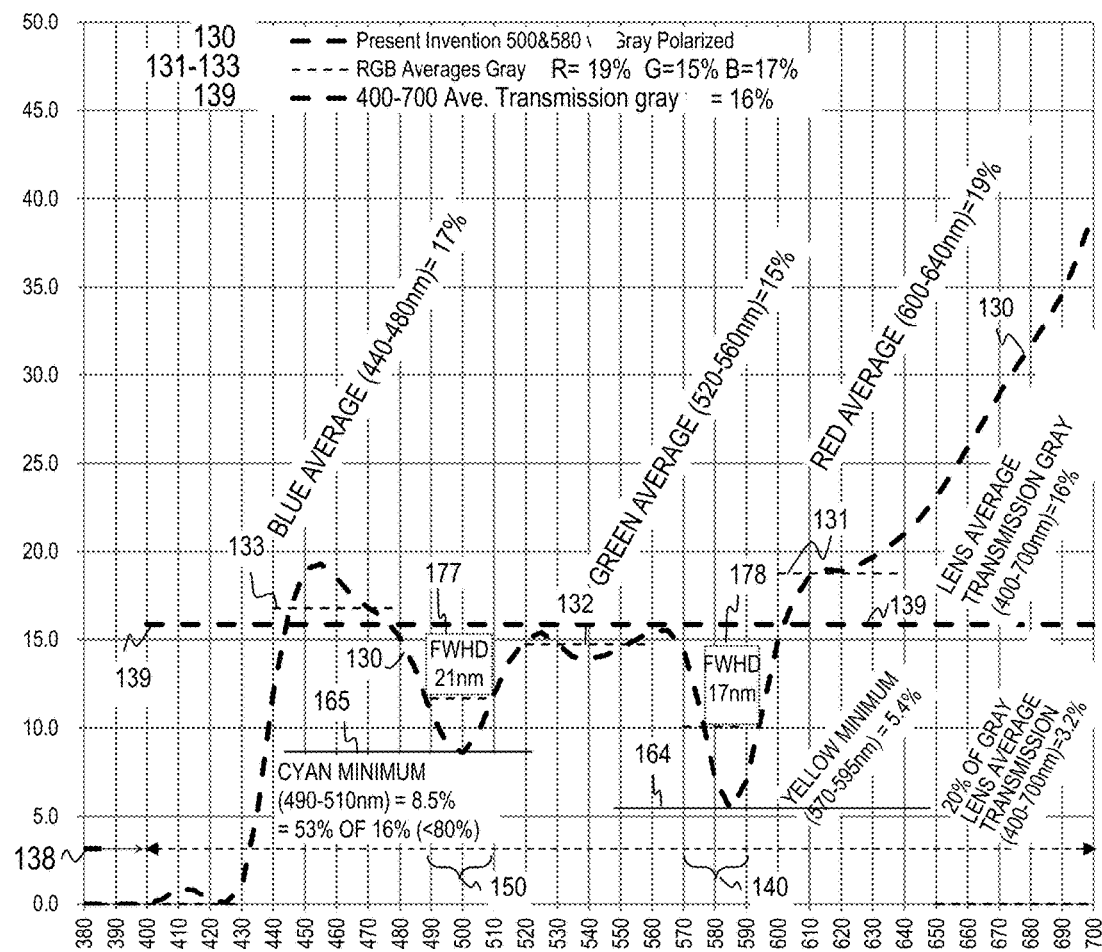

*FIG. 1D3*
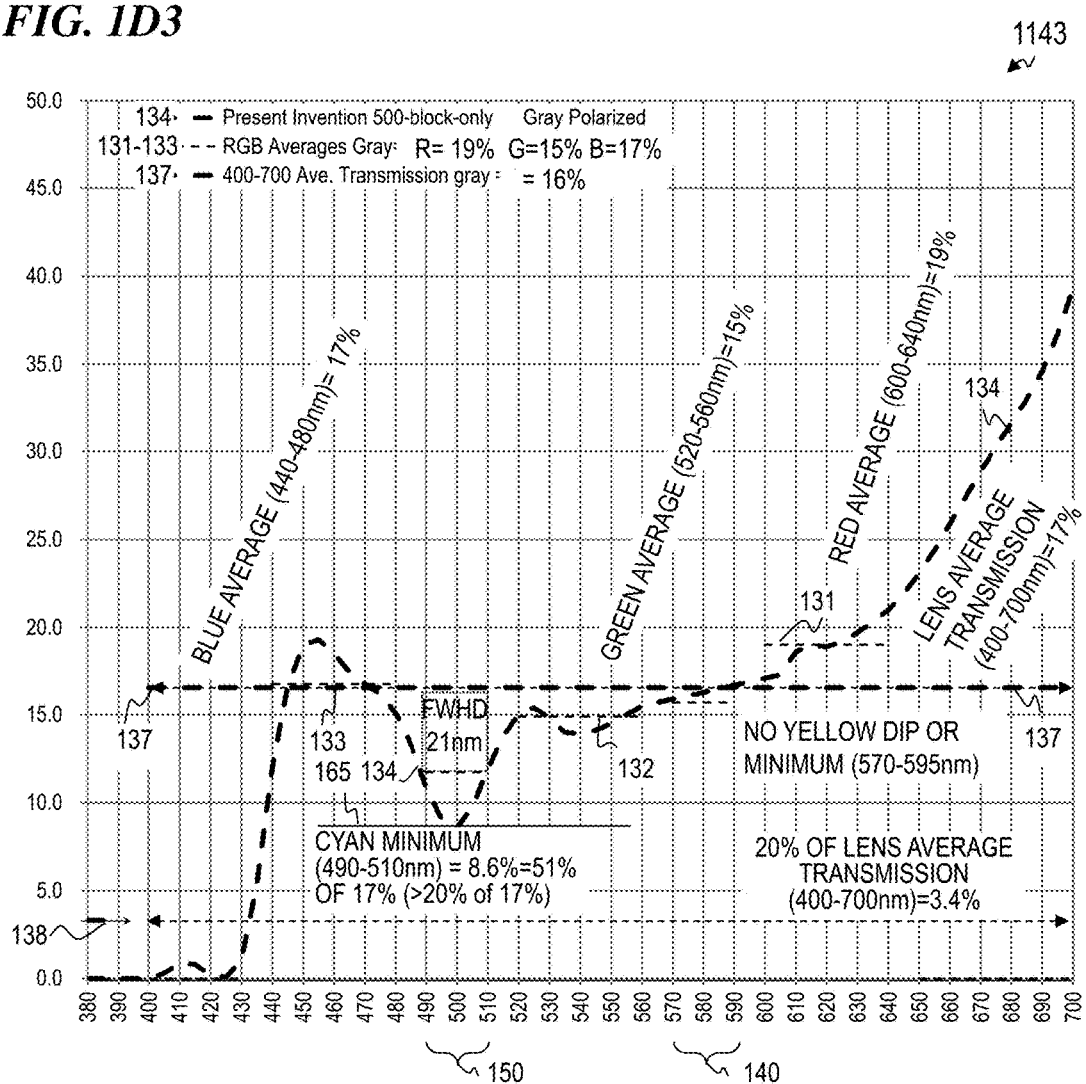

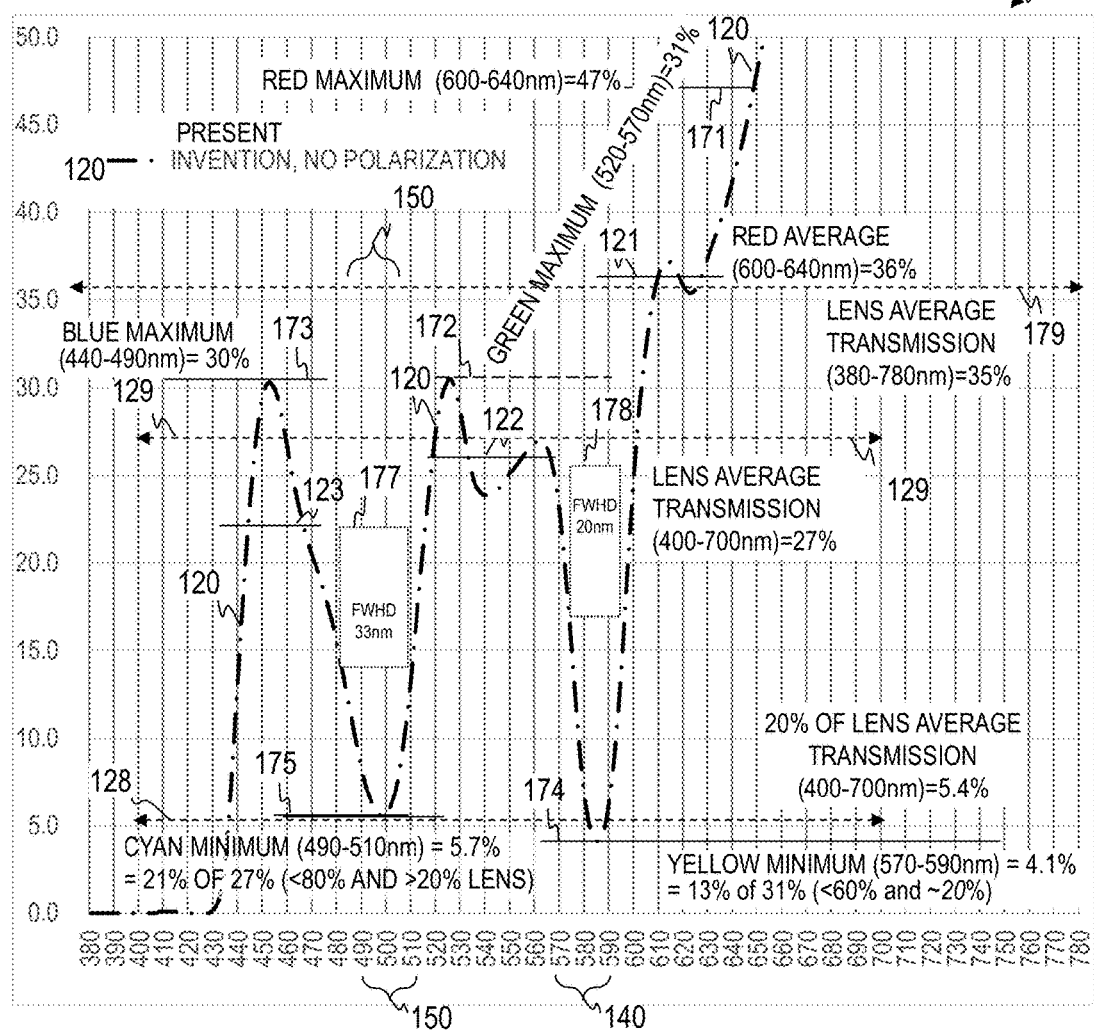
FIG. 1E1

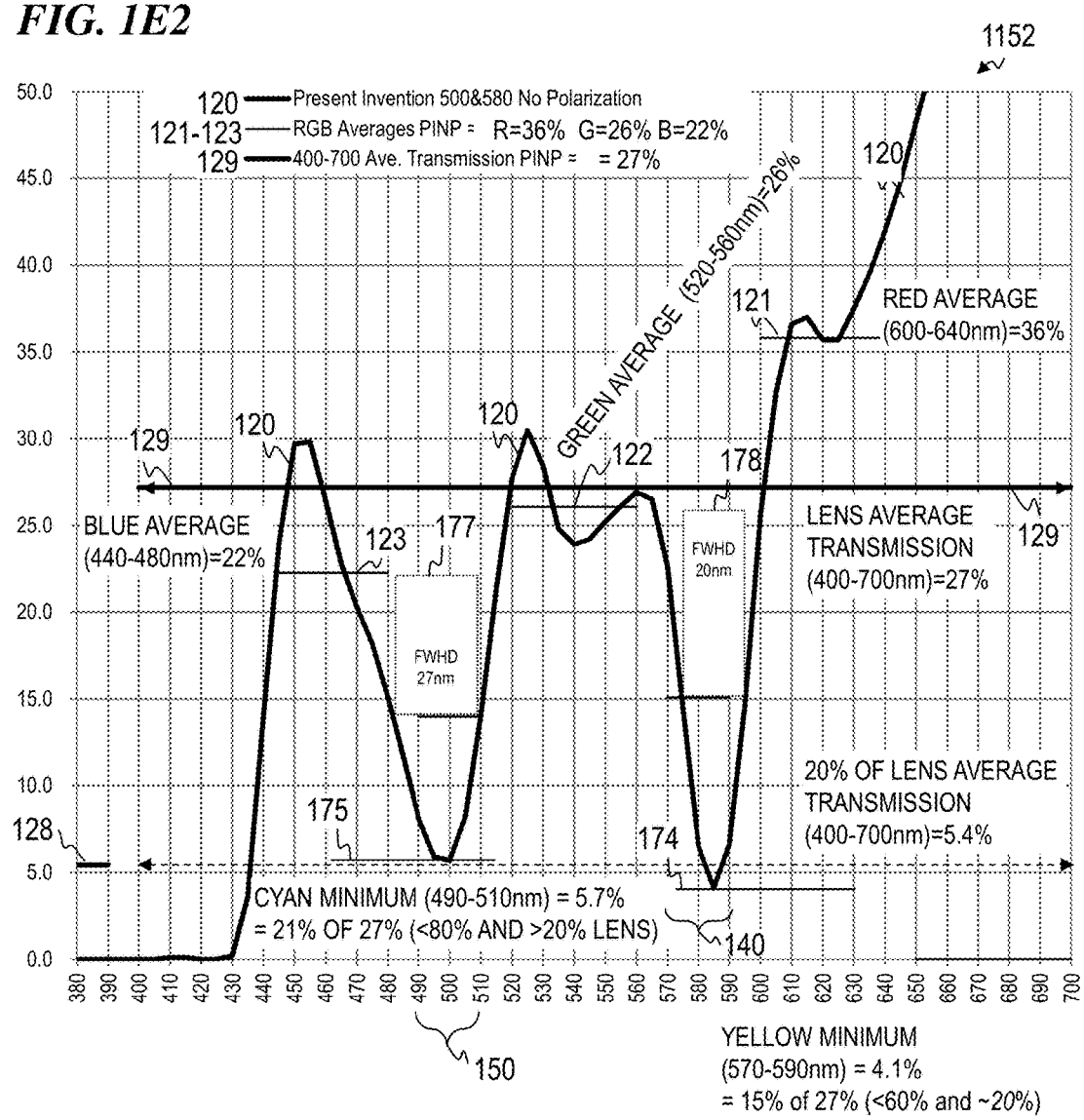
FIG. 1E2

FIG. 1E3
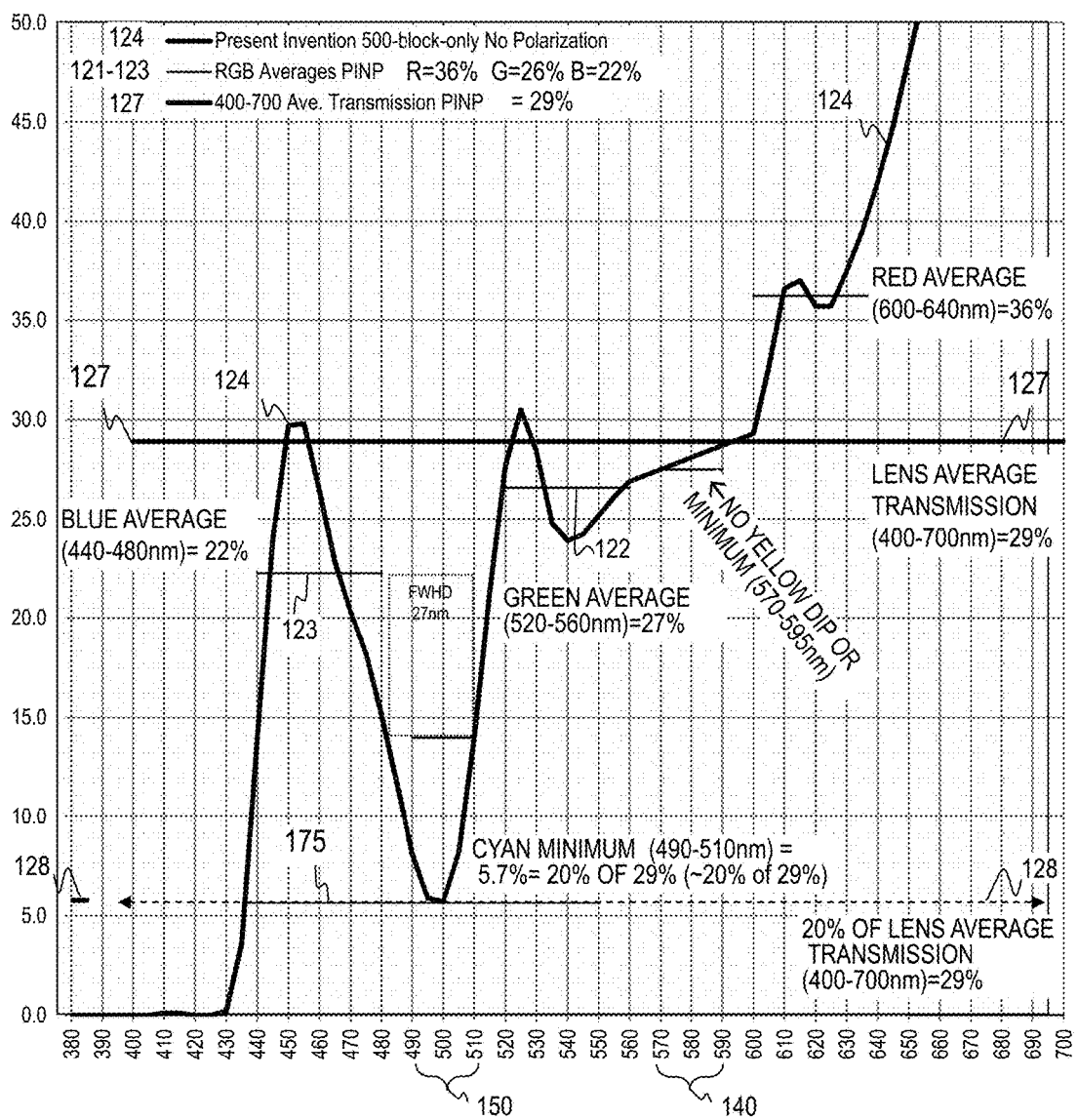

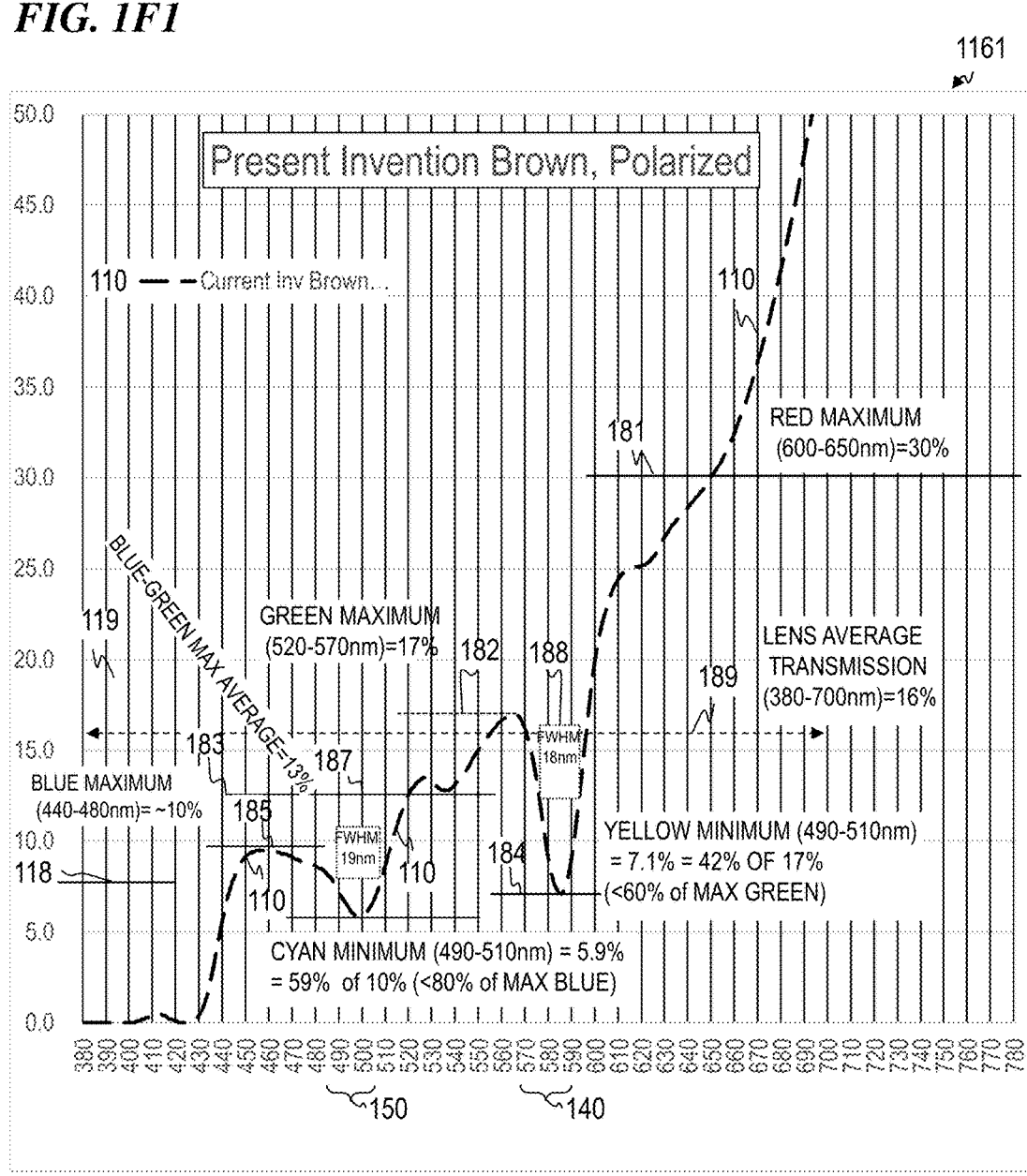
FIG. 1F1

*FIG. 1F2*
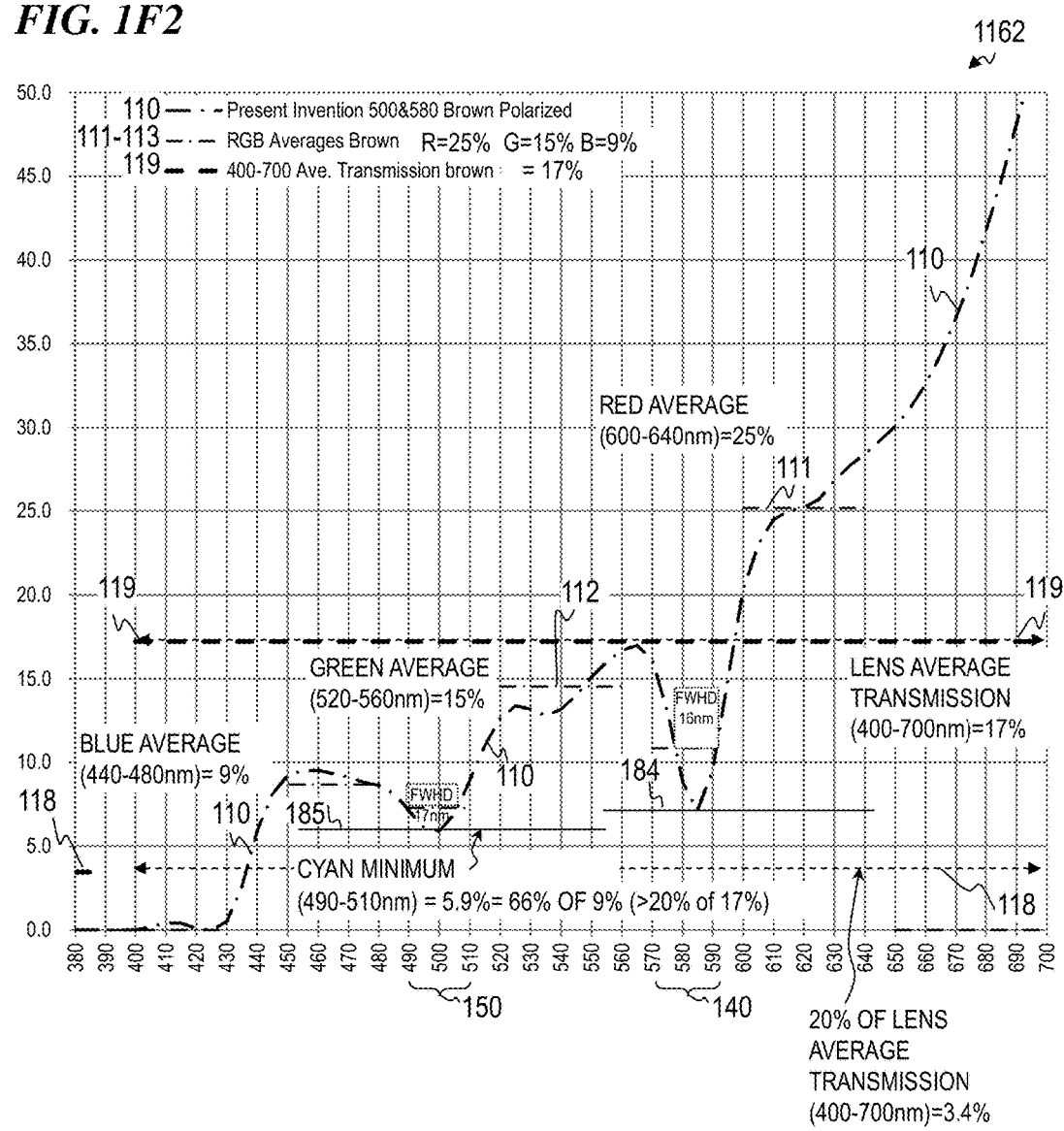

*FIG. 1F3*
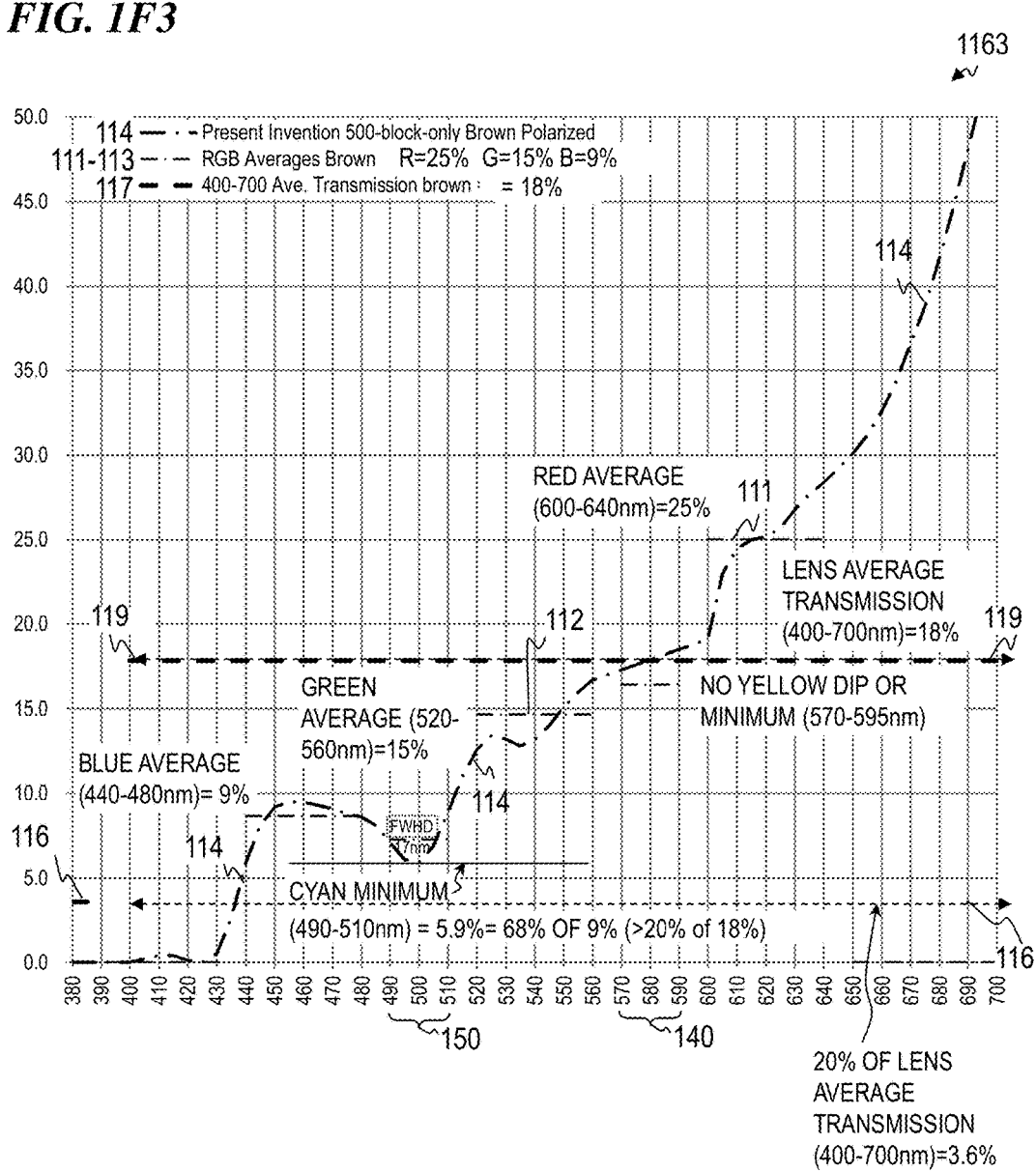

OPHTHALMIC COLOR-ENHANCING LENSES AND MATERIALS

CROSS-REFERENCE TO RELATED APPLICATIONS

This application is a continuation of U.S. patent application Ser. No. 15/515,589, filed Mar. 29, 2017 by Charles P. Larson and titled "Ophthalmic spectacle lenses, materials and method," which is a national-stage entry of PCT Application No. PCT/US2015/047997, filed Sep. 1, 2015 by Charles P. Larson and titled "Ophthalmic spectacle lenses, materials and method," which claims priority benefit, including under 35 U.S.C. §119(e), of U.S. Provisional Patent Application No. 62/105,202, filed Jan. 19, 2015 by Charles P. Larson, titled "Apparatus and method for ophthalmic spectacle lenses," and U.S. Provisional Patent Application No. 62/146,558, filed Apr. 13, 2015 by Charles P. Larson, titled "Apparatus and method for ophthalmic spectacle lenses," each of which is incorporated herein by reference in its entirety.

FIELD OF THE INVENTION

The present invention relates to methods and devices for ophthalmic spectacle lenses, and in particular to lens system that reduces transmission of wavelengths around 500 nm, optionally including one or more wavelength-selective light-absorbing species within an adhesive layer of multi-layer-lens versions, optionally with, and optionally without, significant additional reduction of transmission of wavelengths around 580 nm, and optionally including a polarizing filter layer, wherein the lens system optimizes light transmittance and absorbance characteristics of the tri-stimulus values.

BACKGROUND OF THE INVENTION

High-quality sunglasses enhance certain wavelengths of light and block other wavelengths. A number of U.S. patents attempt to achieve improved sunglasses and/or enhanced perception of color in various ways, including the following U.S. patents.

Each of the patents and patent application publications referred to in this specification and its accompanying Figures is incorporated herein by reference in its entirety for all purposes.

U.S. Pat. No. 3,300,436 to Marks et al. issued Jan. 24, 1967 with the title "CASTING COMPOSITION FOR LIGHT POLARIZING FILM". U.S. Pat. No. 3,300,436 describes casting compositions initially forming an amorphous polymer-complex which are transformable upon extension into a continuous crystalline film capable of strongly polarizing transmitted light.

U.S. Pat. No. 4,549,894 to Araujo, et al. issued on Oct. 29, 1985 with the title "Ultraviolet absorbing photochromic glass of low silver content". U.S. Pat. No. 4,549,894 describes a method of producing a photochromic glass having a reduced transmittance for ultraviolet radiation while having substantially unimpaired photochromic properties. The method comprises providing a combination of 0.1-1.0% $CeO_2$ and 0.1-1.5% $Sb_2O_3$ and/or $As_2O_3$ as part of the glass composition. In an embodiment utilizing minimal silver content, the glass article in thicknesses of 1.3 to 2.0 mm can be chemically strengthened to surpass the impact specification imposed by the Federal Food and Drug Administration for eyewear, will transmit less than 0.2% of radiation having wavelengths between 290 nm-315 nm, and will demonstrate a darkened luminous transmittance at 20°-25° C. below 35% and a fading rate such that after five minutes the luminous transmittance will be at least 1.75 times that of the darkened transmittance.

U.S. Pat. No. 4,979,976 to Havens, et al. issued Dec. 25, 1990 with the title "Making colored photochromic glasses". U.S. Pat. No. 4,979,976 describes a method for making tinted photochromic glass articles having an integral reduced surface layer exhibiting color, the glass utilizing silver halide crystals as the photochromic agent. The method generally comprises heat treating the glass article in a heating chamber in an atmosphere of flowing hydrogen at temperatures below 500° C. The specific steps of the inventive method comprise: (a) initially flowing hydrogen gas into said heat treating chamber at a sufficiently rapid rate to essentially instantaneously fill said chamber with the gas; (b) immediately thereafter decreasing the flow of said the hydrogen gas to permit careful control of the rate at which reduction takes place in the glass surface; and (c) continuing that gas flow for a sufficient length of time to produce an integral reduced surface layer on both front and back surfaces of the article having a combined depth effective to exhibit a color, but not of such individual depth as to prevent the passage of ultraviolet radiation through the front surface of the article.

U.S. Pat. No. 5,646,781 issued Jul. 8, 1997 to Robert L. Johnson, Jr. with the title "Optical filters for forming enhanced images". U.S. Pat. No. 5,646,781 describes an optical filter for providing an enhanced image. The filter may comprise at least one substrate, layers of a low refractive index material and layers of a high refractive index material. The layers are stacked so that the filter blocks passbands at 490 nm and 590 nm as well as other image-confusing radiation. Light which is transmitted by the filter provides an enhanced image for viewing by the human eye as well as nonhuman detectors.

U.S. Pat. No. 6,113,811 to Kausch, et al. issued on Sep. 5, 2000 with the title "Dichroic polarizing film and optical polarizer containing the film". U.S. Pat. No. 6,113,811 describes a dichroic polarizing film made, for example, by first combining polyvinyl alcohol and a second polymer, such as, polyvinyl pyrrolidone or a sulfonated polyester, in a solvent. The ratio of polyvinyl alcohol to second polymer is between about 5:1 to 100:1 by weight. The film is coated on a substrate, dried, and then stretched to orient at least a portion of the film. The film incorporates a dichroic dye material, such as iodine, to form a dichroic polarizer. This polarizer may be used in conjunction with a multilayer optical film, such as a reflective polarizer, to form an optical polarizer. The multilayer optical film may contain two or more sets of polyester films, where at least one of the sets is birefringent and orientable by stretching. The polyvinyl alcohol/second polymer film and the multilayer optical film may be simultaneously stretched to orient both polymer films.

U.S. Pat. No. 6,145,984 to Farwig issued Nov. 14, 2000 with the title "Color-enhancing polarized lens". U.S. Pat. No. 6,145,984 describes a color-enhancing polarized lens is constructed having substantially trichroic spectral-transmission. A lens so constructed may have an overall transmitted tint which is a virtually colorless gray to the eye. A lens so constructed and tint-neutralized delivers unexpectedly dramatic improvements in the areas of color saturation, chromatic and luminous contrast, clarity of detail, depth perception, haze penetration, and overall impact.

U.S. Pat. No. 6,334,680 issued to Larson (the inventor of the present invention) on Jan. 1, 2002 with the title "Polarized lens with oxide additive". U.S. Pat. No. 6,334,680 describes lens for reducing glare and improving color discrimination includes a lens wafer containing a rare-earth oxide such as neodymium that provides relatively high light transmittancy at 450 nm, 540 nm, and 610 nm, and relatively low light transmittancy at 500 nm and at 580 nm. A polarized filter is included to reduce glare, and an anti-reflective layer minimizes ghost images, haze, and loss of contrast.

U.S. Pat. No. 6,604,824 to Larson (the inventor of the present invention) issued Aug. 12, 2003 with the title "Polarized lens with oxide additive". U.S. Pat. No. 6,604,824 describes a lens for reducing glare and improving color discrimination includes a lens wafer containing a rare earth oxide such as neodymium that provides progressively higher transmittance at 540 nm than at 500 nm and at 450 nm, and average transmittance at 540 nm and 610 nm that is greater than the transmittance at 580 nm. An ultra-violet absorber, a polarized filter and anti-reflective layer may be included to reduce UV light, glare and improve contrast and vision.

U.S. Pat. No. 6,773,816 to Tsutsumi issued Aug. 10, 2004 with the title "Driving glasses". U.S. Pat. No. 6,773,816 describes driving glasses in which a thermic ray reflection layer made of a metal or an organic substance is provided on the outer surface of a glass matrix, and an anti-reflection layer 3 is provided on the inner surface thereof, wherein the glass matrix contains neodymium oxide $Nd_2O_3$ through 12% by weight and praseodymium oxide $Pr_6O_{11}$ of 0.5 through 8% by weight, and forms an absorption peak of light transmittance at a wavelength of 510 nm through 540 nm and a wavelength of 570 nm through 590 nm.

U.S. Pat. No. 7,029,118 to Ishak issued on Apr. 18, 2006 with the title "Waterman's sunglass lens". U.S. Pat. No. 7,029,118 describes an improved ten-layer performance polarized lens for sunglasses. The lens design maximizes visual acuity while minimizing blue-light transmission using a multi-layer dielectric mirror to reduces glare and overall light transmission, two layers of high-contrast blue-blocking amber CR-39 plastic or polycarbonate, sandwiching a polarizing layer. An outer hydrophobic overcoat is also provided to protect against haze, delamination, and smudging. The foregoing layers are arranged to provide a balanced light transmission profile optimum for use on the water in which 100% of UV-A & B light is absorbed to at least 400 nm. The resulting dielectric-mirrored sunglass lens reduces both overall light transmission and ocular photochemical damage.

U.S. Pat. No. 7,044,599 to Kumar, et al. issued May 16, 2006 with the title "Polarizing devices and methods of making the same". U.S. Pat. No. 7,044,599 describes ophthalmic elements and devices comprising an at least partial coating adapted to polarize at least transmitted radiation on at least a portion of at least one exterior surface of an ophthalmic element or substrate. Further, according to certain non-limiting embodiments, the at least partial coating adapted to polarize at least transmitted radiation comprises at least one at least partially aligned dichroic material. Other non-limiting embodiments of the disclosure provide methods of making ophthalmic elements and devices comprising forming an at least partial coating adapted to polarize at least transmitted radiation on at least a portion of at least one exterior surface of the ophthalmic element or substrate. Optical elements and devices and method of making the same are also disclosed.

U.S. Pat. No. 7,372,640 to Fung issued May 13, 2008 with the title "Enhanced color contrast". U.S. Pat. No. 7,372,640 describes a color contrast enhancing lens made from adhering two different lenses and a membrane together. It includes a color enhancing lens whose specific component will selectively absorb the yellow light in the visible spectrum, which enhances the user vision by enhancing the distinction between red and green. It also includes an ultraviolet blocking lens whose special compounds will absorb the majority of violet light and a part of blue light. It also includes a light polarization membrane whose special structure can reduce strong light. It can also absorb the majority of violet light and keep a low transmission rate of blue light, thus reduced the retina injury caused by overexposure to blue light. It can also block the invisible ultraviolet and reduce strong light. So while the users' eyes are protected, they can also enjoy their view.

U.S. Pat. No. 7,506,977 to Aiiso issued Mar. 24, 2009 with the title "Plastic spectacles lens". U.S. Pat. No. 7,506,977 describes plastic spectacles lens containing an organic dye instead of a neodymium compound and having an optical transmission equivalent to a plastic spectacles lens containing a neodymium compound is provided. The plastic spectacles lens comprises a plastic lens wafer formed from a thermosetting or thermoplastic resin, or the plastic lens wafer and one, or two or more component layers formed on at least one side of the plastic lens wafer, and an organic dye satisfying the specific conditions.

U.S. Pat. No. 7,597,441 to Farwig issued on Oct. 6, 2009 with the title "Polarized contrast enhancing sunglass lens". U.S. Pat. No. 7,597,441 describes a polarized sunglass lens that utilizes a multiband contrast enhancer comprised of three rare-earth oxides to provide relatively high peak transmittance in portions of the red and green spectrum, relatively lower transmittance for the blue spectrum, and very low transmittance for the UV spectrum. The lens provides enhanced perception of colors, heightened contrast, and improved visual acuity. The inclusion of vanadium pentoxide in the lens provides attenuation of the UV spectrum, thus protecting the user's eyes and the internal layers and colorants from UV-induced damage. The front lens element can be either the multiband contrast enhancer or a photochromic lens element.

U.S. Pat. No. 8,210,678 to Farwig issued Jul. 3, 2012 with the title "Multiband contrast-enhancing light filter and polarized sunglass lens comprising same". U.S. Pat. No. 8,210,678 describes a polarized sunglass lens that comprises a multiband contrast enhancer to provide relatively high light transmittance for portions of the red, green, and blue spectra, while blocking UV and visible violet wavelengths, and optionally blocking deep-red wavelengths, in a single lens layer which when positioned as the front lens layer also protects the internal lens layers from UV-induced degradation. The multiband contrast enhancer comprises a combination of a copper halide or copper indium compound with rare-earth oxides in a heat-treated glass composition, or a combination of narrowband and sharp-cut absorbing dyes in a plastic composition, and provides attenuation of the UV and violet spectrum, thus protecting the user's eyes and the internal layers and colorants from UV-induced damage while providing enhanced optical contrast, color saturation, and visual acuity for the wearer.

U.S. Pat. No. 8,733,929 to Chiou et al. (hereinafter, "Chiou et al.") titled "Color contrast enhancing sunglass lens", issued May 27, 2014. Chiou et al. describe a color contrast enhancing sunglass lens that includes a lens body and a multi-layer coating disposed on the lens body. The multi-layer coating includes a set of alternating layers formed of materials having different refractive indices and confines the transmission of visible light to a predetermined spectral profile having at least three high transmission bands that include blue, green and red bands and that have a maximum of spectral transmittance no less than 60%, three low transmission bands that include purple, cyan and yellow bands and that have a minimum of spectral transmittance no greater than 40%, and no spectral transmittance being less than 15% between 475 nm and 650 nm. The thicknesses of the layers in the multiple-layer lens coatings determine which wavelengths are reflected and which wavelengths are passed. The color contrast enhancing sunglass lens as disclosed meets the ANSI specification Z80.3-2009 section 4.6.3.3.

U.S. Pat. No. 8,770,749 to McCabe, et al. issued Jul. 8, 2014 with the title "Eyewear with chroma enhancement". U.S. Pat. No. 8,770,749 describes a lens including a lens body and an optical filter configured to attenuate visible light in a plurality of spectral bands. Each of the plurality of spectral bands can include an absorptance peak with a spectral bandwidth, a maximum absorptance, and an integrated absorptance peak area within the spectral bandwidth. An attenuation factor obtained by dividing the integrated absorptance peak area within the spectral bandwidth by the spectral bandwidth of the absorptance peak can be greater than or equal to about 0.8 for the absorptance peak in each of the plurality of spectral bands.

German patent application number DE 102005052812 A1 by Asmus was published Dec. 28, 2006 with the title "Getönte UV-Haftfolie für optische Brillenglaser" (roughly, "Tinted UV-adhesive-film for optical lenses"). This application describes a self-adhesive tinted UV-blocking tinted film that provides UV-protection against glaring light, e.g., of sun and snow, in the anti-glaring category 3, that is, having 8- to 18-percent transmission. The film is made up of PVC (polyvinylchloride) of thickness 0.1 mm coated with an adhesive.

U.S. Pat. No. 3,684,641 to Murphy issued Aug. 15, 1972 with the title "LAMINATED PRODUCT BONDED WITH COLORED ADHESIVE". U.S. Pat. No. 3,684,641 describes multi-ply creped tissue paper containing printing between the plies of tissue to create a pattern of muted and aesthetically pleasing coloration visible on the exterior surface of the plies and the method of making the product which involves the use of water-based adhesives as the printing media. Such a product is unsuited for making ophthalmic spectacle lenses.

U.S. Pat. No. 8,746,879 to Jiang et al issued Jun. 10, 2014 with the title "Adhesive system for a laminated lens and method for applying same". U.S. Pat. No. 8,746,879 describes a method for laminating a functional film on to an optical base element and a tri-layer adhesive system for use in the method. The tri-layer adhesive includes a first latex adhesive layer disposed on the functional film and a second latex adhesive layer disposed on the optical base element. A hot-melt adhesive (HMA) layer is disposed in between the latex layers to form a tri-layer adhesive to permanently retain the functionalized film on the optical base element. The method includes first coating a latex adhesive on the functional film and second coating a latex adhesive on the optical base element. An HMA is then coated on to one of the dried latex adhesive layers. The film is hot pressed on to the optical base element with the HMA sandwiched in between the latex layers to form a laminated optical device.

U.S. Pat. No. 8,916,233 to Mosse et al. issued Dec. 23, 2014, with the title "Methods for coating lenses curved surfaces with a polarizing liquid". U.S. Pat. No. 8,916,233 describes methods and apparatus for coating at least a portion of a curved surface of a lens with a polarizing liquid. For example, there is provided a method of providing a lens having a curved surface, and applying a polarizing liquid to at least a portion of the curved surface by shear flow with a flexible apparatus. Apparatus include ophthalmic lenses having polarized coatings formed according to the disclosed methods.

U.S. Pat. No. 5,793,467 to Bailey issued Aug. 11, 1998 with the title "Semi-permanent reading lenses for sunglasses". U.S. Pat. No. 5,793,467 describes a plastic reading lens using a microstructure to provide reading correction can be semi-permanently attached to a non-prescription sunglass using a water-soluble adhesive. The lens may be removed from the sunglass using an adhesive remover which is non-damaging to plastic or glass. The microstructure lens may also be applied to the sunglasses using a non-adhesive molecular attraction mechanism.

U.S. Patent Application Publication 2014/0233105 of Schmeder et al. published Aug. 21, 2014 with the title "Multi-band color vision filters and method by LP-optimization". Patent Application Publication 2014/0233105 describes optical filters that provide regulation and/or enhancement of chromatic and luminous aspects of the color appearance of light to human vision, generally to applications of such optical filters, to therapeutic applications of such optical filters, to industrial and safety applications of such optical filters when incorporated, for example, in radiation-protective eyewear, to methods of designing such optical filters, to methods of manufacturing such optical filters, and to designs and methods of incorporating such optical filters into apparatus including, for example, eyewear and illuminants.

Accordingly, there is a need for improved ophthalmic spectacle lenses.

SUMMARY OF THE INVENTION

In some embodiments, the present invention includes a color-enhancing ophthalmic spectacle lens whose spectral values conform to those of the tri-stimulus values. In some embodiments, the color-enhancing ophthalmic spectacle lens absorbs more high-frequency visible light than other inventions in its field, while maintaining or increasing color definition with the use of transitional metal oxides, rare-earth metal oxides, and/or organic dyes. In embodiments that include a polarizing filter, this invention becomes particularly beneficial in providing the wearer with increased color definition, visual and depth perception, and acuity.

In some embodiments, the present invention includes one or more wavelength-selective light-absorbing species within an adhesive layer, wherein this adhesive layer itself, when combined with the wavelength-selective light-absorbing species, is wavelength-selective transparent (i.e., that allows light to pass through with substantially no diffusion (but that allows more of certain wavelengths than other wavelengths) so that objects behind can be distinctly seen, such as by analogy "transparent blue water," in contrast to translucent (allowing light, but not detailed images, to pass through), opaque, or semi-opaque materials) in the final assembled lens system. In some embodiments, the adhesive component that contains the wavelength-selective light-absorbing species includes one or more layers that include a hot-melt adhesive, a latex adhesive, a polyurethane adhesive, an acrylic adhesive, a silicone adhesive, an epoxy adhesive, or any other suitable adhesive layer. The adhesive layer also provides a mechanical function of adhering other lens components to one another. In some embodiments, the present invention uses a water-activated adhesive, for example, the adhesive sold under the brand name Acrylic Adhesive No.

467 available from the 3M Corporation of Saint Paul, Minn., USA (3M Corporation). In some embodiments, a medium viscosity, two component epoxy system with high performance bonding qualities is preferred. In some embodiments, the preferred adhesive should be readily cured at room temperature and/or more rapidly cured at elevated temperatures relative to room temperature, making the assembled parts available for handling in a production environment in a shorter time allotment. In some embodiments, the preferred adhesive should also be reactive with high physical-strength properties and optical clarity. Known epoxy resins that are used in some embodiments of the present invention include those made from epichlorohydrin, bisphenol A, bisphenol F, and/or other aliphatic polyols such as glycerol. Such materials can be characterized by a glycidyl ether structure and are commonly cured with a variety of amines and/or amides. The result of the combination of the components is a resin based on the reactivity of such epoxide groups. In some embodiments, the present invention includes any of the above adhesives or other suitable adhesive and also includes one or more wavelength-selective light-absorbing species within the adhesive in order that the adhesive can be used as the adhering layer between other lens components (such as ophthalmic-grade glass wafers, polarizing layers and the like) in sunglasses. In some embodiments, the present invention includes such sunglasses that include the adhesive and its one or more wavelength-selective light-absorbing species as one interior layer (for convenience, referred to as the first adhesive layer, wherein there is optionally one or more further adhesive layers) in the lenses. In some embodiments, the first adhesive layer in the sunglasses includes one or more wavelength-selective light-absorbing species that reduce transmission of wavelengths around 500 nm more than the average of the reduction of transmission of wavelengths around 480 nm and the reduction of transmission of wavelengths around 520 nm, and the sunglasses do not substantially reduce wavelengths around 580 nm more than the average reduction of transmission of wavelengths around 550 nm and wavelengths around 610 nm. In some embodiments, the first adhesive layer in the sunglasses includes one or more wavelength-selective light-absorbing species that reduce transmission of wavelengths around 500 nm more than the average of the reduction of transmission of wavelengths around 480 nm and the reduction of transmission of wavelengths around 520 nm, and the first adhesive layer also includes one or more wavelength-selective light-absorbing species that do reduce wavelengths around 580 nm more than the average of the reduction of transmission of wavelengths around 560 nm and the reduction of transmission of wavelengths around 600 nm. In some embodiments, the first adhesive layer (for example, the layer that holds a first outer glass layer to a central polarizing layer) in the sunglasses includes one or more wavelength-selective light-absorbing species that reduce transmission of wavelengths around 500 nm more than the average of the reduction of transmission of wavelengths around 480 nm and the reduction of transmission of wavelengths around 520 nm, and a second adhesive layer (for example, the layer that holds a second outer glass layer to the central polarizing layer) includes one or more wavelength-selective light-absorbing species that reduce transmission of wavelengths around 580 nm more than the average of the reduction of transmission of wavelengths around 560 nm and the reduction of transmission of wavelengths around 600 nm.

Generally speaking, in accordance with some embodiments of the invention, an epoxy adhesive composition and one or more organic dyes are used, in which a base formulation of epoxy with optical clarity is combined with one or more wavelength-selective light-absorbing dyes from one or more sources to provide a colored epoxy adhesive having an enhanced perceived contrast between blue light and green light due to a blue-versus-green partial-absorbance band specifically found between 480 nm and 510 nm, and/or having an enhanced perceived contrast between green light and red light due to a green-versus-red partial-absorbance band between 570 nm and 590 nm. In some embodiments, by partial-absorbance it is meant that the band passes at least a certain amount of light in the wavelengths of the band for safety reasons (e.g., in some embodiments, an amount of light that is at least 20% of the average transmittance of the lens over the wavelength range of 400 nm to 700 nm). For example, a lens passing at least this certain amount of light in the 570 nm to 590 nm partial-absorbance band would help automobile drivers to notice an amber traffic light that might not be visible if less light in this band were passed. Similarly, having the lens pass at least a certain amount of light in the blue-versus-green partial-absorbance band would help automobile drivers to notice a cyan or blue-green traffic light that might not be visible if less light in this band were passed. In some embodiments, the blue-versus-green partial-absorbance band is primarily between 480 nm and 490 nm. In some embodiments, the blue-versus-green partial-absorbance band is primarily between 490 nm and 500 nm. In some preferred embodiments, the blue-versus-green partial-absorbance band is primarily between 500 nm and 510 nm. In some other preferred embodiments, the blue-versus-green partial-absorbance band is primarily between 495 nm and 515 nm. Some embodiments further include a violet-blocking absorbance band for wavelengths from 400 to 420 nm when in an assembled lens. In some embodiments, the violet-blocking absorbance band is for wavelengths from 400 to 430 nm when in an assembled lens. In some embodiments, the violet-blocking absorbance band is for wavelengths from 400 to 440 nm when in an assembled lens. In some embodiments, the violet-blocking absorbance band is for wavelengths from 400 to 450 nm when in an assembled lens. In some embodiments, the assembled lens includes two glass wafers and a polymer layer that is cured between the two wafers in a two-wafer lens system. In some embodiments, the base compositions include an uncured epoxy resin with transparent optical clarity. In some embodiments, the dye pigments are advantageously added to the resin, preferably using wetting agents and other additives. To this, the dye pigments are added as needed to provide the desired spectral composition in conformance to the tri-stimulus values discussed herein. In some embodiments, the invention accordingly includes compositions possessing the characteristics, properties and the relations of components, as well as a system and method involving these compositions.

Some embodiments include one or more wavelength-selective light-absorbing species within a non-adhesive layer that is deposited on a lens component of the lens system. This non-adhesive layer itself, when combined with the wavelength-selective light-absorbing species, is wavelength-selective transparent (i.e., that allows light to pass through with substantially no diffusion (but that allows more of certain wavelengths than other wavelengths) so that objects behind can be distinctly seen, such as by analogy "transparent blue water," in contrast to translucent (allowing light, but not detailed images, to pass through), opaque, or semi-opaque materials) in the final assembled lens system. In some embodiments, the non-adhesive deposited layer(s) that contains the wavelength-selective light-absorbing species is applied to lens components as a polarizing liquid that provides a light-polarizing function, such as described in U.S. Pat. No. 8,916,233, as well as a color-enhancing function obtained from the wavelength-selective light-absorbing species. In some embodiments, the one or more wavelength-selective light-absorbing species are added to the polarizing liquid described in U.S. Pat. No. 8,916,233 along with an adhesive species such that the resulting liquid is treated as described in U.S. Pat. No. 8,916,233 to provide its polarization functionality and is also treated to activate its adhesive function of holding two other lens components to one another. In some embodiments, the adhesive component includes a polyurethane that is water activated.

In some embodiments, the one or more wavelength-selective light-absorbing species are applied as a layer by themselves using vacuum-deposition, sputtering, ion-assisted deposition, applying when the wavelength-selective light-absorbing species are dissolved in a solvent that is later evaporated away, or other suitable techniques. In some such embodiments, an adhesive layer is deposited on top of such a deposited surface layer of wavelength-selective light-absorbing species to hold the substrate having the wavelength-selective absorbing layer to another lens wafer.

In some embodiments, the present invention uses one or more wavelength-selective light-absorbing species to provide wavelength-selective attenuation of wavelengths around 500 nm without providing wavelength-selective attenuation of wavelengths around 580 nm, such that the completed lens system enhances color separation between blue and green colors (by blocking cyan at 500 nm) without blocking yellow colors of around 580 nm. These lenses thus allow users of sunglasses and other color-enhancing ophthalmic spectacle lenses performing certain activities to see certain desired wavelengths, such as all wavelengths in the visible spectrum between green and yellow (e.g., in some embodiments, wavelengths between about 520 nm and about 600 nm are passed to about equal amounts; in other embodiments, each wavelength between about 520 nm and about 600 nm is transmitted at a level at least 80% of the average transmission of all wavelengths between about 520 nm and about 600 nm; and in some such embodiments, each wavelength between about 520 nm and about 600 nm is transmitted at a level at least 90% of the average transmission of all wavelengths between about 520 nm and about 600 nm), as well as blue wavelengths (e.g., in some embodiments, wavelengths between about 440 nm and about 480 nm are passed to about equal amounts). In some embodiments, this wavelength-selectivity that attenuates cyan colors (wavelengths around 500 nm), optionally combined with polarization in the lens, provides enhanced visibility for people fishing for, for example, yellow and blue fish, which might not be as visible to a person wearing other sunglasses that also attenuate yellow colors (wavelengths around 580 nm). In some embodiments, the wavelength-selective function attenuates at least some wavelengths between 490 nm and 510 nm to pass an amount of such light at a level that is no greater than 75% of the average amount of blue light (between 440 nm and 480 nm) passed, and also no greater than 75% of the average amount of green and yellow light (between 520 nm and 590 nm) passed; and at the same time, passes all wavelengths between 520 nm and 590 nm in an amount of at least 80% of the average amount of light passed having wavelengths between 520 nm and 590 nm. In some embodiments, the wavelength-selective function attenuates at least some wavelengths between 490 nm and 510 nm to pass an amount of such light at a level that is no greater than 50% of the average amount of blue light (between 440 nm and 480 nm) passed, and also no greater than 50% of the average amount of green and yellow light (between 520 nm and 590 nm) passed; and at the same time, passes all wavelengths between 520 nm and 590 nm in an amount of at least 80% of the average amount of light passed having wavelengths between 520 nm and 590 nm.

Absorbing ultraviolet (UV) light at wavelengths shorter than 400 nm is important in protecting the eyes from overexposure to UV, which can cause cataracts. Other lenses in this field attempt to address this concern, but the effects of extended exposure to high-frequency visible light has been researched extensively and there is increasing evidence that not only ultraviolet (UV) light but also high-frequency visible light may have potentially damaging effects on our eyes. Cataracts can form from over-exposure to UV light. Over-exposure to high-frequency visible light may increase Age Related Macular Degeneration (AMD). Studies such as "The Role of Oxidative Stress in the Pathogenesis of Age-Related Macular Degeneration" published in the SURVEY OF OPHTHALMOLOGY, VOLUME 45, NUMBER 2, pages 115-134, September-October 2000, West S K, Rosenthal F S, Bressler N M, et al. "Exposure to sunlight and other risk factors for age-related macular degeneration." Arch. Ophthalmol. 1989; 107(6):875-9 (hereinafter, the "Maryland Watermen Study"), plus Klein R, Klein B E, Jensen S C, et al. "The five-year incidence and progression of age-related maculopathy: The Beaver Dam Eye Study." Ophthalmol 1997; 104(1):7-21 (hereinafter the "Beaver Dam Eye Study"), which are all incorporated herein by reference) all point to a probability that over exposure to blue light may lead to AMD. In the Maryland Watermen Study, findings are that AMD was more common in men exposed to increased levels of blue light, but not in those with increased levels of ultraviolet exposure. Similarly, the Beaver Dam Eye Study found that exposure to visible light was associated with AMD in men.

In some embodiments, the device of the present invention absorbs more potentially harmful visible light than other lenses in this field, i.e., nearly 100% of the high-frequency visible light between 400 nm and 420 nm (or optionally from 400 nm to 430 nm, or optionally from 400 to 440, or optionally from 400 to 450), while balancing the visible color spectrum. It is known that when a lens absorbs light to a degree of 50% of the luminous transmittance of the lens between 430 nm and 450 nm, the perception of the color blue starts to deteriorate. Human eyes contain three types of color-sensitive cones. The first type of cone in the human eye responds to blue light and is most sensitive at about 450 nm, the second type of cone is stimulated by green light and is most sensitive at about 550 nm, and the third type of cone is stimulated by red light and is most sensitive at about 600 nm. The "green" and "red" cones are mostly packed into the fovea centralis. By population, about 64% of the cones are red-sensitive, about 32% are green sensitive, and about 2% are blue sensitive. The "blue" cones have the highest sensitivity and are mostly found outside the fovea. The present invention defines an absorption band one for visible wavelengths shorter than wavelengths in the "blue" pass band (i.e., wavelengths of 430 nm or shorter), an absorption band two for wavelengths longer than wavelengths in the "blue" pass band but shorter than wavelengths in "green" pass band, an absorption band three for wavelengths longer than wavelengths in the "green" pass band but shorter than wavelengths in "red" pass band, and an absorption band four for wavelengths longer than wavelengths in the "red" pass band. The mixture of energy responses signaled by the three types of cones in the human eye defines the total color perception that a person views. Additionally, chromatic response of the human eye falls to near zero in the absorption band two (about 500 nm) and absorption band three (about 580 nm), as well as in violet and ultraviolet of absorption band one (including wavelengths shorter than about 400 nm) and in deep red of absorption band four (including wavelengths longer than about 700 nm).

Lenses that absorb light from 400 nm to 420 nm may increase protection for a person's eyes due to over exposure of high-frequency visible light. At the same time, lenses that absorb light having wavelengths from 400 nm to 420 nm or optionally from 400 to 430 nm will decrease glare and increase distance-vision acuity. In some embodiments, the present invention can at least partially achieve one preferred embodiment by adding copper oxides and/or titanium oxides into an ophthalmic-grade glass wafer, heat treating this wafer to create a chemical reaction allowing the absorbance of light to nearly 100% through the range of 415 nm to 425 nm. In some embodiments, adding an organic dye that has a peak absorbance near 420 nm, or 430 nm, or 440 nm increases the total absorbance from 400 nm to 420 nm, or 400 nm to 430 nm to nearly 100%. Alternatively, some embodiments use two (2) glass wafers, with no copper oxides or titanium oxides used, and achieve the desired absorbance by adding organic dyes (with the functional attributes to absorb light having wavelengths in the 400 nm to 420 nm or to 430 nm range) to one or more of the adhesive layers, to the polarizing filter layer, or to both the polarizing filter and one or more of the adhesive layers. Alternatively, some embodiments use ophthalmic-grade plastic polymers such as polycarbonate or polyurethane for the lenses (instead of or in addition to one or both of the glass wafers used in other embodiments), and have organic dyes dispersed into or onto the polymer material to cause the desired spectral curve (such as spectral curve 330 of FIG. 3C and FIG. 4, or spectral curve 930 of FIG. 9, or the spectral blocking bands, reducing bands and passing bands shown schematically in spectral schematic 1030 shown in FIG. 10A) as it relates to the tristimulus values. Human eyes are most sensitive to blue light having a wavelength of about 450 nm, so by allowing the spectral transmittance cut-on between 430 nm and 450 nm allows for continued blue color perception, without distortion. Human eyes are most sensitive to green light having a wavelength of about 550 nm. The BG crossover 214 (see FIG. 2) wavelength-sensitivity curves of the blue cones and green cones of the human eye occurs at about 500 nm, so by creating an absorption peak near 500 nm, the present invention will better separate the distinction between blue and green, increasing contrast and/or improving the pleasurable perception of the two colors blue and green. In some embodiments, adding to the lens an organic dye whose peak absorbance is near 500 nm creates the functional absorbance peak desired in the present invention. The GR crossover 215 (see FIG. 2) of the wavelength-sensitivity curves of the green cones and red cones of the human eye occurs at about 580 nm. Creating an absorption peak in this wavelength region is particularly beneficial in helping the eye resolve the differences between green and red, thereby increasing contrast and/or improving the pleasurable perception of these two colors. Neodymium oxide, a rare-earth oxide, has an absorption peak at about 585 nm and helps obtain this functional absorption for some embodiments of the present invention. Alternatively or additionally, some embodiments of the present invention use an organic dye (as discussed in U.S. Pat. No. 7,506,977) with an absorbance peak of about 580 nm to replace or supplement the absorption provided by neodymium. In some embodiments, neodymium is added to the lens system of the present invention containing the copper oxides and titanium oxides and/or to the lens system of the present invention containing the organic-dye cocktail (e.g., the lens system that includes organic dyes in the polarizing filter layer and/or one or more adhesive layers to absorb light having wavelengths from 400 nm to 420 nm or, 430 nm) designed to mimic the absorption characteristics of copper oxides and titanium oxides.

In some embodiments, combining the precise ratios of the embodiments allows the present invention to maintain ANSI Z80.3-2009 4.6.3.2 and ISO 12312-1 2013 5.3.2.2 and 5.3.2.3 standards for sunglass filters' traffic-signal recognition. In some embodiments, it is important for the present invention to meet these standards, as this invention is particularly beneficial for daytime driving. In some embodiments, the ratios of metal oxides formulated in a glass wafer are adjusted to compensate for the thickness of the wafer, which can have various values for thickness from 1 mm or greater, thus requiring different ratios of oxides in order to meet the above-described standards for passing a given minimum amount of light having the wavelengths used for green (or cyan) and amber signal lights. In some embodiments, the glass wafer having the metal oxides is used as either the front wafer, rear wafer, or both in the multi-layered lens embodiments of the present invention. In some embodiments, the organic dye is added to either the polarized filter layer or the adhesive layer, or both. In some embodiments, the metal oxide(s) restrict light transmittance from 400 nm to 415 nm and 585 nm, while the organic dye(s) restrict light transmittance from 415 nm to 420 nm, or 415 nm to 430 and 490 nm to 510 nm, resulting in at least three transmittance peaks (pass bands) at about 450 nm, 550 nm, and 600 nm and at least two absorption peaks (absorption bands) at about 500 nm and 585 nm.

In some embodiments that include a polarizing filter, the polarizing filter is applied by one of two technologies well known in the art: the first would be using a film between two approximately 1-mm-thick glass wafers, wherein one of the two wafers contains absorption species of some of the embodiments of this invention that use one or more of the group consisting of copper halides, copper oxides, titanium oxides, praseodymium oxides, and/or erbium oxides, and wherein the second wafer is clear glass without any particularly unusual spectral transmittance, or is a photochromic glass wafer (i.e., a glass wafer that darkens (reduces light transmittance) in bright sunlight). In some embodiments, the wafers are laminated together with an adhesive and, in some embodiments, this adhesive contains the organic dyes used to achieve one or more of the reduced-transmission spectral bands). Herein, this is called a two-wafer system.

In other embodiments, the polarizing-filter technology includes a single glass wafer that contains the absorption species of some of embodiments that use one or more of the group consisting of copper halides, copper oxides, titanium oxides, praseodymium oxides, and/or erbium oxides, wherein the glass wafer is about 2-mm thick, and wherein the polarizing filter is applied to the concave surface of the wafer using a vacuum-coating process that is well known in the art of ion-assisted deposition. Herein, this is called a single-wafer system.

In some embodiments, the present invention also includes mirror coatings and/or anti-reflection coatings. If a mirror coating is desirable, the use of a two-wafer system is particularly beneficial. In some embodiments, the mirror coating is applied to the concave surface of the front wafer, which provides protection to the mirror coating from scratching or abrasion, and protects the mirror coating from separating from the lens surface. With an internal mirror coating such as this, in some embodiments, it is desirable to include an anti-reflection coating on the concave surface of the rear wafer to minimize internal reflections induced by the mirror coating. In some embodiments, the mirror coating includes a metal film. In other embodiments, the mirror coating includes a plurality of dielectric layers. In still other embodiments, the mirror coating includes both a metal film and a plurality of dielectric layers. In some embodiments, the thicknesses of the dielectric layers are chosen to reflect (and thus help block) one or more of the wavelengths in one or more of the reduced-transmittance wavelength bands.

BRIEF DESCRIPTION OF THE FIGURES

FIG. 1A1 is a set of spectral graphs 1111 comparing spectral light-transmission curves 110, 120, and 130 at various wavelengths to various averages of the light-transmission curves 119, 129, and 139 across the various wavelengths.

FIG. 1A2 is a set of spectral graphs 1112 comparing spectral light-transmission curves 114, 124, and 134 at various wavelengths to various averages of the light-transmission curves 117, 127, and 137 across the various wavelengths.

FIG. 1A3 is a cross-sectional schematic of a lens 11 that represents one embodiment of the 500 & 580 Brown Polarized lens that exhibits the spectral curve 110 as shown in FIG. 1A1 according to some embodiments of the present invention.

FIG. 1A4 is a cross-sectional schematic of a lens 12 which represents one embodiment of the 500 & 580 No Polarization lens that exhibits the spectral curve 120 of FIG. 1A1 according to the present invention.

FIG. 1A5 is a cross-sectional schematic of a lens 13 which represents one embodiment of the 500 & 580 Gray Polarized lens that exhibits the spectral curve 130 of FIG. 1A1 according to the present invention.

FIG. 1C1 is a spectral graph 1131 that illustrates light-transmission curve 99 at various wavelengths of a lens according to a conventional or current 580-only blocking embodiment.

FIG. 1C2 is a set of spectral graphs 1132 that illustrate details of the spectral graphs set forth in FIG. 1A1.

FIG. 1C3 is a set of spectral graphs 1133 that illustrate details of the spectral graphs set forth in FIG. 1A2.

FIG. 1D1 is a spectral graph 1141 that illustrates the spectral light-transmission curve 130 at various wavelengths of one embodiment of the present invention.

FIG. 1D2 is a set of spectral graphs 1142 comparing the spectral light-transmission curve 130 at various wavelengths to various averages of the spectral light-transmission curve 130 across the various wavelengths.

FIG. 1D3 is a set of spectral graphs 1143 comparing the spectral light-transmission curve 134 at various wavelengths to various averages of the spectral light-transmission curve 134 across the various wavelengths.

FIG. 1E1 is a spectral graph 1151 that illustrates the spectral light-transmission curve 120 at various wavelengths of one embodiment of the present invention.

FIG. 1E2 is a set of spectral graphs 1152 comparing the spectral light-transmission curve 120 at various wavelengths to various averages of the spectral light-transmission curve 120 across the various wavelengths.

FIG. 1E3 is a set of spectral graphs 1153 comparing the spectral light-transmission curve 124 at various wavelengths to various averages of the spectral light-transmission curve 124 across the various wavelengths.

FIG. 1F1 is a spectral graph 1161 that illustrates the spectral light-transmission curve 110 at various wavelengths of one embodiment of the present invention.

FIG. 1F2 is a set of spectral graphs 1162 comparing the spectral light-transmission curve 110 at various wavelengths to various averages of the spectral light-transmission curve 110 across the various wavelengths.

FIG. 1F3 is a set of spectral graphs 1163 comparing the spectral light-transmission curve 114 at various wavelengths to various averages of the spectral light-transmission curve 114 across the various wavelengths.

FIG. 2 is a graph 200 of spectral sensitivity versus wavelength (called the tristimulus curve) detailing the peak sensitivity curves for color vision. Blue sensitivity is designated as zone B, green sensitivity is designated as zone G, and red sensitivity is designated as zone R.

FIG. 4 is a set of spectral graphs 400 comparing the spectral light-transmission curve 330 at various wavelengths of one embodiment of the present invention to light transmission 421 at various wavelengths of a lens according to Tsutsumi's U.S. Pat. No. 6,773,816.

FIG. 5 is a set of spectral graphs 500 comparing the spectral light-transmission curve 330 at various wavelengths of one embodiment of the present invention to light transmission 521 at various wavelengths of a lens according to Larson's U.S. Pat. No. 6,604,824.

DETAILED DESCRIPTION OF THE INVENTION

Figure 1A:
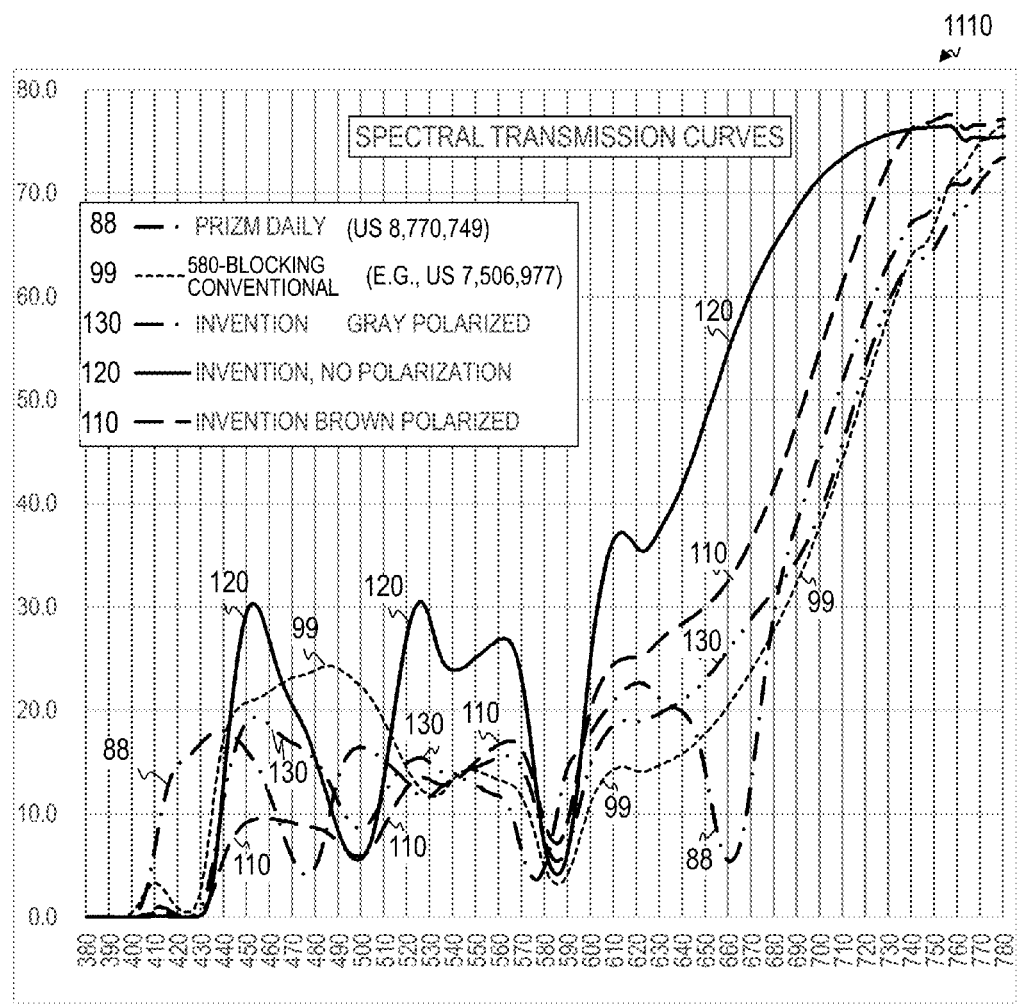
FIG. 1A is a set of spectral graphs 1110 comparing the spectral light-transmission curves 110, 120, and 130 at various wavelengths of three embodiments of the present invention to light-transmission curves 88 and 99 at various wavelengths of a lens according to U.S. Pat. No. 8,770,749 (Prizm Daily) and according to a conventional 580-blocking-only polarized embodiment (e.g., such as described in U.S. Pat. No. 7,506,977), respectively.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

It is well known in the art of color-enhancing polarized lenses that using a glass lens wafer within a multiple-layered lens system is useful to include light-absorbing oxides to create a filter that selectively transmits, absorbs and reflects light in specific bands of the visible-light spectrum, which preferably would correlate with the tristimulus values. The tristimulus values are a guideline for those who want to improve the art of color-enhancing ophthalmic lenses. In some embodiments, an alternative to using a glass wafer containing one or more light-absorbing oxides is to use organic dyes with specific-wavelength absorbent characteristics and add these dyes to either the adhesive layers or to an ophthalmic plastic substrate such as the plastic lens material itself or a polarizing filter.

The human eye has three kinds of cone cells that sense light, with spectral-sensitivity peaks in short, middle, and long wavelengths. These cone cells underlie human color perception under medium- and high-brightness conditions (in very dim light, color vision diminishes, and the low-brightness, monochromatic "night-vision" receptors, called rod cells, take over). Studies conducted in the connection of the manufacture of artificial lighting have found that human color vision may be characterized chromatically by three channels. Chromatic response falls to near zero in the blue green wavelengths near 500 nm and in the yellow wavelengths near 580 nm, as well as in violet wavelengths near 400 nm and in deep red wavelengths beyond 700 nm. The minima may be related to the fact that the red-green blind protanope sees no hue at all near 500 nm and the tritanope sees no hue near 580 nm. These wavelengths impair proper identification of chromaticities of color objects. The eye uses wavelengths near 450 nm, 550 nm, and 600 nm most effectively. Thus, the importance to have higher transmittance at 450 nm (blue light), 550 nm (green light), and 600 nm (red light), while having lower transmittance values near 500 nm (transitional band of wavelengths between blue and green) and 580 nm (transitional band of wavelengths between green and red).

It is well known in the art of color-enhancing glass lenses that neodymium oxide creates an absorption peak between 570 nm and 590 nm. More recently, the art has adopted the use of organic dyes in plastic substrates to replicate some of what the glass substrates have achieved. There are organic dyes being produced today that have specific absorption peaks to cover all bands in the visible spectrum of this present invention, including dyes with absorption peaks near 400 nm, 409 nm, 419 nm, 425 nm, 430 nm, 439 nm and 584 nm, and others. The first color-enhancing glass polarized lenses provided one or more absorption peaks between 570 nm and 590 nm but did not address the rest of the tristimulus values. In fact, U.S. Pat. Nos. 6,145,984, 6,334,680, 6,604,824, 6,773,816, 7,372,640, 7,597,441, 8,210,678 and plastic-lens U.S. Pat. Nos. 7,506,977, and 8,770,749 only cover sections of the tristimulus values.

In some embodiments, the present invention addresses all five bands, and further addresses a sixth band of wavelengths the area of the visible spectrum between 400 nm and 450 nm. This sixth band includes ultra-violet (about 300 nm to about 400 nm, inclusive), violet (about 400 nm to about 420 nm, inclusive) and blue light (about 420 nm to about 490 nm, inclusive). This actually creates a sixth zone or range of wavelengths that includes wavelengths that herein will be called absorption band one. Only U.S. Pat. No. 8,210,678 addresses the need to reduce light in the sixth zone of violet-blue (VB). Light in absorption band one (including high-frequency visible light, e.g., 400 nm-420 nm or 400 nm-430 nm) can potentially cause "Age Related Macular Degeneration" (AMD) and light in absorption band one can also reduce distant-vision acuity. The present invention absorbs significant portions of the high-frequency visible light and balances color perception.

Color-enhancing technology in polarized sunglasses has become readily available on the market place but ophthalmic lenses with color-enhancing functions without a polarizing filter are less common. Most patents fail to address the absorption of high-frequency visible light while at the same time using known technology for better, more balanced color enhancement and definition. Color enhancement visually enhances the difference in colors giving the wearer increased perception and color saturation of objects being viewed. The shortcoming of other spectacle lenses in this field is twofold, first most fail to absorb the highest-frequency light found in the visible spectrum of absorption band one, between 400 nm and 430 nm. This high-frequency light tends to be scattered and thus will cause glare and restricts visual perception. Atmospheric contaminants increase the reflections of high frequency visible light which in turn will increase glare and the loss of vision and visual perception, diminishing the effects of the color enhancing benefits. Eliminating or greatly reducing light between 400 nm and 420 nm increases contrast, allowing the wearer noticeable increased clarity, and more so when reducing light to 430 nm. Second, no other spectacle lens in the art addresses the bisecting band of light between blue and green, near 500 nm. In the art of color enhancing this is a very important band to attenuate light to complete the tristimulus values.

Ultra-violet light (UV) is defined as electromagnetic radiation in the spectral region between 180 and 400 nanometers (nm). The visible spectrum is found between about 400 nm and 700 nm. High frequency visible light can be found in the range of about 400 nm to about 475 nm. Other inventions in this field are asserted to protect the wearer from only UV light. Farwig U.S. Pat. No. 6,145,984 does not address the transmittance of light from 400 nm to 420 nm, Farwig U.S. Pat. No. 7,597,441 describes its light transmittance at 400 nm to be between 50% and 100% of the value of the luminous transmittance of the lens, and transmittance between 420 nm and 460 nm is 125% of the value of the luminous transmittance of the lens. Tsutsumi U.S. Pat. No. 6,773,816 shows 0% transmittance at 400 nm but does not address the transmittance between 400 nm and 420 nm. Larson U.S. Pat. No. 6,334,680 does not address the transmittance of light between 400 nm and 420 nm. Larson U.S. Pat. No. 6,604,824 does not address the transmittance of light between 400 nm and 420 nm. Fung U.S. Pat. No. 7,372,640 shows nearly 100% absorption of light to 415 nm in a lens that is 2.0 mm thick, with the absorbing species evenly dispersed through the thickness of the lens and a 1-mm thickness is required to produce the assembled lens, using a 1-mm thick wafer, the Fung lens can only absorb nearly 100% of light to 410 nm. Hopnic U.S. Pat. No. 7,506,977 only describes a substantial absorbance peak found between 565 nm and 605 nm with no description of any absorbance at about 500 nm. Oakley U.S. Pat. No. 8,770,749 by McCabe et al. only describes absorption peaks in two bands, one being between 445 nm and 480 nm and the other between 560 nm and 580 nm. The current invention specifically addresses the transmittance of light between 400 nm and 430 nm, and absorbs nearly 100% of this high-frequency visible light, regardless of lens thickness. None of the above-mentioned patents have any absorbance peak in the band including 500 nm, nor any absorbance peak to 420 nm or 430 nm. Only Farwig U.S. Pat. No. 8,210,678 has addressed the spectral wavelengths from 400 nm to 450 nm, but it does not address all tristimulus values in the manner of the present invention, specifically absorption band two including 500 nm. In contrast, the Ishak U.S. Pat. No. 7,029,118 (titled "Waterman's sunglass lens") absorbs nearly 100% of the visible light found between 400 nm and 500 nm, this type of transmittance distorts the colors of objects the viewer sees and will not allow the wearer to perceive the color blue. This can also reduce visibility of blue-green or cyan traffic signals at wavelength of 500 nm, which is a hazard for vehicle drivers.

It is further believed in the art of spectacle color-enhancing lenses that there is no oxide that effectively attenuates light in visible-light absorption band two, which is near 500 nm. Conventional devices have an increase in transmittance or a transmittance peak in wavelengths around 500 nm. In some embodiments, the present invention provides an absorption peak in this absorption band two by adding an organic dye. As for absorption band three, it is well known in the art that the oxide neodymium has an absorption peak at about 585 nm and is used in some current devices.

FIG. 1A is a set of spectral graphs 1110 comparing the spectral light-transmission curves 110, 120, and 130 at various wavelengths of three embodiments of the present invention to light-transmission curves 88 and 99 at various wavelengths of a lens according to U.S. Pat. No. 8,770,749 (Oakley Prizm Daily) and a modified lens similar to a conventional 580-blocking-only polarized embodiment (e.g., such as described in U.S. Pat. No. 7,506,977), respectively. The numbers along the X axis of each of the graphs herein represent light wavelengths in nanometers (nm), and the numbers along the Y axis represent light transmission through the respective lenses expressed as a percentage of the incoming light. In some embodiments, curve 130 represents the spectral transmission of a lens embodiment of the present invention that includes enhanced narrowband absorption at 500 and 580 nanometers, has a perceived gray tint (due to relatively similar amounts of light transmission in the red, green and blue passbands), and is polarized (also referred to herein as "500 & 580 Gray Polarized" lens 13 or "500 & 580 Blocking Gray Polarized" lens 13). In some embodiments, curve 120 represents the spectral transmission of a lens embodiment of the present invention that includes enhanced narrowband absorption at 500 and 580 nanometers and is not polarized (also referred to herein as "500 & 580 No Polarization" lens 12 or "500 & 580 Blocking No Polarization" lens 12). In some embodiments, curve 110 represents the spectral transmission of a lens embodiment of the present invention that includes absorption at 500 and 580 nanometers, has a perceived brown tint (due to relatively higher amounts of light transmission in the red passband, relatively lower amounts of light transmission in the blue passband), and is polarized (also referred to herein as "500 & 580 Brown Polarized" lens 11). For comparison, curve 88 represents a lens according to U.S. Pat. No. 8,770,749 (also referred to as Prizm Daily). In some embodiments, curve 99 is somewhat similar to a lens according to U.S. Pat. No. 7,506,977 (a conventional 580-blocking-only polarized lens that has an absorption band at 580 nm), except that the spectral curve of the lens 99 has been modified relative to the description in U.S. Pat. No. 7,506,977 to increase absorption in wavelengths from 400 nanometers to 430 nanometers.

FIG. 1A1 is a set of spectral graphs 1111 comparing spectral light-transmission curves 110, 120, and 130 (each of which exhibit enhanced narrowband absorption at 500 nm and at 580 nm) at various wavelengths to various narrowband averages (graph horizontal lines 111, 112, 113, 121, 122, 123, 131, 132 and 133) and wideband averages (graph horizontal lines 119, 129 and 139) of the light-transmission curves 110, 120, and 130 across the various wavelengths.

Figure 2:
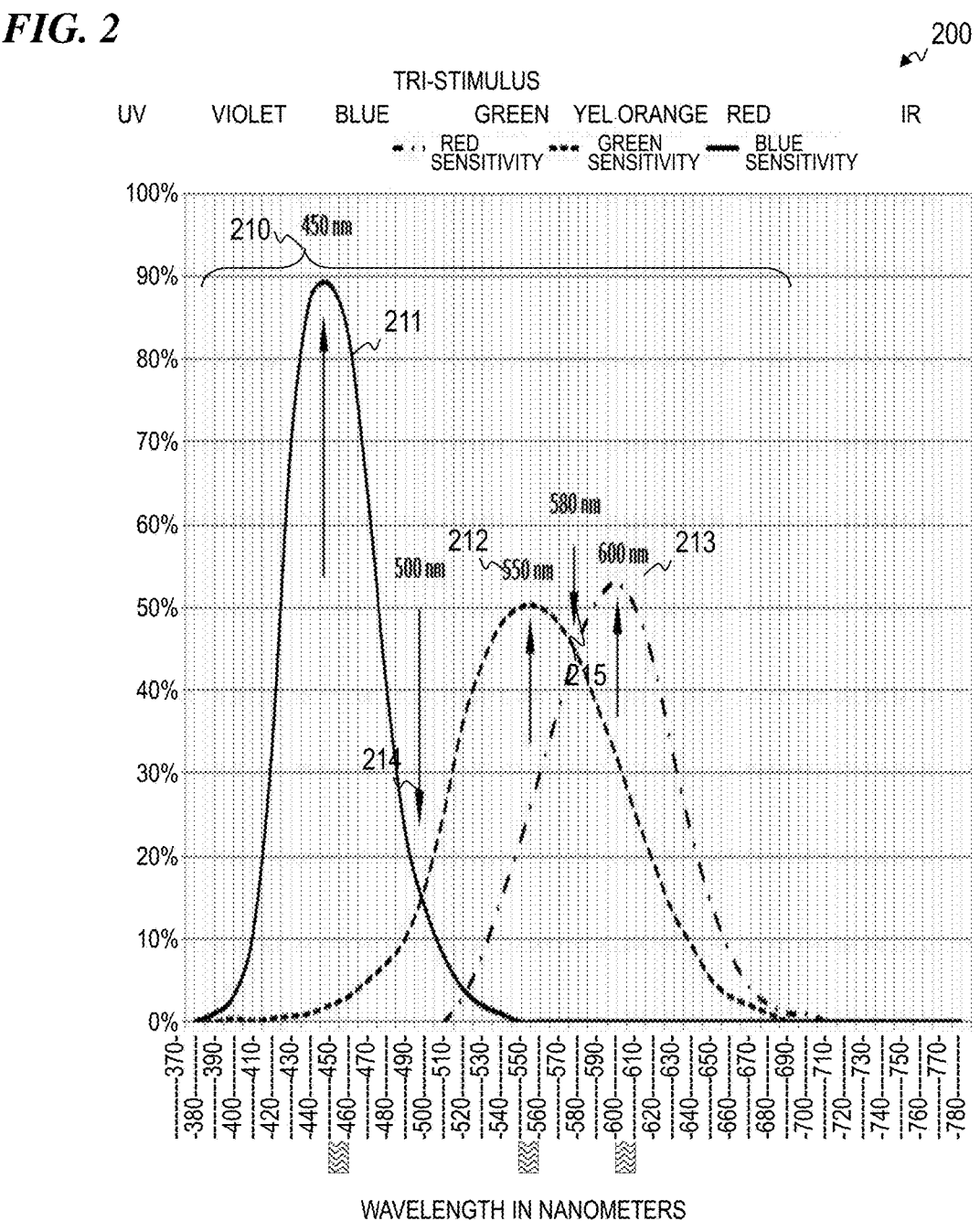

FIG. 1A2 is a set of spectral graphs 1112 comparing spectral light-transmission curves 114, 124, and 134 (each of which exhibit enhanced narrowband absorption at 500 nm but not at 580 nm) at various wavelengths to various narrowband averages (graph horizontal lines 111, 112, 113, 121, 122, 123, 131, 132 and 133) and wideband averages (graph horizontal lines 117, 127 and 137) of the light-transmission curves 114, 124, and 134 across the various wavelengths.

Figure 1B:
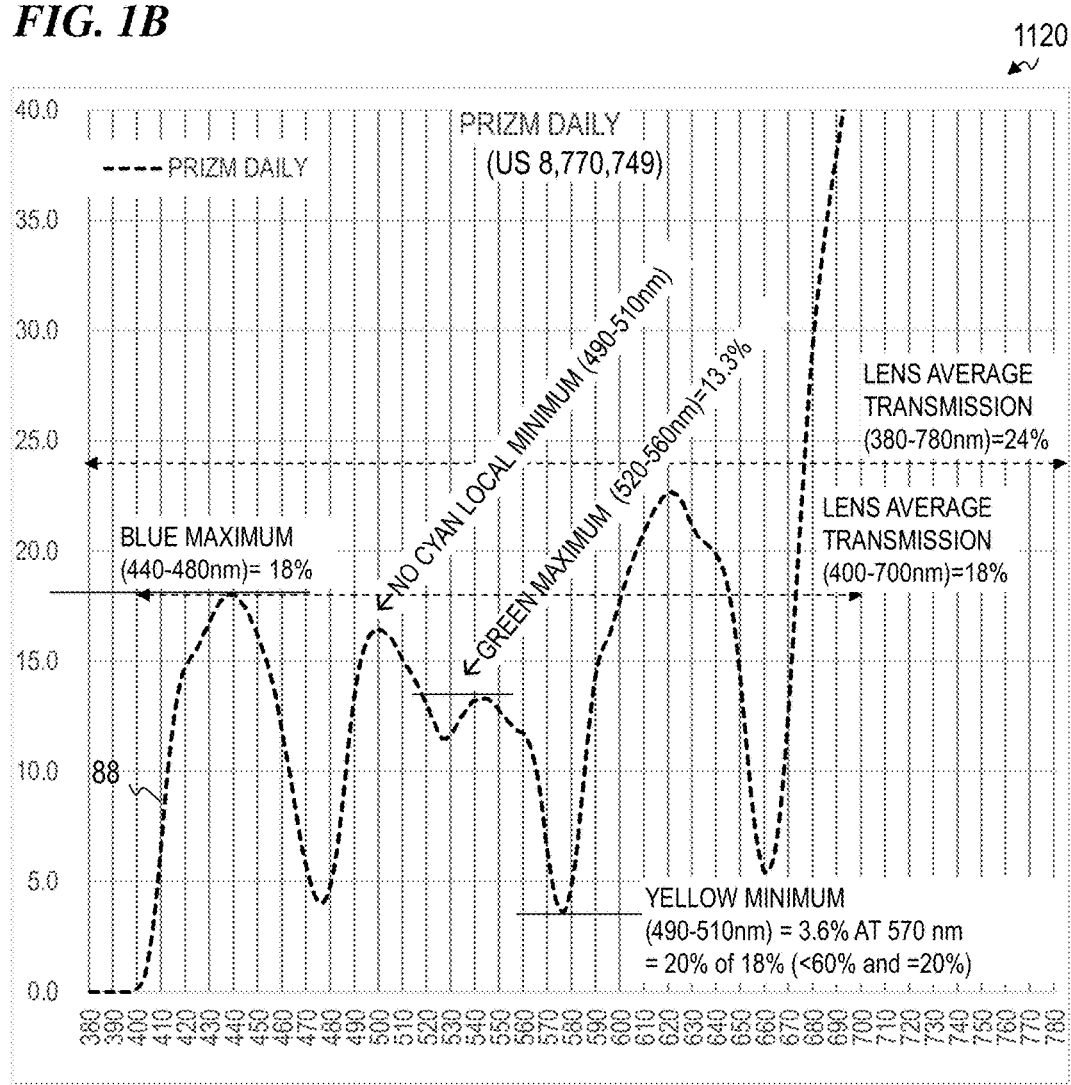
FIG. 1B is a spectral graph 1120 that illustrates light-transmission curve 88 at various wavelengths.
Figure 1G:
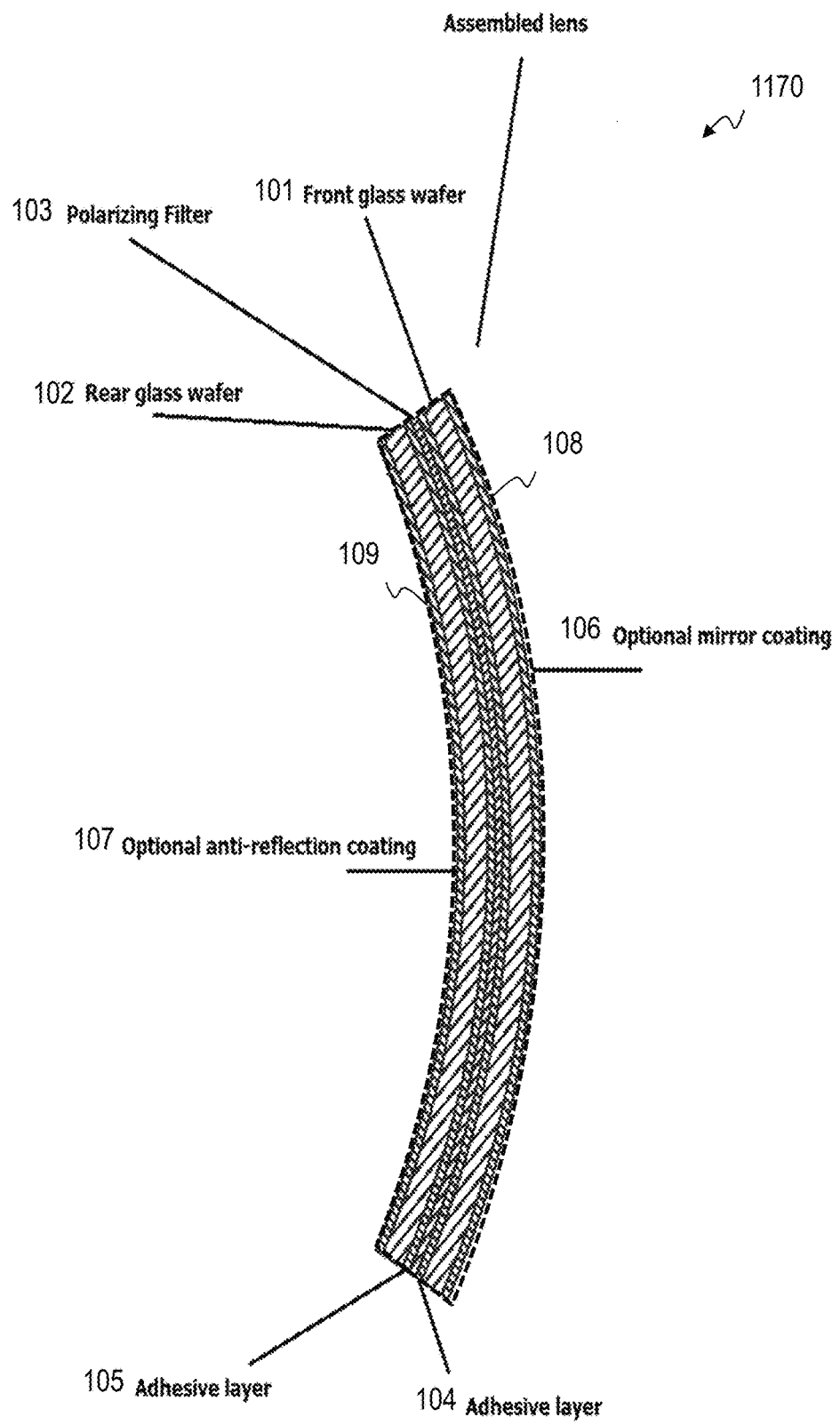
FIG. 1G (Assembled Lens Drawing) is a cross section view of a two-wafer system 1170 according to some embodiments of the present invention.

FIG. 1A3 is a cross-sectional schematic of a lens 11 that represents one embodiment of the 500 & 580 Brown Polarized lens that exhibits the spectral curve 110 as shown in FIG. 1A1 according to some embodiments of the present invention. In other embodiments, lens 11 represents one embodiment of the 500-block-only Brown Polarized lens that exhibits the spectral curve 114 as shown in FIG. 1A2 according to some embodiments of the present invention. In some embodiments, lens 11 includes a polarization layer 103 sandwiched between front glass wafer 101 and rear glass wafer 102 using rear adhesive layer 104 and front adhesive layer 105. In some embodiments, one or both of rear adhesive layer 104 and front adhesive layer 105 include one or more wavelength-selective absorbing materials (e.g., in some embodiments, one or more organic dyes) that preferentially absorb a relatively narrow absorption band (e.g., in some embodiments, a range of about 20 nm) of wavelengths around 500 nm. In addition, in some embodiments, one or both of rear adhesive layer 104 and front adhesive layer 105 include one or more wavelength-selective absorbing materials (e.g., in some embodiments, one or more organic dyes) that preferentially absorb a relatively narrow absorption band (e.g., in some embodiments, a range of about 20 nm) of wavelengths around 580 nm. In some embodiments, one or more additional lens layers or coatings are also applied to lens 11, as set forth below in the description of FIG. 1G.

In other embodiments, the 500 & 580 Brown Polarized lens 11 is implemented as a single-layer polymer lens that has polarization properties and that also includes one or more wavelength-selective absorbing materials (e.g., in some embodiments, one or more organic dyes) that preferentially absorb a relatively narrow absorption band (e.g., in some embodiments, a range of about 20 nm) of wavelengths around 500 nm. In some such embodiments, 500 & 580 Brown Polarized lens 11 includes one or more wavelength-selective absorbing materials (e.g., in some embodiments, one or more organic dyes) that preferentially absorb a relatively narrow absorption band (e.g., in some embodiments, a range of about 20 nm) of wavelengths around 580 nm. In other embodiments, lens 11 is implemented as a single-layer polymer lens (in some embodiments, with polarization and in other embodiments, without polarization) that includes one or more wavelength-selective absorbing organic dyes that preferentially absorb a relatively narrow absorption band of wavelengths around 500 nm, but which does not have additives that preferentially absorb a relatively narrow absorption band of wavelengths around 580 nm.

Figure 4:
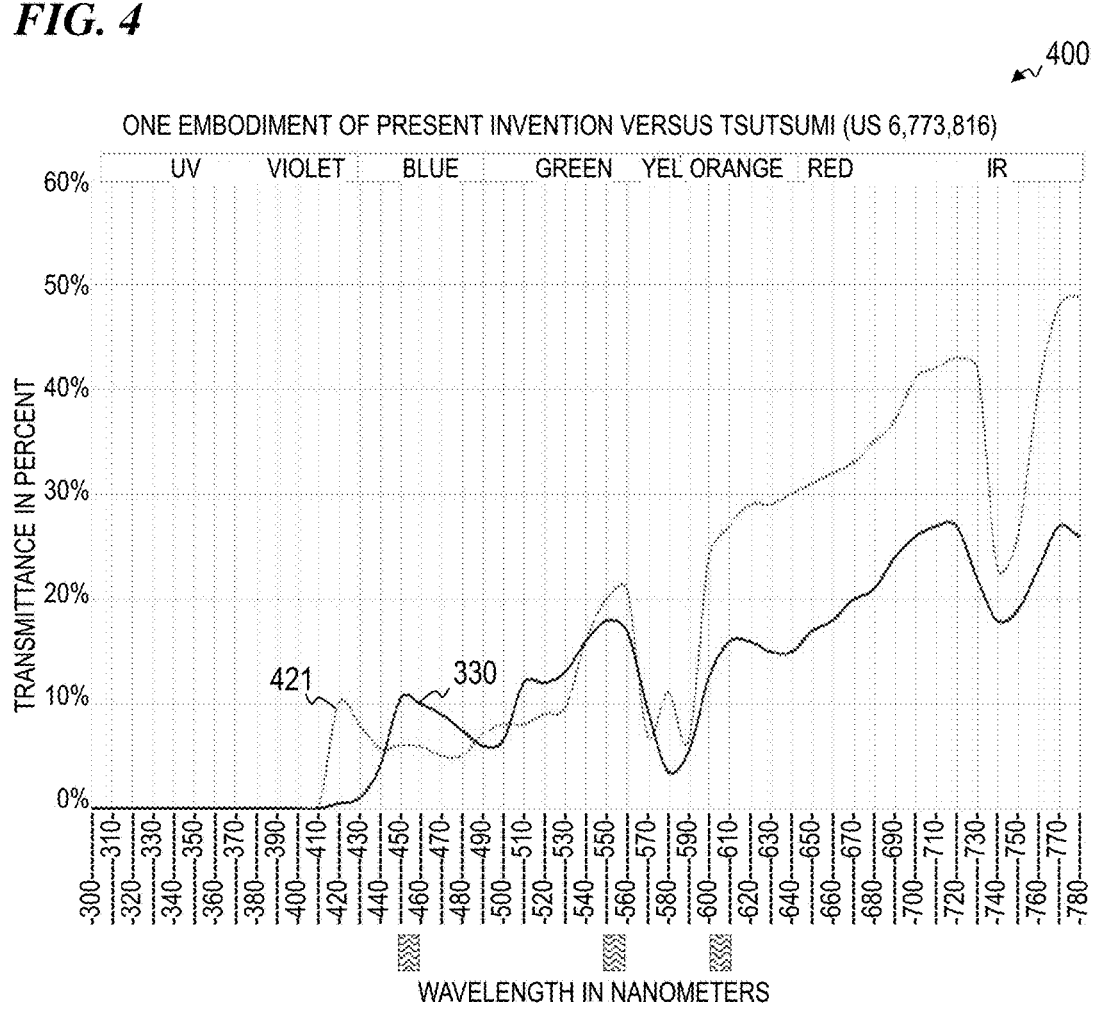

FIG. 1A4 is a cross-sectional schematic of a lens 12 which represents one embodiment of the 500 & 580 No Polarization lens that exhibits the spectral curve 120 of FIG. 1A1 according to the present invention. In other embodiments, lens 12 represents one embodiment of the 500-block-only No Polarization lens that exhibits the spectral curve 124 as shown in FIG. 1A2. In some embodiments, lens 12 includes a single adhesive layer 104 sandwiched between front glass wafer 101 and rear glass wafer 102. In some embodiments, adhesive layer 104 includes one or more wavelength-selective absorbing materials (e.g., in some embodiments, one or more organic dyes) that preferentially absorb a relatively narrow absorption band (e.g., in some embodiments, a range of about 20 nm) of wavelengths around 500 nm. In addition, in some embodiments, adhesive layer 104 includes one or more wavelength-selective absorbing materials (e.g., in some embodiments, one or more organic dyes) that preferentially absorb a relatively narrow absorption band (e.g., in some embodiments, a range of about 20 nm) of wavelengths around 580 nm. In some embodiments, one or more additional lens layers or coatings are also applied to lens 12, as set forth below in the description of FIG. 1G.

In other embodiments, the 500 & 580 No Polarization lens 12 is implemented as a single-layer polymer lens that has no polarization properties and that also includes one or more wavelength-selective absorbing materials (e.g., in some embodiments, one or more organic dyes) that preferentially absorb a relatively narrow absorption band (e.g., in some embodiments, a range of about 20 nm) of wavelengths around 500 nm. In some such embodiments, lens 12 includes one or more wavelength-selective absorbing materials (e.g., in some embodiments, one or more organic dyes) that preferentially absorb a relatively narrow absorption band (e.g., in some embodiments, a range of about 20 nm) of wavelengths around 580 nm. In other embodiments, lens 12 is implemented as a single-layer polymer lens without polarization that includes one or more wavelength-selective absorbing organic dyes that preferentially absorb a relatively narrow absorption band of wavelengths around 500 nm, but which does not have additives that preferentially absorb a relatively narrow absorption band of wavelengths around 580 nm.

Figure 5:
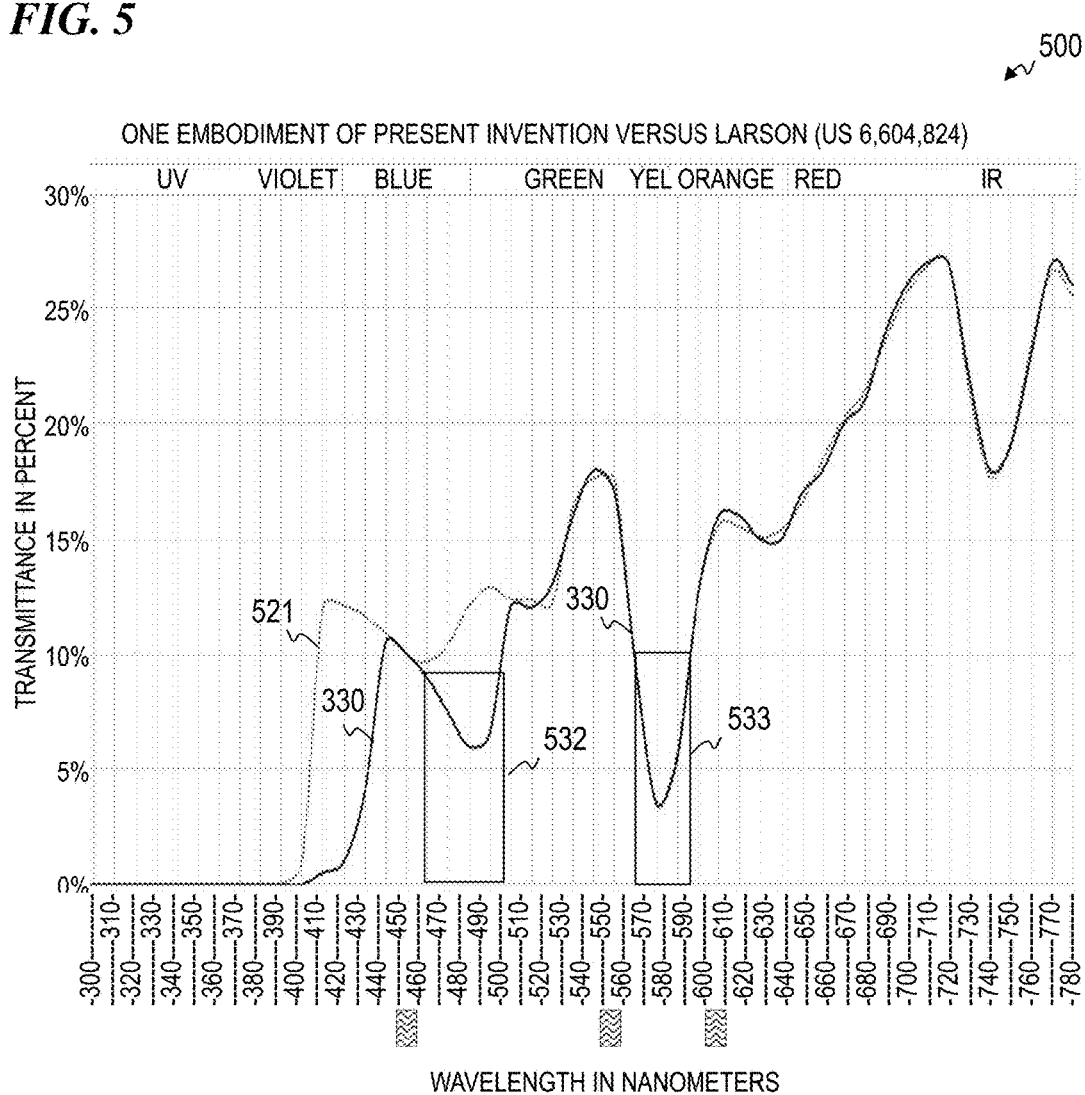

FIG. 1A5 is a cross-sectional schematic of a lens 13 which represents one embodiment of the 500 & 580 Gray Polarized lens that exhibits the spectral curve 130 of FIG. 1A1 according to the present invention. In other embodiments, lens 13 represents one embodiment of the 500-block-only No Polarization lens that exhibits the spectral curve 134 as shown in FIG. 1A2. The descriptions of components of lens 11 also apply to the like-numbered components of lens 13; however, 500 & 580 Gray Polarized lens 13 transmits relatively similar average amounts of light in the red, green and blue passbands (in some embodiments, about 19, 15% and 17% in red, green and blue respectively) in contrast to 500 & 580 Brown Polarized lens 11, which passes relatively more red and less blue (in some embodiments, about 25%, 15% and 9% in red, green and blue respectively).

In other embodiments, the 500 & 580 Gray Polarized lens 13 is implemented as a single-layer polymer lens that has polarization properties and that also includes one or more wavelength-selective absorbing materials (e.g., in some embodiments, one or more organic dyes) that preferentially absorb a relatively narrow absorption band (e.g., in some embodiments, a range of about 20 nm) of wavelengths around 500 nm. In some such embodiments, lens 13 includes one or more wavelength-selective absorbing materials (e.g., in some embodiments, one or more organic dyes) that preferentially absorb a relatively narrow absorption band (e.g., in some embodiments, a range of about 20 nm) of wavelengths around 580 nm. In other embodiments, lens 13 (in some embodiments, with polarization and in other embodiments, without polarization) is implemented as a single-layer polymer lens that includes one or more wavelength-selective absorbing organic dyes that preferentially absorb a relatively narrow absorption band of wavelengths around 500 nm, but which does not have additives that preferentially absorb a relatively narrow absorption band of wavelengths around 580 nm.

Referring again to FIG. 1A1, in some embodiments, graphs 1111 include horizontal lines 121, 122, and 123 that illustrate average-passband-transmission percentages at red, green, and blue (RGB), respectively, for one embodiment of 500 & 580 No Polarization lens 12 of the present invention (also referred to as the Present Invention No Polarization (PINP) lens 12) represented by plotted transmission curve 120. In some embodiments, as shown on graphs 1111, the RGB passband-averages for PINP lens 12 are 36% (the average transmission 121 of red wavelengths in the range of 600 nm to 640 nm, inclusive, hereinafter referred to as the "primary red passband"), 26% (the average transmission 122 of green wavelengths in the range of 520 nm to 560 nm, inclusive, hereinafter referred to as the "primary green passband"), and 22% (the average transmission 123 of blue wavelengths in the range of 440 nm to 480 nm, inclusive, hereinafter referred to as the "primary blue passband").

In some embodiments, graphs 1111 include horizontal lines 111, 112, and 113 that illustrate RGB average-passband-transmission percentages for the 500 & 580 Brown Polarized lens 11 embodiment of the present invention represented by plotted transmission curve 110. In some embodiments, as shown on graphs 1111, the RGB passband-averages for 500 & 580 Brown Polarized are 25% (primary red passband average transmission 111), 15% (primary green passband average transmission 112), and 9% (primary blue passband average transmission 113).

In some embodiments, graphs 1111 include horizontal lines 131, 132, and 133 that illustrate RGB average-passband-transmission percentages for the 500 & 580 Gray Polarized lens 13 embodiment of the present invention. In some embodiments, as shown on graphs 1111, the RGB averages for 500 & 580 Gray Polarized are 19% (primary red passband average transmission 131), 15% (primary green passband average transmission 132), and 17% (primary blue passband average transmission 133).

In some embodiments, graphs 1111 include horizontal line 129, which illustrates the average transmission percentage of PINP lens 12 across a wavelength range of 400 to 700 nanometers (i.e., 27% average transmission across the wideband visible-light range 400 nm to 700 nm, inclusive). In some embodiments, graphs 1111 include horizontal line 119, which illustrates the average transmission percentage of 500 & 580 Brown Polarized 11 across a wavelength range of 400 to 700 nanometers (i.e., 17% average transmission across the range 400 nm to 700 nm, inclusive). In some embodiments, graphs 1111 include horizontal line 139, which illustrates the average transmission percentage of 500 & 580 Gray Polarized lens 13 across a wavelength range of 400 to 700 nanometers (i.e., 16% average transmission across the range 400 nm to 700 nm, inclusive).

FIG. 1A2 is a set of spectral graphs 1112 comparing spectral light-transmission curves 114, 124, and 134 at various wavelengths to various averages of the light-transmission curves 114, 124, and 134 across the various wavelengths. In some embodiments, curves 114, 124, and 134 of FIG. 1A2 are similar to curves 110, 120, and 130 of FIG. 1A1, except that curves 114, 124, and 134 omit the yellow absorption band at 580 nm. In some embodiments, curve 134 represents the spectral transmission of a lens 13 embodiment of the present invention that includes absorption at 500 nanometers, has a gray tint, and is polarized (also referred to herein as "500-block-only Gray Polarized"). In some embodiments, curve 124 represents the spectral transmission of a lens 12 embodiment of the present invention that includes absorption at 500 nanometers and is not polarized (also referred to herein as "500-block-only No Polarization"). In some embodiments, curve 114 represents the spectral transmission of a lens 11 embodiment of the present invention that includes absorption at 500 nanometers, has a brown tint, and is polarized (also referred to herein as "500-block-only Brown Polarized"). In some embodiments, graphs 1112 include horizontal lines 121, 122, and 123 that illustrate RGB average-transmission percentages (of the primary red passband, the primary green passband, and the primary blue passband, respectively) for the 500-block-only No Polarization lens 12 embodiment of the present invention. In some embodiments, as shown on graphs 1112, the RGB transmission averages for 500-block-only No Polarization lens 12 are 36% (primary red passband), 26% (primary green passband), and 22% (primary blue passband). In some embodiments, graphs 1112 include curves 111, 112, and 113 that illustrate RGB average-transmission percentages (of the primary red passband, the primary green passband, and the primary blue passband, respectively) for the 500-block-only Brown Polarized lens 11 embodiment of the present invention. In some embodiments, as shown on graphs 1112, the RGB transmission averages for 500-block-only Brown Polarized are 25% (primary red passband), 15% (primary green passband), and 9% (primary blue passband). In some embodiments, graphs 1112 include curves 131, 132, and 133 that illustrate RGB average-transmission percentages for the 500-block-only Gray Polarized embodiment of the present invention. In some embodiments, as shown on graphs 1112, the RGB transmission averages for 500-block-only Gray Polarized are 19% (primary red passband), 15% (primary green passband), and 17% (primary blue passband). Horizontal line 117 represents the average transmission of all wavelengths of light in the range 400 nm to 700 nm through one embodiment of a brown lens 11 of the present invention (about 18%), horizontal line 127 represents the average transmission of all wavelengths of light in the range 400 nm to 700 nm through one embodiment of a PINP lens 12 of the present invention (about 29%), and horizontal line 137 represents the average transmission of all wavelengths of light in the range 400 nm to 700 nm through one embodiment of a gray lens 13 of the present invention (about 17%). Horizontal line 116 represents 20% times the value of horizontal line 117 of a brown lens 11, horizontal line 126 represents 20% times the value of horizontal line 127 of a PINP lens 12, and horizontal line 136 represents 20% times the value of horizontal line 137 of a gray lens 13.

In some embodiments, graphs 1112 include curve 127, which illustrates the average transmission percentage of 500-block-only No Polarization across a wavelength range of 400 to 700 nanometers (i.e., 29%). In some embodiments, graphs 1112 include curve 117, which illustrates the average transmission percentage of 500-block-only Brown Polarized across a wavelength range of 400 to 700 nanometers (i.e., 18%). In some embodiments, graphs 1112 include curve 137, which illustrates the average transmission percentage of 500-block-only Gray Polarized across a wavelength range of 400 to 700 nanometers (i.e., 17%).

FIG. 1B is a spectral graph 1120 that illustrates light-transmission curve 88 at various wavelengths. Note here that there is no cyan absorption band that has a local minimum in the range of 490 nm to 510 nm; rather there is a severe absorption band at about 475 nm that block substantial amounts of blue light between 460 nm and 490 nm. The lens has a wideband transmission average of about 24% across the range of wavelengths from 380 nm to 700 nm.

FIG. 1C1 is a spectral graph 1131 that illustrates light-transmission curve 99 at various wavelengths of a lens according to a conventional or current 580-only blocking embodiment. Note here too that there is no cyan absorption band that has a local minimum in the range of 490 nm to 510 nm. The yellow enhanced absorption band has a minimum transmission of 3.2%, and the lens has a wideband transmission average of about 15% across the range of wavelengths from 380 nm to 700 nm.

FIG. 1C2 is a set of spectral graphs 1132 that illustrate details of the spectral graphs set forth in FIG. 1A1. In some embodiments, the y-axis of graphs 1132 is magnified (compared to graphs 1111 of FIG. 1A1) to a range of zero (0) to fifty (50) percent transmission. The horizontal line 128 represents a level of 20% of the value of horizontal line 129 that indicates the average transmission from 400 nm to 700 nm of lens 12. In some embodiments, the present invention provides a lens that transmits the wavelengths in the cyan absorption band of 490 nm to 510 nm at a level of at least 20% of the average transmission from 400 nm to 700 nm of that lens, and that transmit the wavelengths in the yellow absorption band of 570 nm to 590 nm at a level of at least 20% of the average transmission from 400 nm to 700 nm of that lens. In some embodiments, this enhances safety for persons wearing such sunglasses while driving vehicles because the lens passes enough of the cyan wavelengths of 490 nm to 510 nm so the user can easily see "green" traffic signals that use cyan LEDs for illumination, and the lens passes enough of the yellow wavelengths of 570 nm to 590 nm so the user can easily see amber/yellow traffic signals that use yellow LEDs for illumination. The various reference numbers in FIG. 1C2 correspond to those same numbers in the description of FIG. 1A1.

FIG. 1C3 is a set of spectral graphs 1133 that illustrate details of the spectral graphs set forth in FIG. 1A2. In some embodiments, the y-axis of graphs 1133 is magnified (compared to graphs 1112 of FIG. 1A2) to a range of zero (0) to fifty (50) percent transmission. The various reference numbers in FIG. 1C3 correspond to those same numbers in the description of FIG. 1A2.

FIG. 1D1 is a spectral graph 1141 that illustrates the spectral light-transmission curve 130 at various wavelengths in the range of 380 nm to 780 nm of one embodiment of lens 13 of the present invention. The various reference numbers in FIG. 1D1 correspond to those same numbers in the description of FIG. 1A1. Note that the wideband average transmission 169 of lens 13 on this graph is computed on the wavelength range of 380 nm to 700 nm, which results in a lower average transmission (15%) as compared to the FIG. 1A1 and FIG. 1D2 wideband average transmission (16%), which is computed on the wavelength range of 400 nm to 700 nm.

Note that transmission curve 130 has a cyan minimum 165 (of 8.5% transmission) in the range 150 of wavelengths from 490 nm to 510 nm, a blue maximum 163 (of 19% transmission) in the 50 nm-wide range of blue wavelengths from 440 nm to 490 nm, a green maximum 162 (of 16% transmission) in the 50 nm-wide range of green wavelengths from 520 nm to 570 nm, and that for this embodiment, the cyan minimum 165 of 8.5% is about 55% of the green maximum 162 (of 16%), which is the smaller of the blue maximum 163 and the green maximum 162. In other embodiments, the cyan minimum 165 is no more than (i.e., less than or equal to) 80% of the smaller of the blue maximum 163 and the green maximum 162. In other embodiments, the cyan minimum 165 is no more than (i.e., less than or equal to) 70% of the smaller of the blue maximum 163 and the green maximum 162. In other embodiments, the cyan minimum 165 is no more than (i.e., less than or equal to) 60% of the smaller of the blue maximum 163 and the green maximum 162. In other embodiments, the cyan minimum 165 is no more than (i.e., less than or equal to) 50% of the smaller of the blue maximum 163 and the green maximum 162. In other embodiments, the cyan minimum 165 is no more than (i.e., less than or equal to) 40% of the smaller of the blue maximum 163 and the green maximum 162. In other embodiments, the cyan minimum 165 is no more than (i.e., less than or equal to) 30% of the smaller of the blue maximum 163 and the green maximum 162. In some embodiments, the cyan minimum 165 is no less than (i.e., greater than or equal to) 20% of the 380 nm to 700 nm wideband average transmission 169 of lens 13.

In the embodiment shown in FIG. 1D1, the cyan absorption band dip has a full-width half-minimum 167 (FWHM'; as distinguished from a full-width half-maximum, or FWHM, of a passband) that is measured at a level of half way between the cyan minimum 165 and the smaller of the blue maximum 163 and the green maximum 162. In this embodiment, the cyan absorption band dip FWHM' 167 is about 22 nm. In some embodiments, the cyan absorption band dip FWHM' 167 is in a range of about 10 nm to 30 nm; preferably in a range of about 15 nm to 25 nm, more preferably in a range of about 17 nm to 23 nm, and yet more preferably in a range of about 18 nm to 22 nm.

Note also that transmission curve 130 has a yellow minimum 164 (of 5.4% transmission) in the range 140 of yellow wavelengths from 570 nm to 590 nm, a red maximum 166 (of 23% transmission) in the 50 nm-wide range of blue wavelengths from 600 nm to 650 nm, and that for this embodiment, the yellow minimum of 5.4% is about 35% of the green maximum 162 (of 16%), which is the smaller of the red maximum 166 and the green maximum 162. In other embodiments, the yellow minimum 164 is no more than (i.e., less than or equal to) 80% of the smaller of the blue maximum 163 and the green maximum 162. In other embodiments, the yellow minimum 164 is no more than (i.e., less than or equal to) 70% of the smaller of the blue maximum 163 and the green maximum 162. In other embodiments, the yellow minimum 164 is no more than (i.e., less than or equal to) 60% of the smaller of the blue maximum 163 and the green maximum 162. In other embodiments, the yellow minimum 164 is no more than (i.e., less than or equal to) 50% of the smaller of the blue maximum 163 and the green maximum 162. In other embodiments, the yellow minimum 164 is no more than (i.e., less than or equal to) 40% of the smaller of the blue maximum 163 and the green maximum 162. In other embodiments, the yellow minimum 164 is no more than (i.e., less than or equal to) 30% of the smaller of the blue maximum 163 and the green maximum 162. In some embodiments, the yellow minimum 164 is no less than (i.e., greater than or equal to) 20% of the 380 nm to 700 nm wideband average transmission 169 of lens 13.

In the embodiment shown in FIG. 1D1, the yellow absorption band dip has a full-width half-minimum 168 (FWHM' 168) that is measured at a level of half way between the yellow minimum 164 and the smaller of the red maximum 166 and the green maximum 162. In this embodiment, the yellow absorption band dip FWHM' 168 is about 18 nm. In some embodiments, the yellow absorption band dip FWHM' 168 is in a range of about 10 nm to 30 nm; preferably in a range of about 15 nm to 25 nm, more preferably in a range of about 17 nm to 23 nm, and yet more preferably in a range of about 18 nm to 22 nm.

FIG. 1D2 is a set of spectral graphs 1142 comparing the spectral light-transmission curve 130 of a gray polarized lens 13 at various wavelengths to various narrowband and wideband averages of the spectral light-transmission curve 130 across the various wavelengths. In some embodiments, transmission curve 130 has a blue passband average transmission 133 (in this case about 17%) for wavelengths in the 40 nm-wide range 440 nm to 480 nm, a green passband average transmission 132 (in this case about 15%) for wavelengths in the 40 nm-wide range 520 nm to 560 nm, and a red passband average transmission 131 (in this case about 19%) for wavelengths in the 40 nm-wide range 600 nm to 640 nm. The wideband average transmission horizontal line 139 (in this case, about 16%) is measured over the range of wavelengths 400 nm to 700 nm, and the horizontal line 138 represents 20% of the value 139 (in this case, about 3.2%).

In contrast to the absorption-band-width definitions set forth for FIG. 1D1, FIG. 1D2 provides slightly different definitions that utilize formulae based on the average passband transmission values measured over 40-nm-wide passbands that are on either side of the cyan and yellow absorption bands. In the embodiment shown in FIG. 1D2, the cyan absorption band dip has a full-width half-dip 177 (FWHD; as distinguished from FWHM' described above) that is measured at a level of half way between the cyan minimum 165, and the smaller of the blue passband average 133 and the green passband average 132. In this embodiment, the cyan absorption band dip FWHD 167 is about 21 nm. In some embodiments, the cyan absorption band dip FWHD 177 is in a range of about 10 nm to 30 nm; preferably in a range of about 15 nm to 25 nm, more preferably in a range of about 17 nm to 23 nm, and yet more preferably in a range of about 18 nm to 22 nm. In the embodiment shown in FIG. 1D1, the yellow absorption band dip has a FWHM' 168 that is measured at a level of half way between the yellow minimum 164 and the smaller of the red passband average 131 and the green passband average 132. In this embodiment, the yellow absorption band dip FWHD 178 is about 17 nm. In some embodiments, the yellow absorption band dip FWHD 168 is in a range of about 10 nm to 30 nm; preferably in a range of about 15 nm to 25 nm, more preferably in a range of about 17 nm to 23 nm, and yet more preferably in a range of about 18 nm to 22 nm.

FIG. 1D3 is a set of spectral graphs 1143 comparing the spectral light-transmission curve 134 of a gray 500 nm-only lens 13 at various wavelengths to various averages of the spectral light-transmission curve 134 across the various wavelengths. Curve 134 represents a gray sunglass lens that has a cyan absorption band but substantially no yellow absorption band (i.e., the light transmission for any wavelengths in the range of 570 nm to 590 nm is no less than 90% of the average of the green passband average transmission 132 for wavelengths in the range 520 nm to 560 nm and the red passband average transmission 131 for wavelengths in the range 600 nm to 640 nm. Other than the lack of a yellow absorption band, curve 134 for gray 500 nm-only lens 13 is substantially the same as set forth in the description of FIG. 1D2.

FIG. 1E1 is a spectral graph 1151 that illustrates the spectral light-transmission curve 120 of a no-polarization lens 12 at various wavelengths according to one embodiment of the present invention. The various reference numbers in FIG. 1E1 correspond to those same numbers in the description of FIG. 1A1. Note that the wideband average transmission 179 of lens 12 on this graph is computed on the wavelength range of 380 nm to 780 nm, which results in a higher average transmission (35%) as compared to the FIG. 1A1 and FIG. 1E2 wideband average transmission 129 (27%), which is computed on the wavelength range of 400 nm to 700 nm.

Note that transmission curve 120 has a cyan minimum 175 (of 5.7% transmission) in the range 150 of wavelengths from 490 nm to 510 nm, a blue maximum 173 (of ~30% transmission) in the 50 nm-wide range of blue wavelengths from 440 nm to 490 nm, a green maximum 172 (of ~31% transmission) in the 50 nm-wide range of green wavelengths from 520 nm to 570 nm, and that for this embodiment, the cyan minimum 175 of 5.7% is about 19% of the green maximum 172 (of ~31%), which is the smaller of the blue maximum 173 and the green maximum 172. In other embodiments, the cyan minimum 175 is no more than (i.e., less than or equal to) 80% of the smaller of the blue maximum 173 and the green maximum 172. In other embodiments, the cyan minimum 175 is no more than (i.e., less than or equal to) 70% of the smaller of the blue maximum 173 and the green maximum 172. In other embodiments, the cyan minimum 175 is no more than (i.e., less than or equal to) 60% of the smaller of the blue maximum 173 and the green maximum 172. In other embodiments, the cyan minimum 175 is no more than (i.e., less than or equal to) 50% of the smaller of the blue maximum 173 and the green maximum 172. In other embodiments, the cyan minimum 175 is no more than (i.e., less than or equal to) 40% of the smaller of the blue maximum 173 and the green maximum 172. In other embodiments, the cyan minimum 175 is no more than (i.e., less than or equal to) 30% of the smaller of the blue maximum 173 and the green maximum 172. In some embodiments, the cyan minimum 175 is no less than (i.e., greater than or equal to) 20% of the 400 nm to 700 nm wideband average transmission 129 of lens 12.

In the embodiment shown in FIG. 1E1, the cyan absorption band dip FWHD 177 that is measured at a level of half way between the cyan minimum 165 and the smaller of the blue average 123 and the green average 122. In this embodiment, the cyan absorption band dip FWHD 177 is about 27 nm. In some embodiments, the cyan absorption band dip FWHD 177 is in a range of about 10 nm to 30 nm; preferably in a range of about 15 nm to 25 nm, more preferably in a range of about 17 nm to 23 nm, and yet more preferably in a range of about 18 nm to 22 nm.

Note also that transmission curve 120 has a yellow minimum 174 (of 4.1% transmission) in the range 140 of yellow wavelengths from 570 nm to 590 nm, a red maximum 171 (of 47% transmission) in the 50 nm-wide range of blue wavelengths from 600 nm to 650 nm, and that for this embodiment, the yellow minimum 174 of 4.1% is about 13% of the green maximum 172 (of ~31%), which is the smaller of the red maximum 171 and the green maximum 172. In other embodiments, the yellow minimum 174 is no more than (i.e., less than or equal to) 80% of the smaller of the blue maximum 173 and the green maximum 172. In other embodiments, the yellow minimum 174 is no more than (i.e., less than or equal to) 70% of the smaller of the blue maximum 173 and the green maximum 172. In other embodiments, the yellow minimum 174 is no more than (i.e., less than or equal to) 60% of the smaller of the blue maximum 173 and the green maximum 172. In other embodiments, the yellow minimum 174 is no more than (i.e., less than or equal to) 50% of the smaller of the blue maximum 173 and the green maximum 172. In other embodiments, the yellow minimum 174 is no more than (i.e., less than or equal to) 40% of the smaller of the blue maximum 173 and the green maximum 172. In other embodiments, the yellow minimum 174 is no more than (i.e., less than or equal to) 30% of the smaller of the blue maximum 173 and the green maximum 172. In some embodiments, the yellow minimum 174 is no less than (i.e., greater than or equal to) 20% of the 400 nm to 700 nm wideband average transmission 129 of lens 12.

In the embodiment shown in FIG. 1E1, the yellow absorption band FWHD 178 that is measured at a level of half way between the yellow minimum 174 and the smaller of the red average 121 and the green average 122. In this embodiment, the yellow absorption band dip FWHD 178 is about 20 nm. In some embodiments, the yellow absorption band dip FWHD 178 is in a range of about 10 nm to 30 nm; preferably in a range of about 15 nm to 25 nm, more preferably in a range of about 17 nm to 23 nm, and yet more preferably in a range of about 18 nm to 22 nm.

FIG. 1E2 is a set of spectral graphs 1152 comparing the spectral light-transmission curve 120 of a 500 & 580 PINP lens 12 at various wavelengths to various averages of the spectral light-transmission curve 120 across the various wavelengths. The various reference numbers in FIG. 1E2 correspond to those same numbers in the description of FIG. 1A1 and FIG. 1E1. Curve 120 represents a lens 12 that passes more blue and green light than a polarized lens such as represented by curves 130 and 110 of FIG. 1A1. In some embodiments, the primary red passband average 121 is about 36% over the red wavelength range 600 nm to 640 nm, the primary green passband average 122 is about 26% over the green wavelength range 520 nm to 560 nm, and the primary blue passband average 123 is about 22% over the blue wavelength range 600 nm to 640 nm. The wideband transmission average 129 (about 27%) is measured over the visible-light wavelength range 400 nm to 700 nm, and the horizontal line 128 (at about 5.4%) is 20% times the value of wideband transmission average 129. In some embodiments, (not shown here), both the cyan minimum 175 and the yellow minimum 174 are no less than the value 128 (20% times wideband transmission average 129).

FIG. 1E3 is a set of spectral graphs 1153 comparing the spectral light-transmission curve 124 of a 500-block-only PINP lens 12 at various wavelengths to various averages of the spectral light-transmission curve 124 across the various wavelengths. Curve 124 represents a non-polarized sunglass lens that has a cyan absorption band but substantially no yellow absorption band (i.e., the light transmission for any wavelengths in the range of 570 nm to 590 nm is no less than 90% of the average of the green passband average transmission 122 for wavelengths in the range 520 nm to 560 nm and the red passband average transmission 121 for wavelengths in the range 600 nm to 640 nm. Other than the lack of a yellow absorption band, curve 124 for PINP 500 nm-only lens 12 is substantially the same as set forth in the description of FIG. 1E2.

FIG. 1F1 is a spectral graph 1161 that illustrates the spectral light-transmission curve 110 for a brown-tint polarized lens 11 at various wavelengths, according to some embodiments of the present invention. The various reference numbers in FIG. 1F1 correspond to those same numbers in the description of FIG. 1A1. Note that the wideband average transmission 189 of lens 11 on this graph is computed on the wavelength range of 380 nm to 700 nm, which results in an average transmission (about 16%), which is lower than the wideband average transmission 119 (about 17%) of lens 11 on FIG. 1E2 that is computed on the wavelength range of 400 nm to 700 nm.

Note that transmission curve 110 has a cyan minimum 185 (of 5.9% transmission) in the range 150 of wavelengths from 490 nm to 510 nm, a blue maximum 183 (of ~10% transmission) in the 50 nm-wide range of blue wavelengths from 440 nm to 490 nm, a green maximum 182 (of ~17% transmission) in the 50 nm-wide range of green wavelengths from 520 nm to 570 nm, and that for this embodiment, the cyan minimum 185 of 5.9% is about 60% of the blue maximum 183 (of ~10%), which is the smaller of the blue maximum 183 and the green maximum 182. In other embodiments, the cyan minimum 185 is no more than (i.e., less than or equal to) 80% of the smaller of the blue maximum 183 and the green maximum 182. In other embodiments, the cyan minimum 185 is no more than (i.e., less than or equal to) 70% of the smaller of the blue maximum 183 and the green maximum 182. In other embodiments, the cyan minimum 185 is no more than (i.e., less than or equal to) 60% of the smaller of the blue maximum 183 and the green maximum 182. In other embodiments, the cyan minimum 185 is no more than (i.e., less than or equal to) 50% of the smaller of the blue maximum 183 and the green maximum 182. In other embodiments, the cyan minimum 185 is no more than (i.e., less than or equal to) 40% of the smaller of the blue maximum 183 and the green maximum 182. In other embodiments, the cyan minimum 185 is no more than (i.e., less than or equal to) 30% of the smaller of the blue maximum 183 and the green maximum 182. In some embodiments, the cyan minimum 185 is no less than (i.e., greater than or equal to) 20% of the 400 nm to 700 nm wideband average transmission 119 of lens 11. In the embodiment shown in FIG. 1E1, the cyan absorption band dip FWHM' 187 that is measured at a level of half way between the cyan minimum 165 and the smaller of the blue average 113 and the green average 112. In this embodiment, the cyan absorption band dip FWHM' 187 is about 19 nm. In some embodiments, the cyan absorption band dip FWHM' 187 is in a range of about 10 nm to 30 nm; preferably in a range of about 15 nm to 25 nm, more preferably in a range of about 17 nm to 23 nm, and yet more preferably in a range of about 18 nm to 22 nm.

Note also that transmission curve 110 has a yellow minimum 184 (of 7.1% transmission) in the range 140 of yellow wavelengths from 570 nm to 590 nm, a red maximum 181 (of ~30% transmission) in the 50 nm-wide range of blue wavelengths from 600 nm to 650 nm, and that for this embodiment, the yellow minimum 184 of 7.1% is about 42% of the green maximum 182 (of ~17%), which is the smaller of the red maximum 181 and the green maximum 182. In other embodiments, the yellow minimum 184 is no more than (i.e., less than or equal to) 80% of the smaller of the blue maximum 183 and the green maximum 182. In other embodiments, the yellow minimum 184 is no more than (i.e., less than or equal to) 70% of the smaller of the blue maximum 183 and the green maximum 182. In other embodiments, the yellow minimum 184 is no more than (i.e., less than or equal to) 60% of the smaller of the blue maximum 183 and the green maximum 182. In other embodiments, the yellow minimum 184 is no more than (i.e., less than or equal to) 50% of the smaller of the blue maximum 183 and the green maximum 182. In other embodiments, the yellow minimum 184 is no more than (i.e., less than or equal to) 40% of the smaller of the blue maximum 183 and the green maximum 182. In other embodiments, the yellow minimum 184 is no more than (i.e., less than or equal to) 30% of the smaller of the blue maximum 183 and the green maximum 182. In some embodiments, the yellow minimum 184 is no less than (i.e., greater than or equal to) 20% of the 400 nm to 700 nm wideband average transmission 119 of lens 11.

In the embodiment shown in FIG. 1F1, the yellow absorption band FWHM' 188 that is measured at a level of half way between the yellow minimum 184 and the smaller of the red average 181 and the green average 182. In this embodiment, the yellow absorption band dip FWHD 188 is about 18 nm. In some embodiments, the yellow absorption band dip FWHM' 188 is in a range of about 10 nm to 30 nm; preferably in a range of about 15 nm to 25 nm, more preferably in a range of about 17 nm to 23 nm, and yet more preferably in a range of about 18 nm to 22 nm.

FIG. 1F2 is a set of spectral graphs 1162 comparing the spectral light-transmission curve 110 at various wavelengths to various averages of the spectral light-transmission curve 110 across the various wavelengths. The various reference numbers in FIG. 1F2 correspond to those same numbers in the description of FIG. 1A1 and FIG. 1F1. Curve 110 represents a brown-tinted lens 11 that passes less blue and more red light than a polarized gray-tinted lens such as represented by curves 130 of FIG. 1A1. In some embodiments, the primary red passband average 111 is about 25% over the red wavelength range 600 nm to 640 nm, the primary green passband average 112 is about 15% over the green wavelength range 520 nm to 560 nm, and the primary blue passband average 113 is about 9% over the blue wavelength range 600 nm to 640 nm. The wideband transmission average 119 (about 17%) is measured over the visible-light wavelength range 400 nm to 700 nm, and the horizontal line 118 (at about 3.4%) is 20% times the value of wideband transmission average 119. In some embodiments, both the cyan minimum 185 and the yellow minimum 184 are no less than the value 118 (20% times wideband transmission average 119).

FIG. 1F3 is a set of spectral graphs 1163 comparing the spectral light-transmission curve 114 of a 500-block-only Brown lens 11 at various wavelengths to various averages of the spectral light-transmission curve 114 across the various wavelengths. Curve 114 represents a non-polarized sunglass lens that has a cyan absorption band but substantially no yellow absorption band (i.e., the light transmission for any wavelengths in the range of 570 nm to 590 nm is no less than 90% of the average of the green passband average transmission 112 for wavelengths in the range 520 nm to 560 nm and the red passband average transmission 111 for wavelengths in the range 600 nm to 640 nm. Other than the lack of a yellow absorption band, curve 114 for 500-block-only Brown lens 11 is substantially the same as set forth in the description of FIG. 1F2.

FIG. 1G (representing an assembled lens drawing) is a cross section view of a two-wafer system 1170 according to some embodiments of the present invention. In some embodiments, front wafer 101 and rear wafer 102 are laminated to each face of polarized film 103 with adhesive layer 104 and adhesive layer 105. In some embodiments, the concave or convex surface of front wafer 101 includes a mirror coating 106. In some embodiments, the concave surface of rear wafer 102 includes an optional anti-reflection coating. Some preferred embodiments include hydrophobic coatings on the outer surfaces of the assembled lens system. In some embodiments, it is preferred that the wafer that includes added oxides to manage the transmittance and absorption of visible light is used as the rear wafer 102 of the lens system (designated in FIG. 1A3, FIG. 1A4, FIG. 1A5, and FIG. 1G as rear wafer 102).

FIG. 2 (showing what is called herein as the tristimulus curve 210) is a graph 200 of spectral sensitivity versus wavelength detailing the peak sensitivity curves for color vision. Blue sensitivity is designated as zone B, green sensitivity is designated as zone G, and red sensitivity is designated as zone R. The BG crossover 214 of wavelength-sensitivity curves of the blue cones and green cones of the human eye occurs at about 500 nm, so by creating an absorption peak near 500 nm, the present invention will better separate the distinction between blue and green, increasing contrast and/or improving the pleasurable perception of the two colors blue and green. In some embodiments, adding to the lens an organic dye whose peak absorbance is near 500 nm creates the functional absorbance peak desired in the present invention. The GR crossover 215 of wavelength-sensitivity curves of the green cones and red cones of the human eye occurs at about 580 nm, so by creating an absorption peak near 580 nm, the present invention will better separate the distinction between green and red, increasing contrast and/or improving the pleasurable perception of the two colors green and red.

Figure 3A:
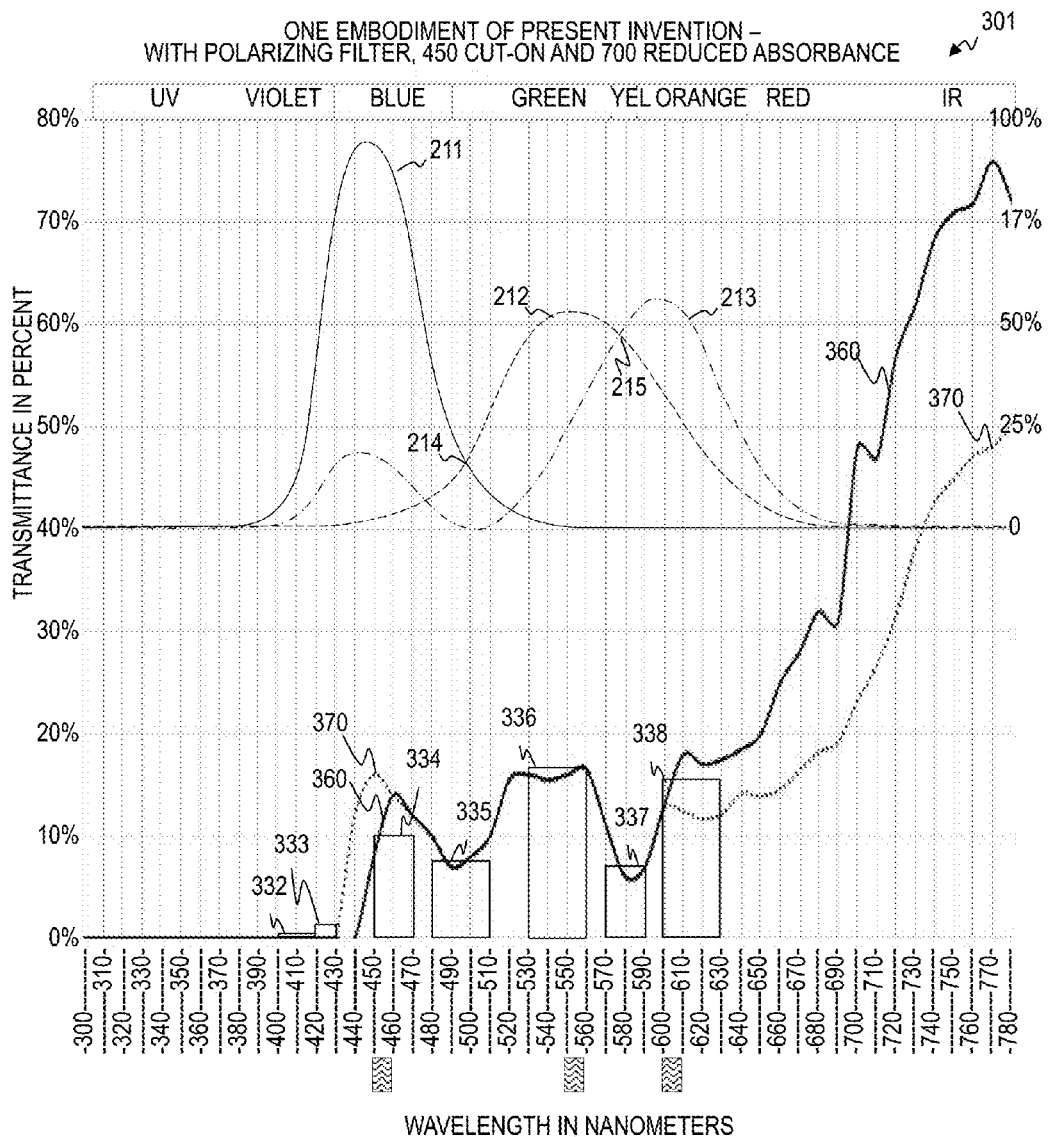
FIG. 3A is a set of spectral graphs 301 comparing the spectral light-transmission curve 360 and 370 at various wavelengths of two embodiments of the present invention to tristimulus curves 211, 212 and 213.
Figure 3B:
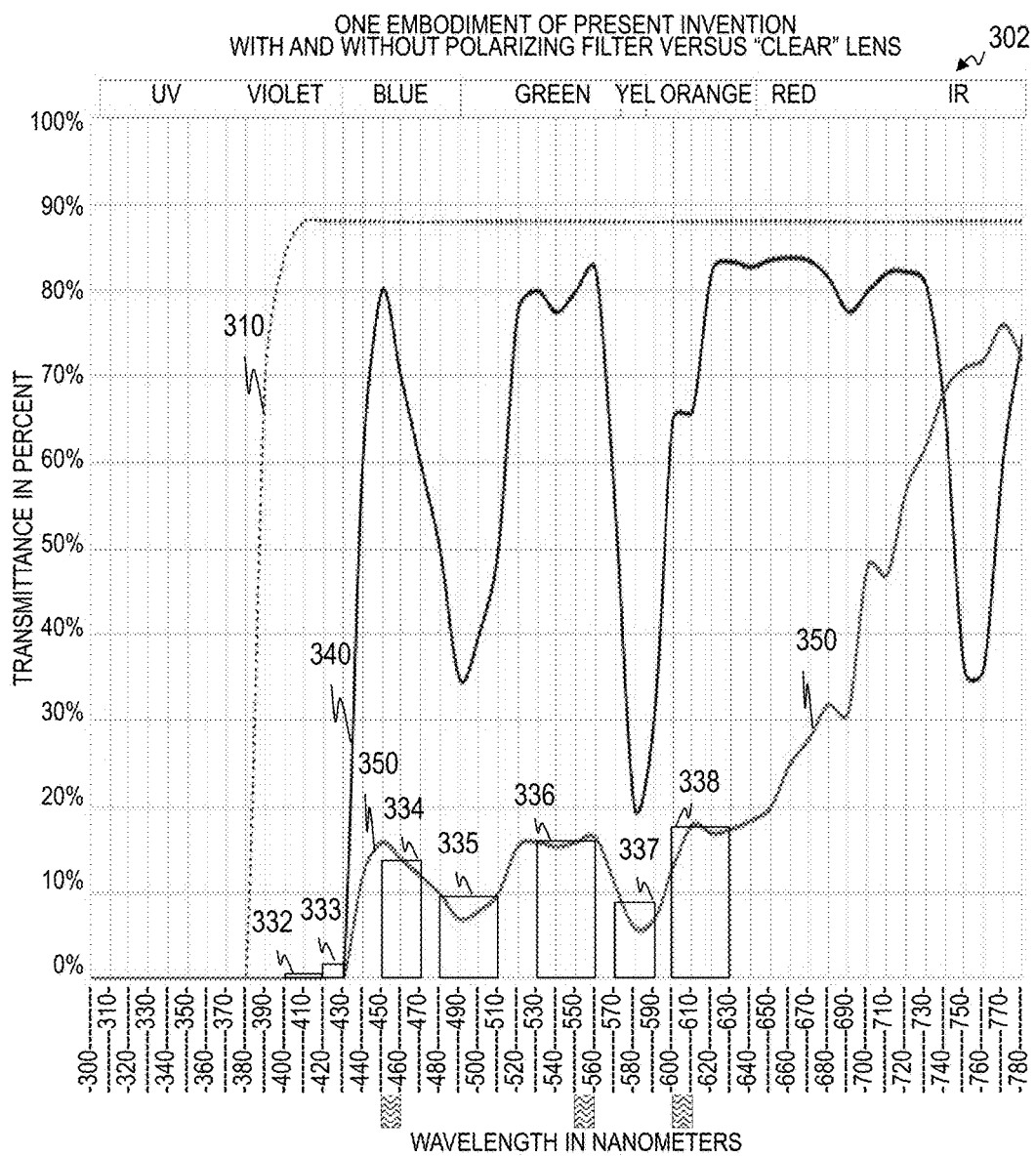
FIG. 3B is a set of spectral graphs 302 comparing the spectral light-transmission curves 340 and 350 at various wavelengths of two embodiments of the present invention to light transmission 310 at various wavelengths of a "clear" lens.

FIG. 3A is a set of spectral graphs 301 comparing the spectral light-transmission curve 360 and 370 at various wavelengths of two embodiments of the present invention to tristimulus curves 211, 212 and 213. In some embodiments, the embodiment represented by curve 370 allows more shorter-wavelength blue light at wavelengths 430 nm to 450 nm to pass than the embodiment of curve 360, but reduces light transmittance at the red wavelengths 610 nm-700 nm and the IR wavelengths from 700 nm-780 nm. In this and in later figures, the small shaded box below 450 nm to 460 nm represents the approximate range of peak blue sensitivity of the human eye, the small shaded box below 550 nm to 560 nm represents the approximate range of peak green sensitivity of the human eye, and the small shaded box below 600 nm to 610 nm represents the approximate range of peak red sensitivity of the human eye FIG. 3B is a set of spectral graphs 302 comparing the spectral light-transmission curves 340 and 350 at various wavelengths of two embodiments of the present invention to light transmission 310 at various wavelengths of a "clear" lens. In some embodiments, the embodiment represented by curve 340 does not include a polarizing film and allows much more blue light at wavelengths 430 nm to 460 nm, much more green light at wavelengths 530 nm to 560 nm and much more red light at wavelengths 600 nm to 700 nm to pass than the embodiment of curve 350 which does include a polarizing film, but reduces light in the IR wavelengths from 740 nm-770 nm.

Figure 3C:
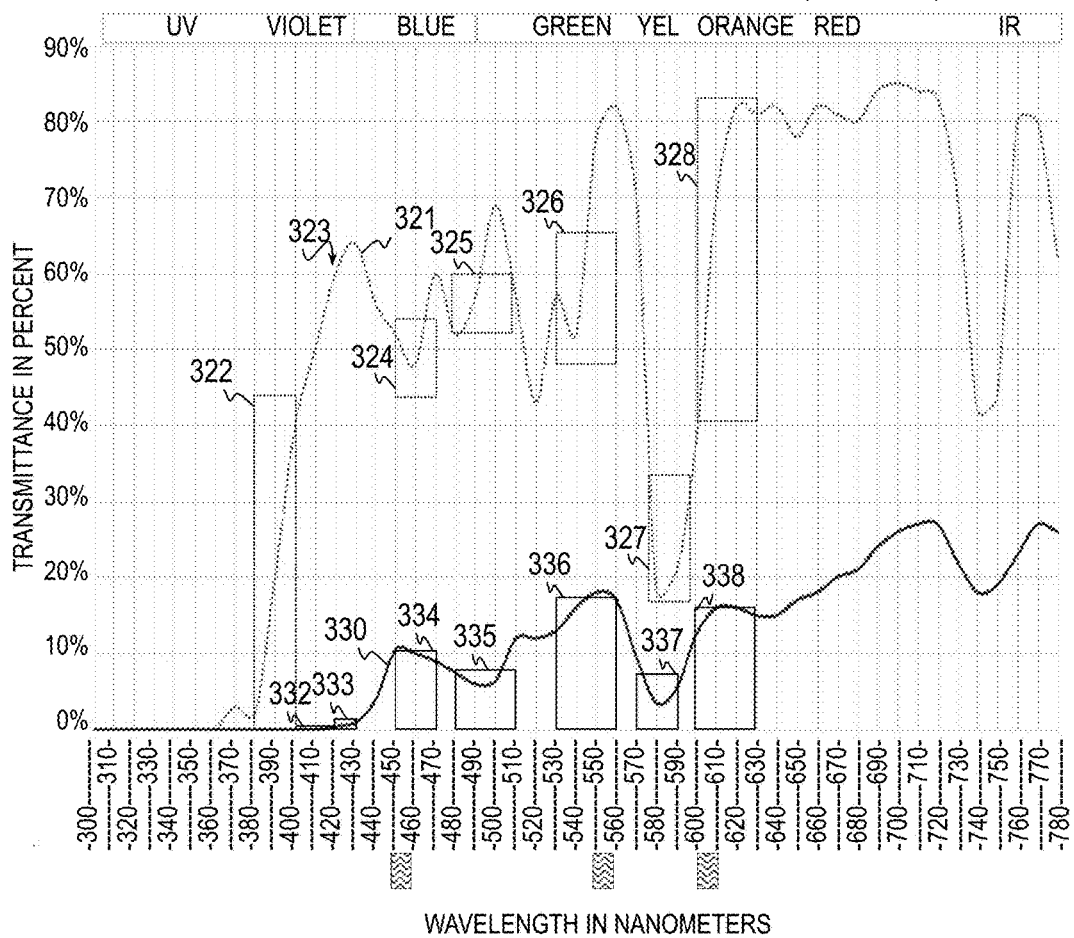
FIG. 3C is a set of spectral graphs 303 comparing the spectral light-transmission curve 330 at various wavelengths of one embodiment of the present invention to light transmission 321 at various wavelengths of a lens according to Farwig's U.S. Pat. No. 7,597,441.

FIG. 3C is a set of spectral graphs 303 comparing the spectral light-transmission curve 330 at various wavelengths of one embodiment of the present invention to light transmission 321 at various wavelengths of a lens according to Farwig's U.S. Pat. No. 7,597,441. The Farwig lens has a sharp cut on at about 380 nm and jumps to about 42% transmission at 400 nm, as detailed by the rectangular box 322, while at 430 nm the transmission 323 further jumps to 64%. These two spectral data points are significantly higher than the embodiment of the current invention set forth by spectral light-transmission curve 330. This U.S. Pat. No. 7,597,441 utilizes praseodymium to control the spectral transmission between 420 nm and 460 nm, while this embodiment of the current invention set forth by spectral light-transmission curve 330 does not require this praseodymium to create a continued increase of light transmission from about 430 nm to about 460 nm.

In some embodiments, the present invention provides nearly complete blocking of light having wavelengths in the range 400 nm-420 nm, inclusive (e.g., in some embodiments, the average transmittance of wavelengths in the range 400 nm-420 nm shown by box 332 is less than 10% of the average visible transmittance of the assembled lens (i.e., average transmittance over wavelengths 400 nm-700 nm)). In some embodiments, the present invention provides substantial blocking of light having wavelengths in the range 420 nm-430 nm, inclusive (e.g., in some embodiments, the average transmittance of wavelengths in the range 420 nm-430 nm shown by box 333 is less than 20% of the average visible transmittance of the assembled lens (i.e., average transmittance over wavelengths 400 nm-700 nm)). In some embodiments, the present invention provides a partial reduction of transmission of light having wavelengths in the range 480 nm-510 nm, inclusive (e.g., in some embodiments, the average transmittance of wavelengths in the range 480 nm-510 nm shown by box 335 is less than the average transmittance of wavelengths in the range 450 nm-470 nm shown by box 334 and between 10% and 85% of the average visible transmittance of the assembled lens (i.e., average transmittance over wavelengths 400 nm-700 nm)). In some other embodiments, the average transmittance of wavelengths in the range 480 nm-510 nm shown by box 335 is less than the average transmittance of wavelengths in the range 440 nm-470 nm (a larger range of wavelengths than shown by box 334) and between 20% and 85% of the average visible transmittance of the assembled lens (i.e., average transmittance over wavelengths 400 nm-700 nm). In some other embodiments, the average transmittance of wavelengths in the range 490 nm-510 nm (a smaller range of wavelengths than shown by box 335) is less than the average transmittance of wavelengths in the range 440 nm-470 nm (a larger range of wavelengths than shown by box 334) and between 10% and 85% of the average visible transmittance of the assembled lens (i.e., average transmittance over wavelengths 400 nm-700 nm). In some embodiments, the present invention provides a partial reduction of transmission of light having wavelengths in the range 570 nm-590 nm, inclusive (e.g., in some embodiments, the average transmittance of wavelengths in the range 570 nm-590 nm shown by box 337 is less than the average transmittance of wavelengths in the range 530 nm-560 nm shown by box 336 and between 10% and 85% of the average visible transmittance of the assembled lens (i.e., average transmittance over wavelengths 400 nm-700 nm)).

FIG. 4 is a set of spectral graphs 400 comparing the spectral light-transmission curve 330 at various wavelengths of one embodiment of the present invention to light transmission 421 at various wavelengths of a lens according to Tsutsumi's U.S. Pat. No. 6,773,816. The set of spectral graphs 400 detail in particular the disparity of spectral readings between 380 nm and 525 nm. The Tsutsumi graph 421 details light transmission of a lens of 2.2-mm thickness and 1.5-mm thickness. The 2.2-mm-thick lens has a spectral reading of about 0% at 400 nm but when reducing the thickness of this lens to 1.5 mm, the transmission jumps to 70%. At a wavelength of 430 nm, the lens according to Tsutsumi U.S. Pat. No. 6,773,816 is 1.5-mm-thick lens that has 23% transmission while the 2.2 mm thick lens has a transmission of 2.5%. The Tsutsumi lens does not address zone BG (the absorption band at about 500 nm between blue and green according to the present invention) and has no absorption peak as required by the tristimulus values for some embodiments of the present invention.

FIG. 5 is a set of spectral graphs 500 comparing the spectral light-transmission curve 330 at various wavelengths of one embodiment of the present invention to light transmission 521 at various wavelengths of a lens according to Larson's U.S. Pat. No. 6,604,824. The two improvements of this embodiment 330 of current invention over Larson U.S. Pat. No. 6,604,824 include the optional increased absorption from 410 nm through 440 nm. In Larson U.S. Pat. No. 6,604,824 there is no discussion addressing wavelengths in this region. Further, the second improvement in the present invention illustrated by curve 330 is an absorption peak found between 480 and 510 nm. This improvement creates a lower transmittance at 500 nm than at 450 nm, which is contrary to the teaching of Larson '824. In some embodiments, the way this is achieved is by adding organic dyes to either the polarized film or the adhesive or both. Two such dyes used in some embodiments are Exciton ABS 419 (a narrow-band visible light absorber available from Exiton, P.O. Box 31126, Dayton, Ohio, 45437 USA, or at www.exciton.com) or Orcosolve Chinoline (a light absorber available from Orco, 65 Valley Street, East Providence, R.I., 02914 USA or at www.organicdye.com/dyes/solvent-dyes). The second improvement in the present invention is the absorption peak created between 470 nm and 510 nm, (see the rectangle box 532 of FIGS. 5 and 532 and 1032 of FIG. 10A outlining the spectral section). Box 533 shows the absorption band centered at about 580 nm according to some embodiments of the present invention that matches that of Larson U.S. Pat. No. 6,604,824. In some embodiments, by adding an organic dye such as Exciton's P491 to the adhesive, this absorption peak is achieved.

Figure 6:
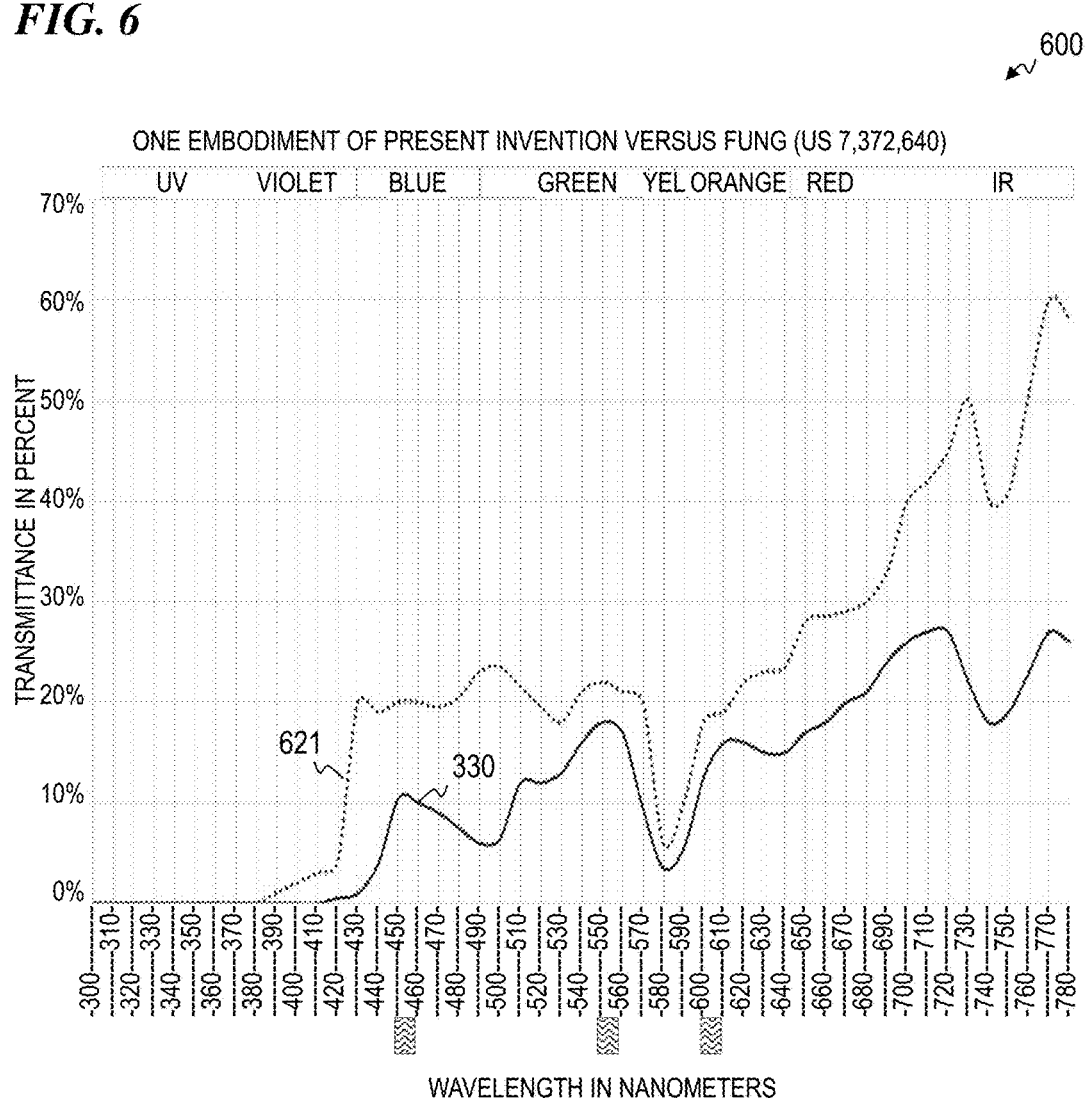
FIG. 6 is the set of spectral graphs 600 comparing the spectral light-transmission curve 330 at various wavelengths of one embodiment of the present invention to light transmission 621 at various wavelengths of a lens according to Fung's U.S. Pat. No. 7,372,640.

FIG. 6 is the set of spectral graphs 600 comparing the spectral light-transmission curve 330 at various wavelengths of one embodiment of the present invention to light transmission 621 at various wavelengths of a lens according to Fung's U.S. Pat. No. 7,372,640. Fung U.S. Pat. No. 7,372,640 describes similar or the same oxides in one of its wafers as this current invention's glass wafer. Both wafers will absorb light at short wavelengths from less than 400 nm and up to 415 nm. In some embodiments, the current invention adds an organic dye to increase absorbance in the range from 400 nm to 440 nm, which is not described by Fung. The second difference between Fung U.S. Pat. No. 7,372,640 and this current invention is the absorbance peak in the present invention between 470 nm and 510 nm (i.e., wavelengths in the range shown by box 532 of FIG. 5). Fung's U.S. Pat. No. 7,372,640 is not concerned with this spectral range and in fact when viewing FIG. 6, the transmittance a lens according to of Fung's U.S. Pat. No. 7,372,640, the transmittance of Fung's lens system and embodiments of present invention are reversed between 480 nm and 510 nm.

Figure 7:
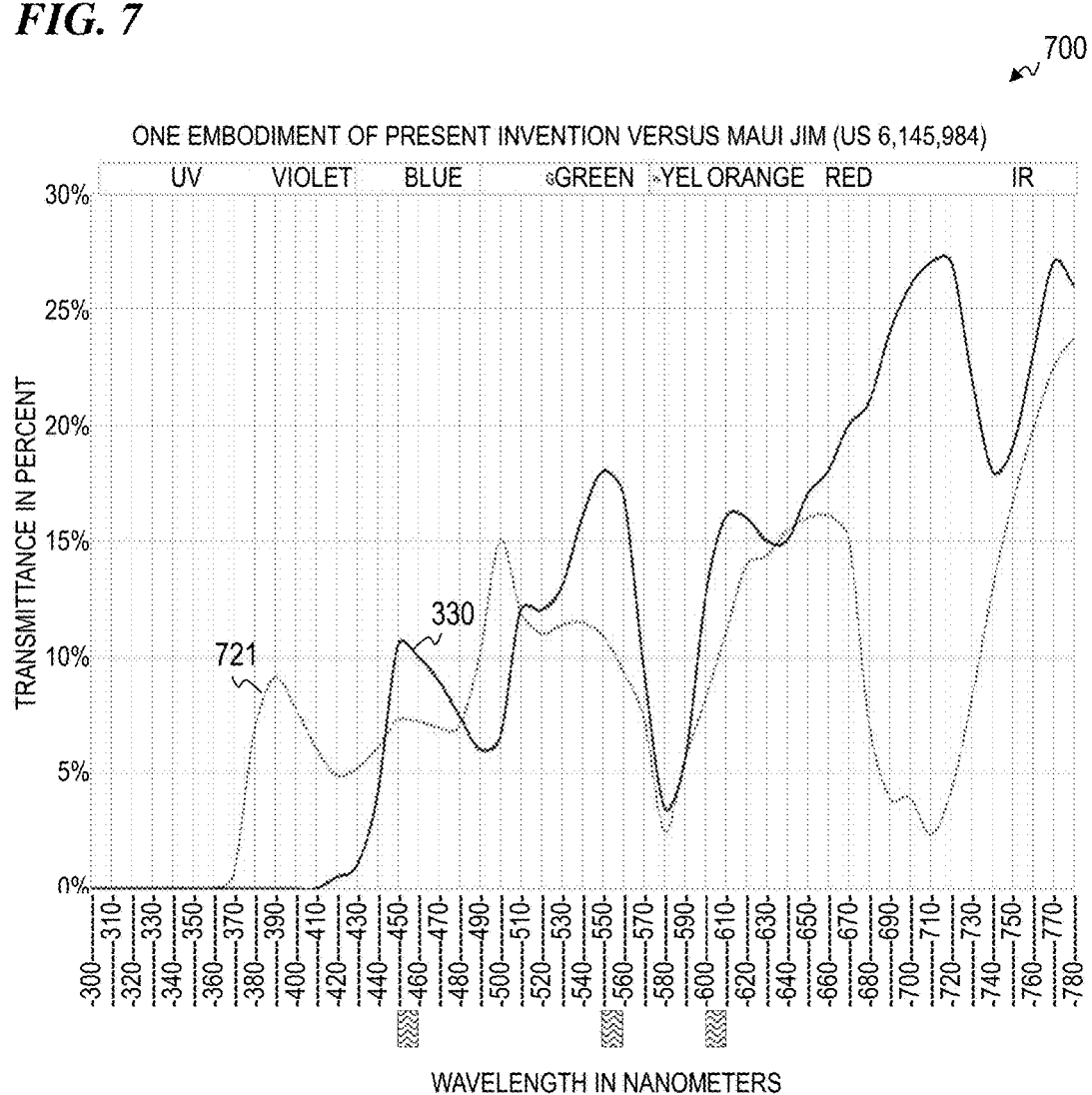
FIG. 7 is the set of spectral graphs 700 comparing the spectral light-transmission curve 330 at various wavelengths of one embodiment of the present invention to light transmission 721 at various wavelengths of a lens according to U.S. Pat. No. 6,145,984 describes three maximum transmittal peaks and two minimum transmittal peaks.

FIG. 7 is the set of spectral graphs 700 comparing the spectral light-transmission curve 330 at various wavelengths of one embodiment of the present invention to light transmission 721 at various wavelengths of a lens according to U.S. Pat. No. 6,145,984 describes three maximum transmittal peaks and two minimum transmittal peaks. The specific zones for the three maximum peaks are said to be between 420 nm and 460 nm, 480 nm and 520 nm, 610 nm and 650 nm. The minimum transmittal peak zones are said to be between 460 nm and 480 nm, 520 nm and 610 nm. The wavelength range from 300 nm to 420 nm is not addressed. The obvious difference between the current invention and MJ 984 is the current inventions from 480 nm to 510 nm have a minimum transmittance between 20% and 90% of the luminous transmission of the assembled lens system. U.S. Pat. No. 6,145,984 shows a maximum peak transmission in this same zone of at least 125% of the luminous transmission of the assembled lens system.

Figure 8:
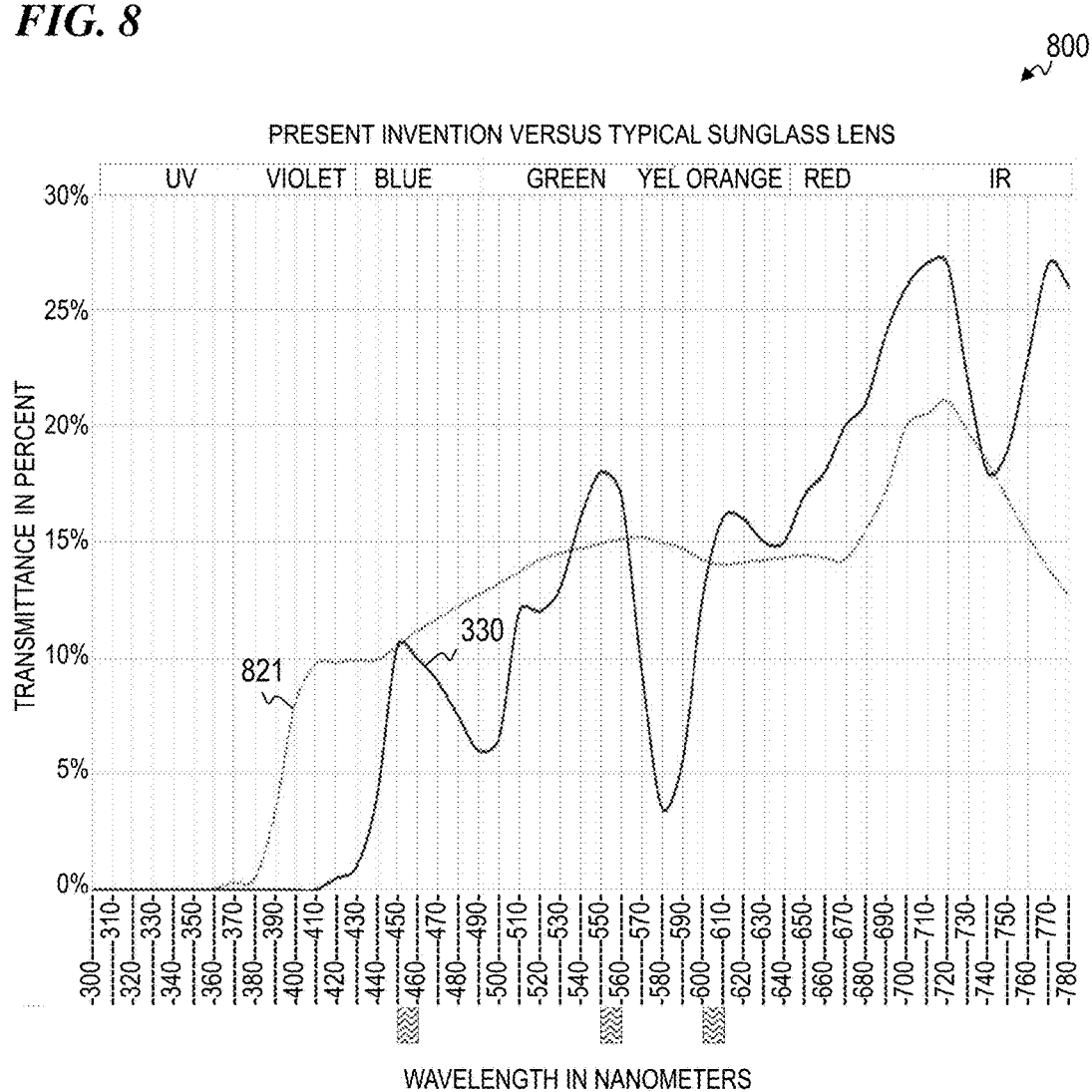
FIG. 8 is the set of spectral graphs 800 comparing the spectral light-transmission curve 330 at various wavelengths of one embodiment of the present invention to light transmission 821 at various wavelengths of a lens according to a typical sunglass lens.

FIG. 8 is the set of spectral graphs 800 comparing the spectral light-transmission curve 330 at various wavelengths of one embodiment of the present invention to light transmission 821 at various wavelengths of a lens according to a typical sunglass lens. This embodiment 330 of the current invention has three specific zones of reduced transmission (depression) as compared to the typical sunglass lens: the first is for wavelengths between 400 nm and 430 nm, the second is for wavelengths at about 500 nm, and the third is for wavelengths at about 580 nm.

Figure 9:
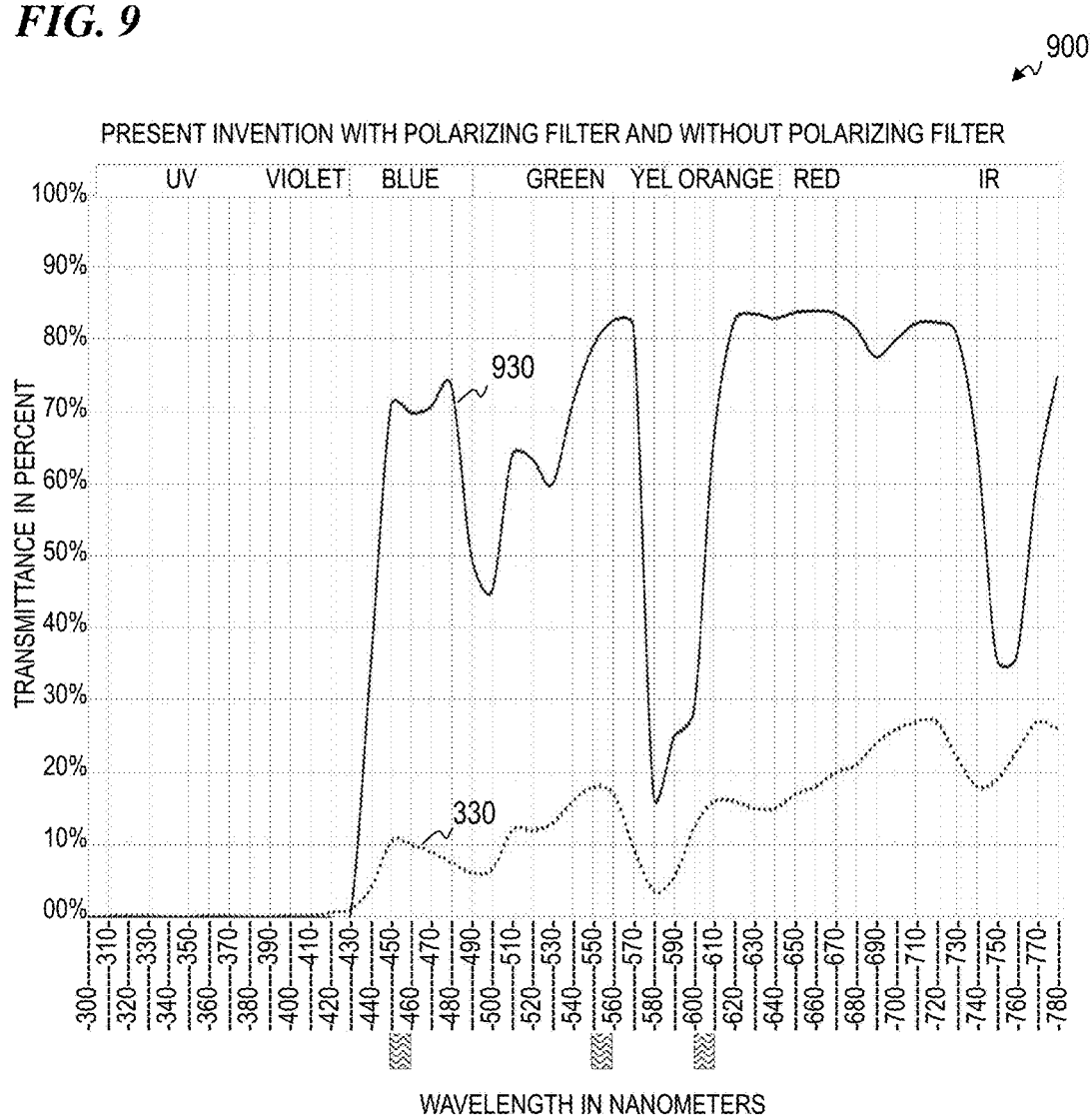
FIG. 9 is the set of spectral graphs 900 comparing the spectral light-transmission curve 330 at various wavelengths of one embodiment of the present invention to light transmission 930 at various wavelengths of a sunglass lens according to another embodiment of the present invention.

FIG. 9 is the set of spectral graphs 900 comparing the spectral light-transmission curve 330 at various wavelengths of one embodiment of the present invention to light transmission 930 at various wavelengths of a sunglass lens according to a sunglass lens according to another embodiment of the present invention details the corresponding transmittance peaks and absorbance peaks between the tristimulus values and this current invention.

Figure 10A:
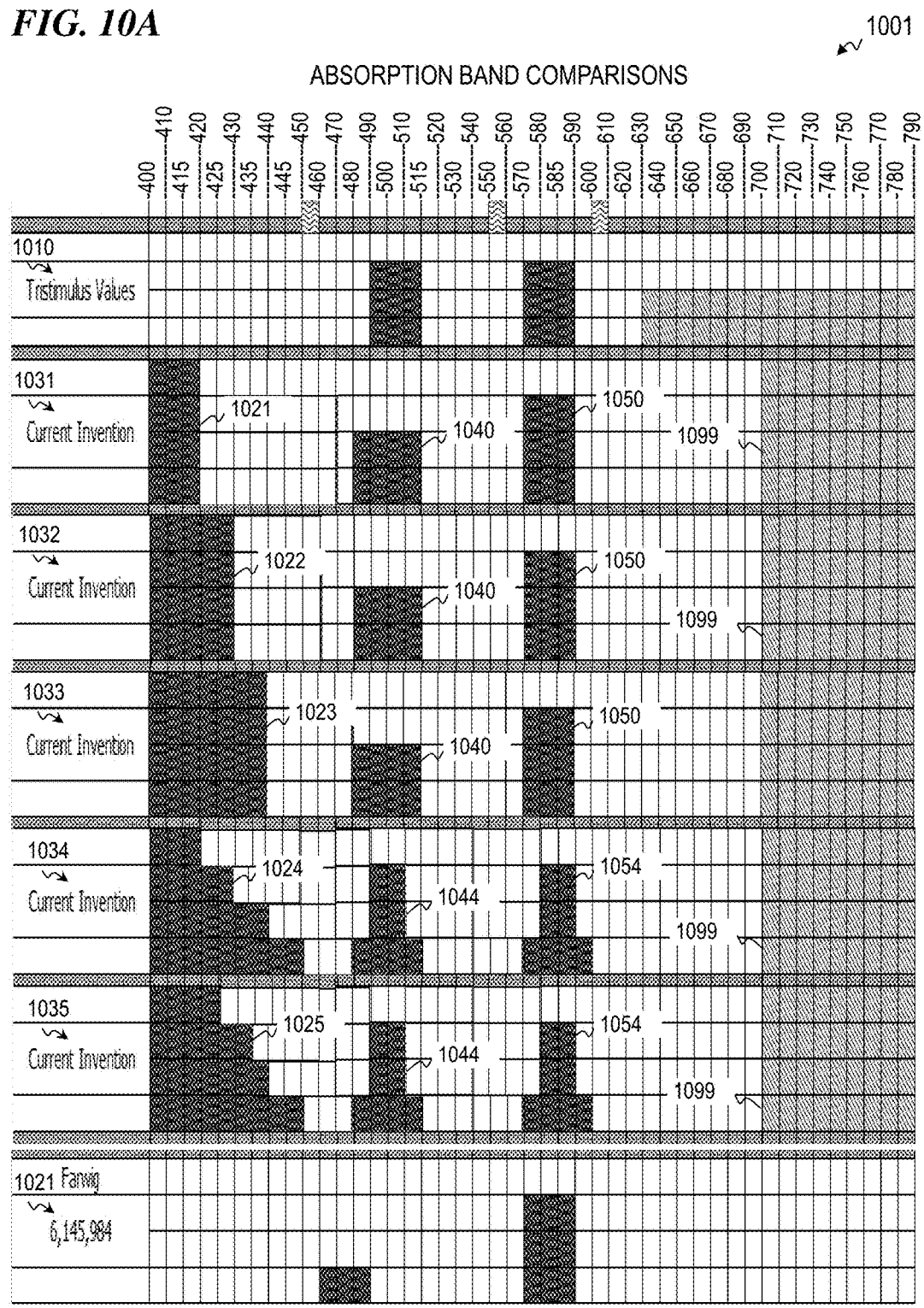
FIG. 10A is a set of graphs 1001 that compare the absorption and transmittance bands of various embodiments of the current invention to both the tristimulus values 1010 and to the absorption and transmittance bands 1021 of U.S. Pat. No. 6,145,984.

FIG. 10A is a set of graphs 1001 that compares the sets of absorption and transmittance bands of various embodiments of the current invention, including sets 1031, 1032, 1033, 1034, and 1035, to the tristimulus values 1010 and to the absorption and transmittance bands 1021 of U.S. Pat. No. 6,145,984.

In some embodiments, each of these sets 1031, 1032, 1033, 1034, and 1035 of absorption and transmittance bands include an optional stop band 1099, shown in lighter shading) that blocks some or all of the light having infrared wavelengths between 700 nm and 800 nm (i.e., in some embodiments, optional stop band 1099 has a shortest-wavelength cut-on wavelength between about 700 nm and 800 nm and a longest-blocked wavelength that is longer than the shortest-wavelength cut-on wavelength).

In some embodiments, each of the cyan reduction bands (1040 or 1044) of FIG. 10A transmits substantially all wavelengths between 480 nm and 515 nm, in an amount of at least about 10% of the average transmittance of the lens at all wavelengths between 400 nm and 700 nm, and each of the yellow reduction bands (1050 or 1054) of FIG. 10A transmits substantially all wavelengths between 570 nm and 590 nm, in an amount of at least about 10% of the average transmittance of the lens at all wavelengths between 400 nm and 700 nm. In some embodiments, the set 1031 of absorption and transmittance bands includes a violet-stop band 1022 that blocks at least 95% of all wavelengths between 400 nm and 420 nm (relative to the average lens transmission of wavelengths between 400 nm and 700 nm), a cyan-reduction band 1040 that blocks at least 50% but less than 75% of all wavelengths between 480 nm and 515 nm (relative to the average lens transmission of wavelengths between 400 nm and 700 nm), and a yellow-reduction band 1050 that blocks at least 75% but less than 95% of all wavelengths between 570 nm and 590 nm (relative to the average lens transmission of wavelengths between 400 nm and 700 nm). (In the following paragraphs describing the absorption bands shown in FIG. 10A, FIG. 10B, FIG. 10C, and FIG. 10D, the description of the percentage blocked in each subband is a percentage relative to the average lens transmission of all wavelengths between 400 nm and 700 nm.)

In some embodiments, the set 1032 of absorption and transmittance bands includes a violet-stop band 1022 that blocks at least 95% of all wavelengths between 400 nm and 430 nm, a cyan-reduction band 1040 that blocks at least 50% but less than 75% of all wavelengths between 480 nm and 515 nm, and a yellow-reduction band 1050 that blocks at least 75% but less than 95% of all wavelengths between 570 nm and 590 nm.

In some embodiments, the set 1033 of absorption and transmittance bands includes a violet-stop band 1023 that blocks at least 95% of all wavelengths between 400 nm and 440 nm, a cyan-reduction band 1040 that blocks at least 50% but less than 75% of all wavelengths between 480 nm and 515 nm, and a yellow-reduction band 1050 that blocks at least 75% but less than 95% of all wavelengths between 570 nm and 590 nm.

In some embodiments, the set 1034 of absorption and transmittance bands includes a violet-stop-and-reduction band 1024 that blocks at least 95% of all wavelengths between 400 nm and 420 nm, at least 75% but less than 95% of all wavelengths between 420 nm and 430 nm, at least 50% but less than 75% of all wavelengths between 430 nm and 440 nm, and at least 25% but less than 50% of all wavelengths between 440 nm and 450 nm, a cyan-reduction band 1044 that blocks at least 75% but less than 95% of all wavelengths between 490 nm and 510 nm and at least 25% but less than 50% of all wavelengths between 480 nm and 515 nm, and a yellow-reduction band 1054 that blocks at least 75% but less than 95% of all wavelengths between 580 nm and 590 nm and at least 25% but less than 50% of all wavelengths between 570 nm and 600 nm.

In some embodiments, the set 1035 of absorption and transmittance bands includes a violet-stop-and-reduction band 1025 that blocks at least 95% of all wavelengths between 400 nm and 425 nm, at least 75% but less than 95% of all wavelengths between 425 nm and 435 nm, at least 50% but less than 75% of all wavelengths between 435 nm and 440 nm, and at least 25% but less than 50% of all wavelengths between 440 nm and 450 nm, a cyan-reduction band 1044 that blocks at least 75% but less than 95% of all wavelengths between 490 nm and 510 nm and at least 25% but less than 50% of all wavelengths between 480 nm and 515 nm, and a yellow-reduction band 1054 that blocks at least 75% but less than 95% of all wavelengths between 580 nm and 590 nm and at least 25% but less than 50% of all wavelengths between 570 nm and 600 nm.

Figure 10B:
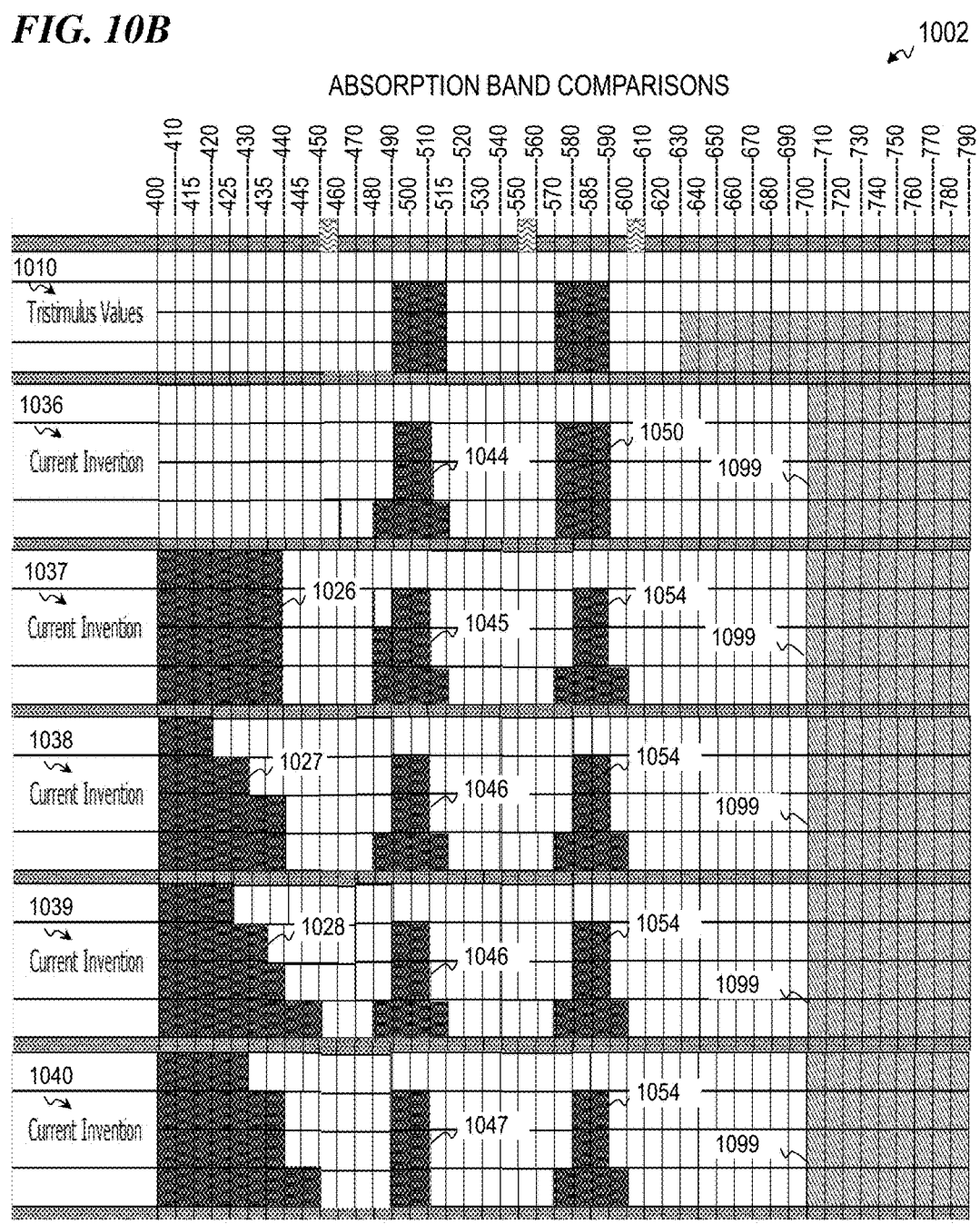
FIG. 10B is a set of graphs 1002 that compare the sets 1036, 1037, 1038, 1039, and 1040 of absorption and transmittance bands of various embodiments of the current invention to the tristimulus values 1010.

FIG. 10B is a set of graphs 1002 that compare the sets 1036, 1037, 1038, 1039, and 1040 of absorption and transmittance bands of various embodiments of the current invention to the tristimulus values 1010.

In some embodiments, the set 1036 of absorption and transmittance bands includes a cyan-reduction band 1044 that blocks at least 75% but less than 95% of all wavelengths between 490 nm and 510 nm and at least 25% but less than 50% of all wavelengths between 480 nm and 515 nm, and a yellow-reduction band 1054 that blocks at least 75% but less than 95% of all wavelengths between 570 nm and 590 nm and at least 25% but less than 50% of all wavelengths between 570 nm and 600 nm (this embodiment omits the violet-stop-and/or-reduction band).

In some embodiments, the set 1037 of absorption and transmittance bands includes a violet-stop band 1026 that blocks at least 95% of all wavelengths between 400 nm and 440 nm, a cyan-reduction band 1045 that blocks at least 75% but less than 95% of all wavelengths between 490 nm and 510 nm, at least 50% but less than 75% of all wavelengths between 480 nm and 490 nm, and at least 25% but less than 50% of all wavelengths between 510 nm and 515 nm, and a yellow-reduction band 1054 that blocks at least 75% but less than 95% of all wavelengths between 580 nm and 590 nm and at least 25% but less than 50% of all wavelengths between 570 nm and 600 nm.

In some embodiments, the set 1038 of absorption and transmittance bands includes a violet-stop-and-reduction band 1027 that blocks at least 95% of all wavelengths between 400 nm and 420 nm, at least 75% but less than 95% of all wavelengths between 420 nm and 430 nm, at least 50% but less than 75% of all wavelengths between 430 nm and 440 nm, and at least 25% but less than 50% of all wavelengths between 440 nm and 450 nm, a cyan-reduction band 1046 that blocks at least 75% but less than 95% of all wavelengths between 490 nm and 510 nm, and at least 25% but less than 50% of all wavelengths between 480 nm and 515 nm, and a yellow-reduction band 1054 that blocks at least 75% of all wavelengths between 580 nm and 590 nm and at least 25% but less than 50% of all wavelengths between 570 nm and 600 nm.

In some embodiments, the set 1039 of absorption and transmittance bands includes a violet-stop-and-reduction band 1027 that blocks at least 95% of all wavelengths between 400 nm and 425 nm, at least 75% but less than 95% of all wavelengths between 425 nm and 435 nm, at least 50% but less than 75% of all wavelengths between 435 nm and 440 nm, and at least 25% but less than 50% of all wavelengths between 440 nm and 450 nm, a cyan-reduction band 1046 that blocks at least 75% but less than 95% of all wavelengths between 490 nm and 510 nm, and at least 25% but less than 50% of all wavelengths between 480 nm and 515 nm, and a yellow-reduction band 1054 that blocks at least 75% but less than 95% of all wavelengths between 580 nm and 590 nm and at least 25% but less than 50% of all wavelengths between 570 nm and 600 nm.

In some embodiments, the set 1040 of absorption and transmittance bands includes a violet-stop-and-reduction band 1027 that blocks at least 95% of all wavelengths between 400 nm and 430 nm, at least 75% but less than 95% of all wavelengths between 430 nm and 440 nm, and at least 25% but less than 50% of all wavelengths between 440 nm and 450 nm, a cyan-reduction band 1046 that blocks at least 75% but less than 95% of all wavelengths between 490 nm and 510 nm, and at least 25% but less than 50% of all wavelengths between 480 nm and 515 nm, and a yellow-reduction band 1047 that blocks at least 75% but less than 95% of all wavelengths between 580 nm and 590 nm.

Figure 10C:
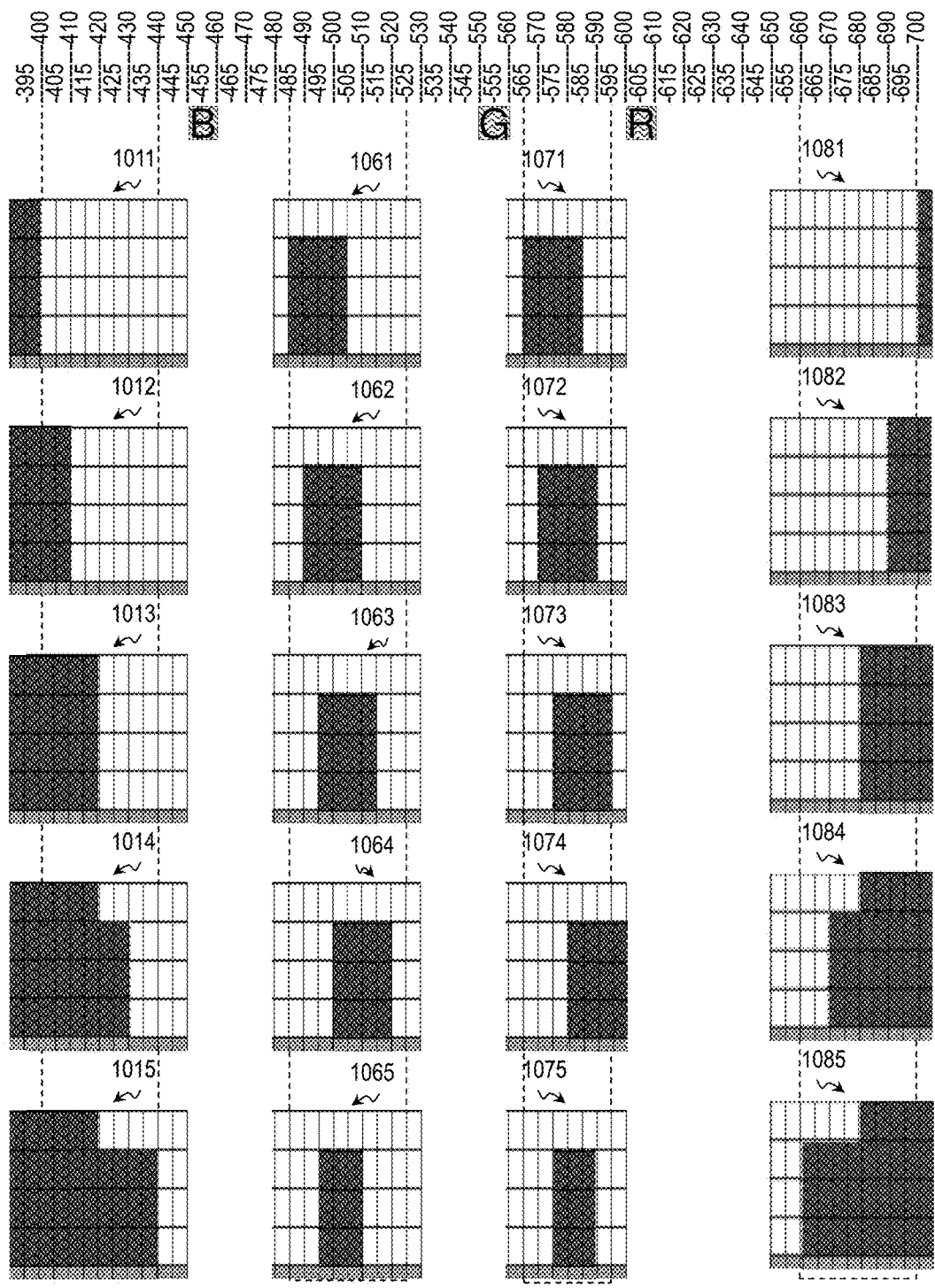
FIG. 10C is a set of graphs 1003 that compare various optional absorption subbands of various embodiments of the current invention to the tristimulus values 1010.

FIG. 10C is a set of graphs 1003 that compare various optional absorption subbands of various embodiments of the current invention to the tristimulus values 1010.

Figure 10D:
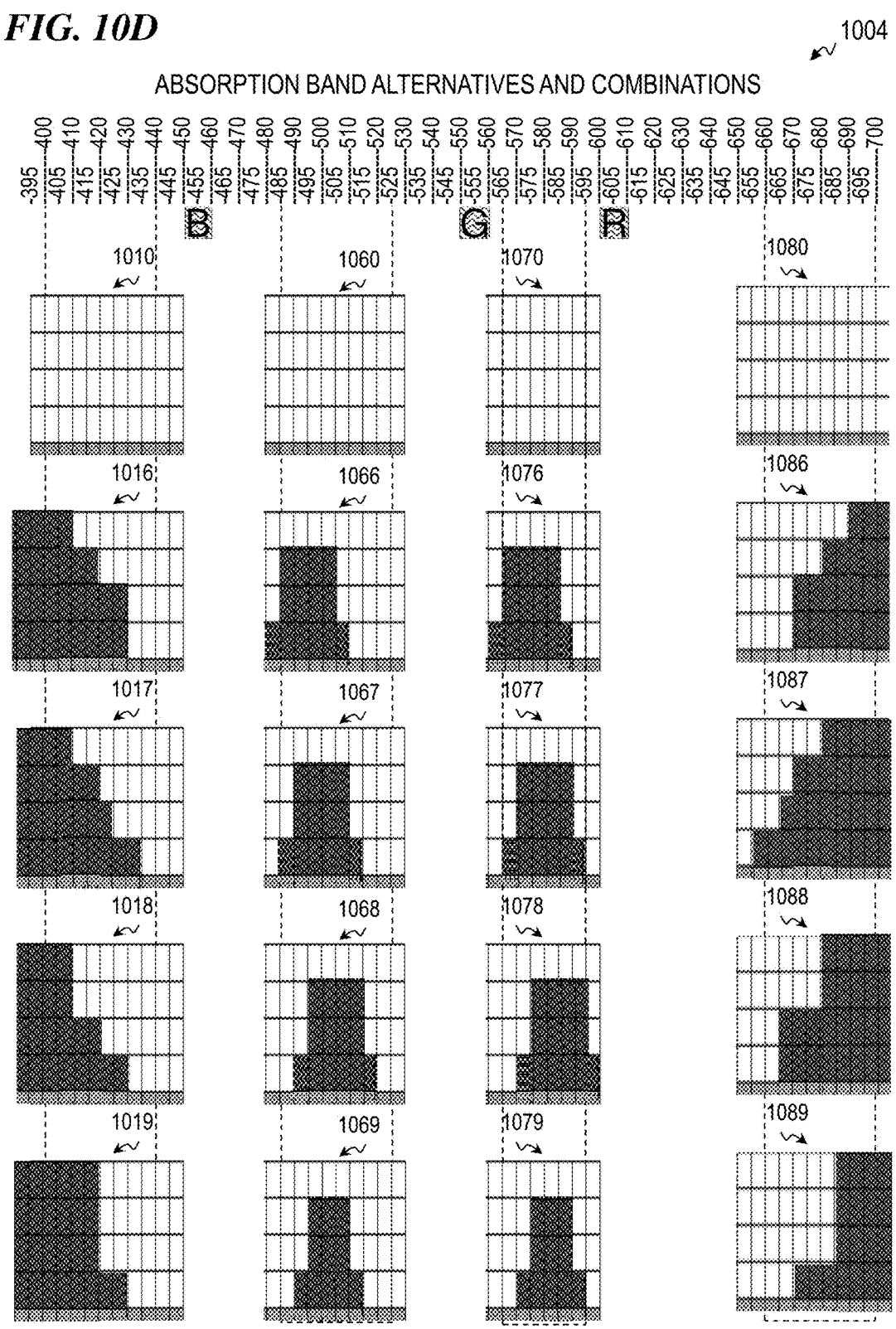
FIG. 10D is a set of graphs 1004 that compare various optional absorption subbands of various embodiments of the current invention to the tristimulus values 1010.

FIG. 10D is a set of graphs 1004 that compare various optional absorption subbands of various embodiments of the current invention to the tristimulus values 1010.

For the various optional absorption subbands shown in FIGS. 10C and 10D, some embodiments choose one variation from each of the four columns, and thus use:
- one of the violet-stop-and-reduction bands (1011, 1012, 1013, 1014, or 1015 of FIG. 10C, or 1010 (i.e., an embodiment that does not substantially block (i.e., less than 25% blockage) light having wavelengths between 400 nm and 450 nm), 1016, 1017, 1018, or 1019 of FIG. 10D);
- one of the cyan-reduction bands (1061, 1062, 1063, 1064, or 1065 of FIG. 10C, or 1060 (i.e., an embodiment that does not substantially block (i.e., less than 25% blockage) light having wavelengths between 480 nm and 520 nm), 1066, 1067, 1068, or 1069 of FIG. 10D);
- one of the yellow-reduction bands (1071, 1072, 1073, 1074, or 1075 of FIG. 10C, or 1070 (i.e., an embodiment that does not substantially block (i.e., less than 25% blockage) light having wavelengths between 560 nm and 600 nm), 1076, 1077, 1078, or 1079 of FIG. 10D); and
- one of the long-wavelength-red-reduction-or-blocking bands (1081, 1082, 1083, 1084, or 1085 of FIG. 10C, or 1080 (i.e., an embodiment that does not substantially block (i.e., less than 25% blockage) light having wavelengths between 640 nm and 700 nm), 1086, 1087, 1088, or 1089 of FIG. 10D).

In some embodiments (see FIG. 10C), violet-stop band 1011 blocks at least 95% of light having wavelengths between 390 nm and 400 nm; violet-stop band 1012 blocks at least 95% of light having wavelengths between 390 nm and 410 nm; violet-stop band 1013 blocks at least 95% of light having wavelengths between 390 nm and 420 nm; violet-stop-and-reduction band 1014 blocks at least 95% of light having wavelengths between 390 nm and 420 nm and at least 75% but less than 95% of light having wavelengths between 420 nm and 430 nm; and violet-stop-and-reduction band 1015 blocks at least 95% of light having wavelengths between 390 nm and 420 nm and at least 75% but less than 95% of light having wavelengths between 420 nm and 440 nm.

In some embodiments (see FIG. 10D), violet-passing band 1010 is an embodiment that does not substantially block (i.e., less than 25% blockage) light having wavelengths between 400 nm and 450 nm); violet-stop-and-reduction band 1016 blocks at least 95% of light having wavelengths between 390 nm and 410 nm and at least 75% but less than 95% of light having wavelengths between 410 nm and 420 nm and at least 50% but less than 75% of light having wavelengths between 420 nm and 430 nm; violet-stop-and-reduction band 1017 blocks at least 95% of light having wavelengths between 390 nm and 410 nm and at least 75% but less than 95% of light having wavelengths between 410 nm and 420 nm and at least 50% but less than 75% of light having wavelengths between 420 nm and 425 nm and at least 25% but less than 50% of light having wavelengths between 425 nm and 435 nm; violet-stop-and-reduction band 1018 blocks at least 95% of light having wavelengths between 390 nm and 410 nm and at least 50% but less than 75% of light having wavelengths between 410 nm and 420 nm and at least 25% but less than 50% of light having wavelengths between 420 nm and 430 nm; and violet-stop-and-reduction band 1019 blocks at least 95% of light having wavelengths between 390 nm and 420 nm and at least 25% but less than 50% of light having wavelengths between 420 nm and 430 nm.

In some embodiments (see FIG. 10C), cyan-reduction band 1061 blocks at least 75% but less than 95% of light having wavelengths between 485 nm and 505 nm, cyan-reduction band 1062 blocks at least 75% but less than 95% of light having wavelengths between 490 nm and 510 nm, cyan-reduction band 1063 blocks at least 75% but less than 95% of light having wavelengths between 495 nm and 515 nm, cyan-reduction band 1064 blocks at least 75% but less than 95% of light having wavelengths between 500 nm and 520 nm, and cyan-reduction band 1065 blocks at least 75% but less than 95% of light having wavelengths between 495 nm and 510 nm.

In some embodiments (see FIG. 10D), cyan-passing band 1060 is an embodiment that does not substantially block (i.e., less than 25% blockage) light having wavelengths between 480 nm and 520 nm); cyan-reduction band 1066 blocks at least 75% but less than 95% of light having wavelengths between 485 nm and 505 nm and at least 25% but less than 50% of light having wavelengths between 480 nm and 510 nm; cyan-reduction band 1067 blocks at least 75% but less than 95% of light having wavelengths between 490 nm and 510 nm and at least 25% but less than 50% of light having wavelengths between 485 nm and 515 nm; cyan-reduction band 1068 blocks at least 75% but less than 95% of light having wavelengths between 495 nm and 515 nm and at least 25% but less than 50% of light having wavelengths between 490 nm and 520 nm; and cyan-reduction band 1069 blocks at least 75% but less than 95% of light having wavelengths between 495 nm and 510 nm and at least 25% but less than 50% of light having wavelengths between 490 nm and 515 nm.

In some embodiments (see FIG. 10C), yellow-reduction band 1071 blocks at least 75% but less than 95% of light having wavelengths between 565 nm and 585 nm; yellow-reduction band 1072 blocks at least 75% but less than 95% of light having wavelengths between 570 nm and 590 nm; yellow-reduction band 1073 blocks at least 75% but less than 95% of light having wavelengths between 575 nm and 595 nm; yellow-reduction band 1074 blocks at least 75% but less than 95% of light having wavelengths between 580 nm and 600 nm; and yellow-reduction band 1075 blocks at least 75% but less than 95% of light having wavelengths between 575 nm and 590 nm.

In some embodiments (see FIG. 10D), yellow-passing band 1070 is an embodiment that does not substantially block (i.e., less than 25% blockage) light having wavelengths between 560 nm and 600 nm; yellow-reduction band 1076 blocks at least 75% but less than 95% of light having wavelengths between 565 nm and 585 nm and at least 25% but less than 50% of light having wavelengths between 560 nm and 590 nm; yellow-reduction band 1077 blocks at least 75% but less than 95% of light having wavelengths between 570 nm and 590 nm and at least 25% but less than 50% of light having wavelengths between 565 nm and 595 nm; yellow-reduction band 1078 blocks at least 75% but less than 95% of light having wavelengths between 575 nm and 595 nm and at least 25% but less than 50% of light having wavelengths between 570 nm and 600 nm; and yellow-reduction band 1079 blocks at least 75% but less than 95% of light having wavelengths between 575 nm and 590 nm and at least 25% but less than 50% of light having wavelengths between 570 nm and 595 nm.

In some embodiments (see FIG. 10C), long-wavelength-red-blocking band 1081 blocks at least 95% of light having wavelengths between 700 nm and 800 nm; long-wavelength-red-blocking band 1082 blocks at least 95% of light having wavelengths between 690 nm and 800 nm; long-wavelength-red-blocking band 1083 blocks at least 95% of light having wavelengths between 680 nm and 800 nm; long-wavelength-red-blocking-and-reduction band 1084 blocks at least 95% of light having wavelengths between 680 nm and 800 nm and at least 75% but less than 95% of light having wavelengths between 670 nm and 680 nm; and long-wavelength-red-blocking-and-reduction band 1085 blocks at least 95% of light having wavelengths between 680 nm and 800 nm and at least 75% but less than 95% of light having wavelengths between 660 nm and 680 nm.

In some embodiments (see FIG. 10D), long-wavelength-red-passing band 1080 is an embodiment that does not substantially block (i.e., less than 25% blockage) light having wavelengths between 640 nm and 705 nm); long-wavelength-red-blocking-and-reduction band 1086 blocks at least 95% of light having wavelengths between 690 nm and 800 nm and at least 75% but less than 95% of light having wavelengths between 680 nm and 690 nm and at least 50% but less than 75% of light having wavelengths between 670 nm and 680 nm; long-wavelength-red-blocking-and-reduction band 1087 blocks at least 95% of light having wavelengths between 680 nm and 800 nm and at least 75% but less than 95% of light having wavelengths between 670 nm and 680 nm and at least 50% but less than 75% of light having wavelengths between 665 nm and 670 nm and at least 25% but less than 50% of light having wavelengths between 655 nm and 660 nm; long-wavelength-red-blocking-and-reduction band 1088 blocks at least 95% of light having wavelengths between 680 nm and 800 nm and at least 50% but less than 75% of light having wavelengths between 665 nm and 680 nm; and long-wavelength-red-blocking-and-reduction band 1089 blocks at least 95% of light having wavelengths between 685 nm and 800 nm and at least 25% but less than 50% of light having wavelengths between 670 nm and 685 nm.

Figure 11:
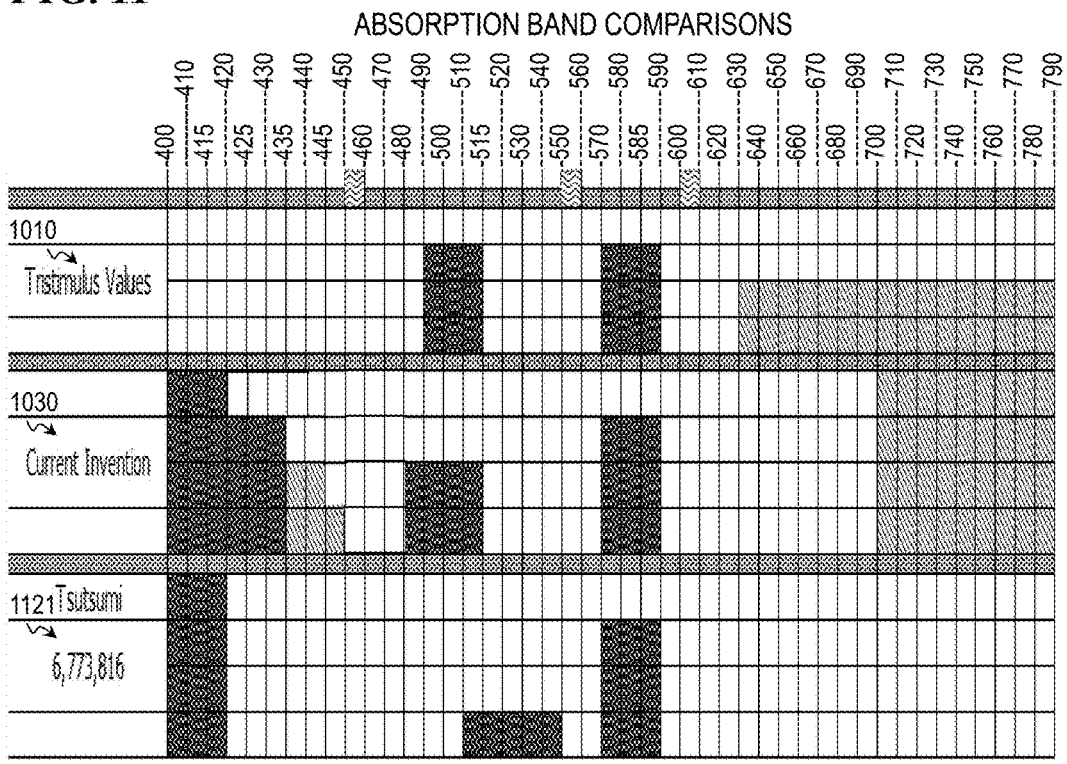
FIG. 11 is a set of graphs 1100 that compares the absorption and transmittance bands 1030 of the current invention to the tristimulus values 1010 and to the absorption and transmittance bands 1121 of U.S. Pat. No. 6,773,816.

FIG. 11 is a set of graphs 1100 that compares both the absorption and transmittance bands 1030 of the current invention to the tristimulus values 1010 and to the bands 1121 of U.S. Pat. No. 6,773,816.

Figure 12:
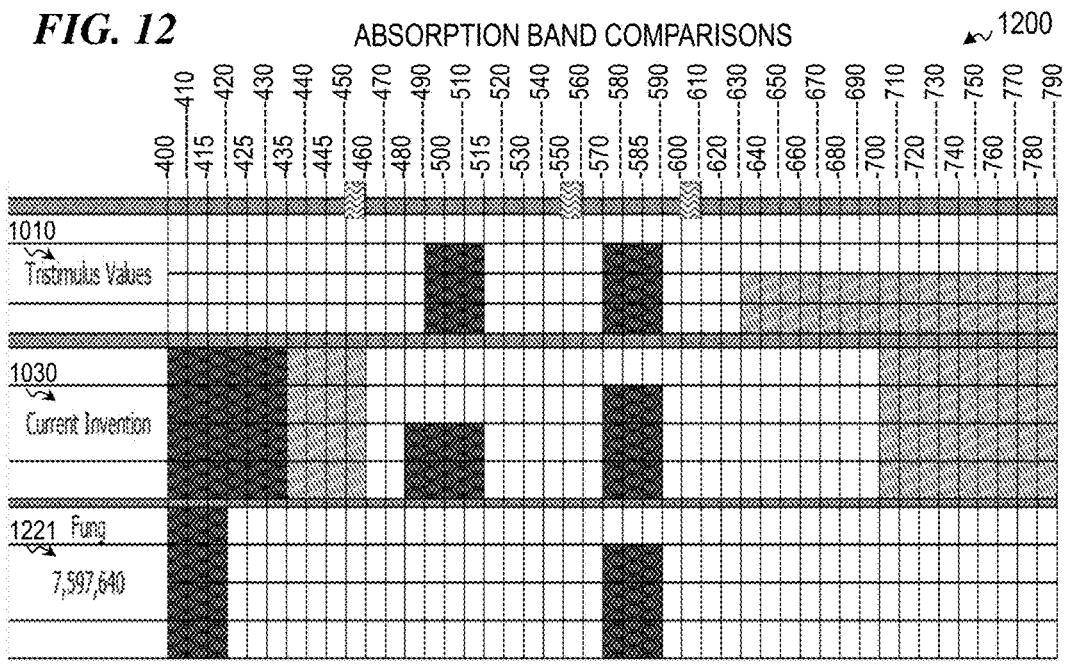
FIG. 12 is a set of graphs 1200 that compares the absorption and transmittance bands 1030 of the current invention to the tristimulus values 1010 and to the absorption and transmittance bands 1221 of U.S. Pat. No. 7,597,640.

FIG. 12 is a set of graphs 1200 that compares both the absorption and transmittance bands 1030 of the current invention to the tristimulus values 1010 and to the bands 1221 of U.S. Pat. No. 7,597,640.

Figure 13:
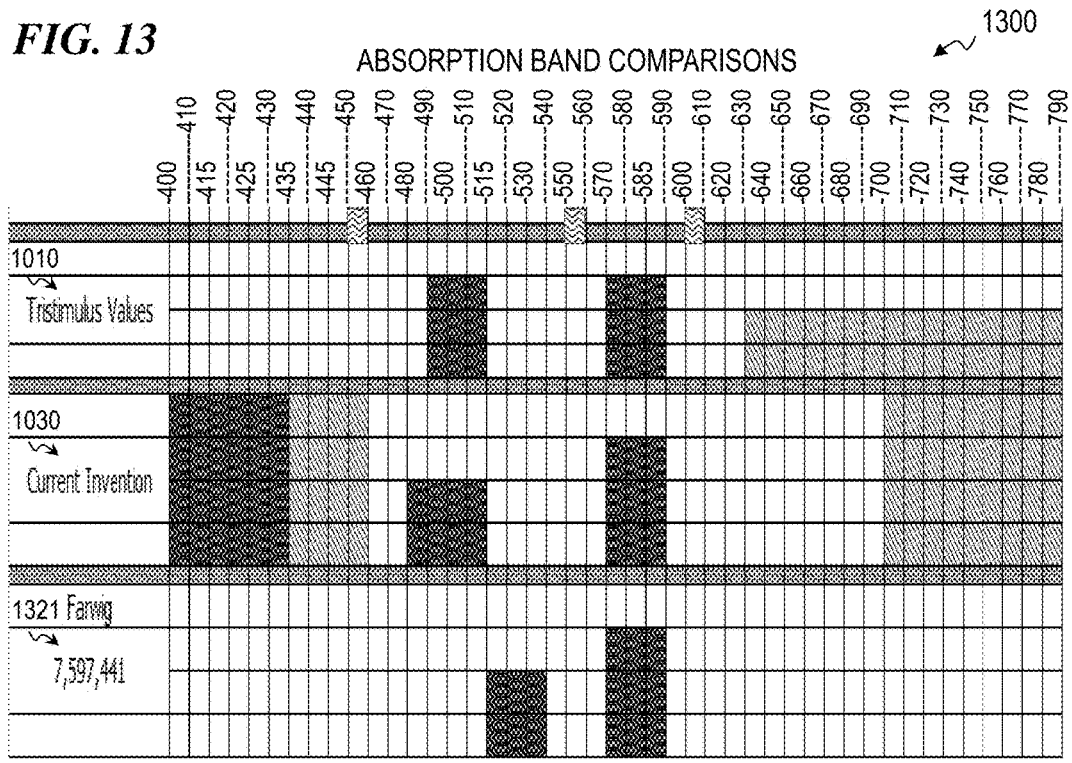
FIG. 13 is a set of graphs 1300 that compares the absorption and transmittance bands 1030 of the current invention to the tristimulus values 1010 and to the absorption and transmittance bands 1321 of U.S. Pat. No. 7,597,441.

FIG. 13 is a set of graphs 1300 that compares both the absorption and transmittance bands 1030 of the current invention to the tristimulus values 1010 and to the bands 1321 of U.S. Pat. No. 7,597,441.

Figure 14:
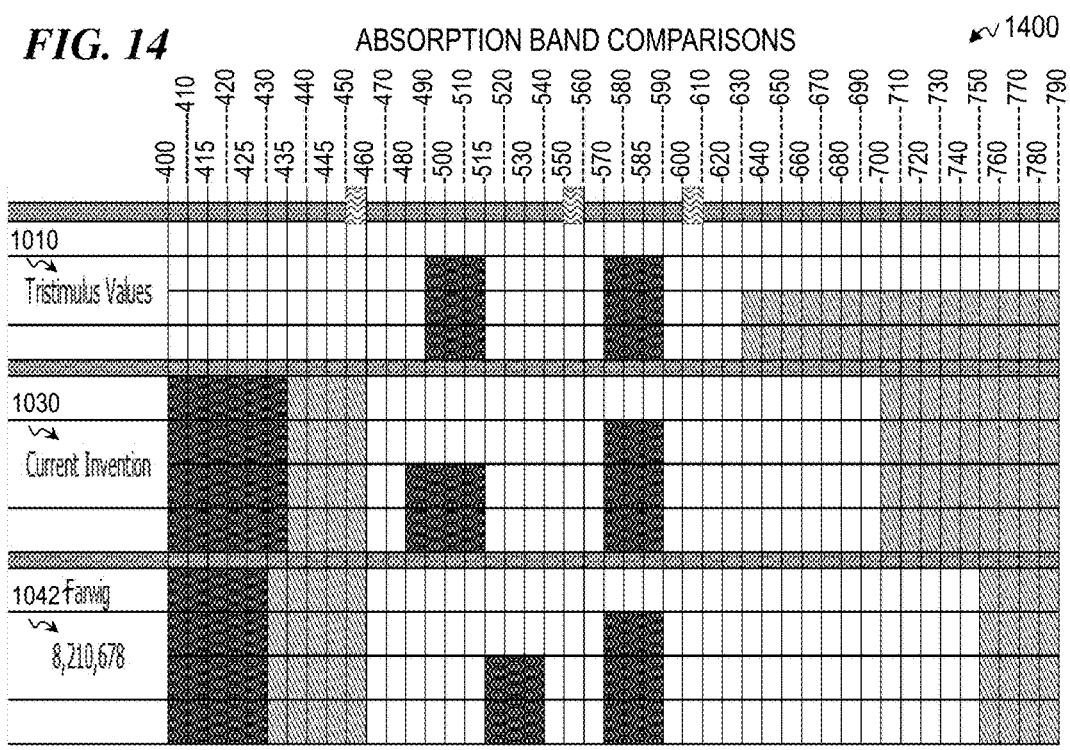
FIG. 14 is a set of graphs 1400 that compares the absorption and transmittance bands 1030 of the current invention to the tristimulus values 1010 and to the absorption and transmittance bands 1421 of U.S. Pat. No. 8,210,678.

FIG. 14 is a set of graphs 1400 that compares both the absorption and transmittance bands 1030 of the current invention to the tristimulus values 1010 and to the bands 1421 of U.S. Pat. No. 8,210,678.

Figure 15A:
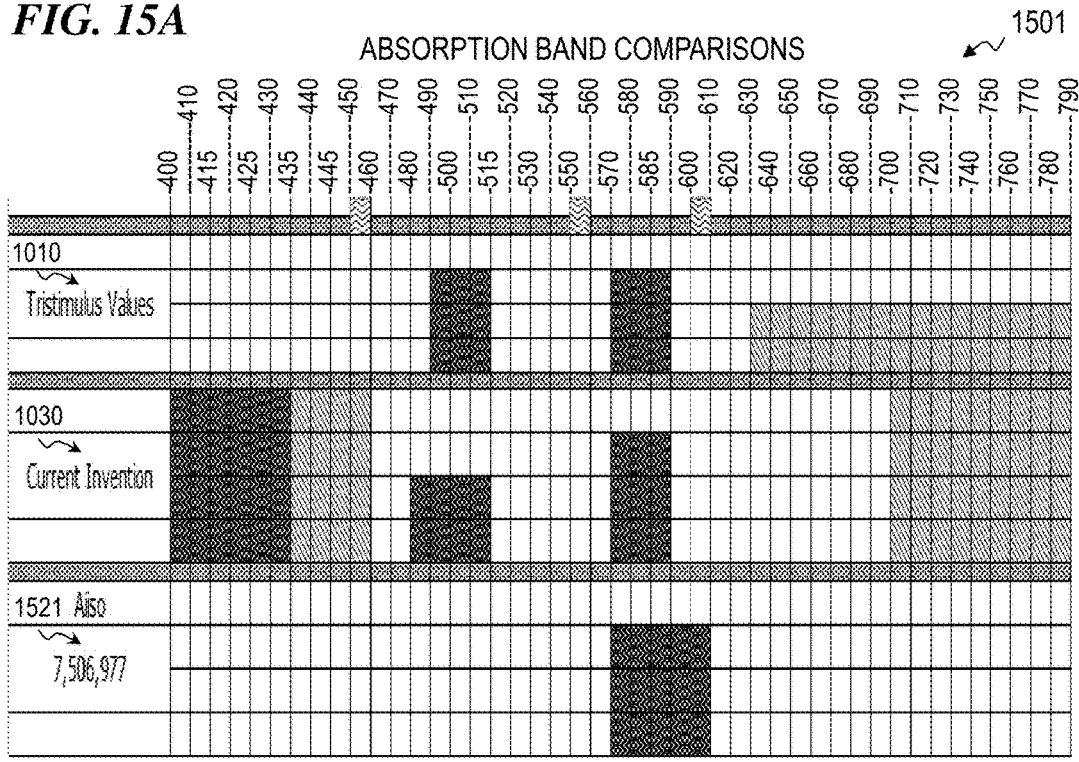
FIG. 15A is a set of graphs 1501 that compares the absorption and transmittance bands 1030 of the current invention to the tristimulus values 1010 and to the absorption and transmittance bands 1521 of U.S. Pat. No. 7,506,977.

FIG. 15A is a set of graphs 1501 that compares both the absorption and transmittance bands 1030 of the current invention to the tristimulus values 1010 and to the bands 1521 of U.S. Pat. No. 7,506,977.

Figure 15B:
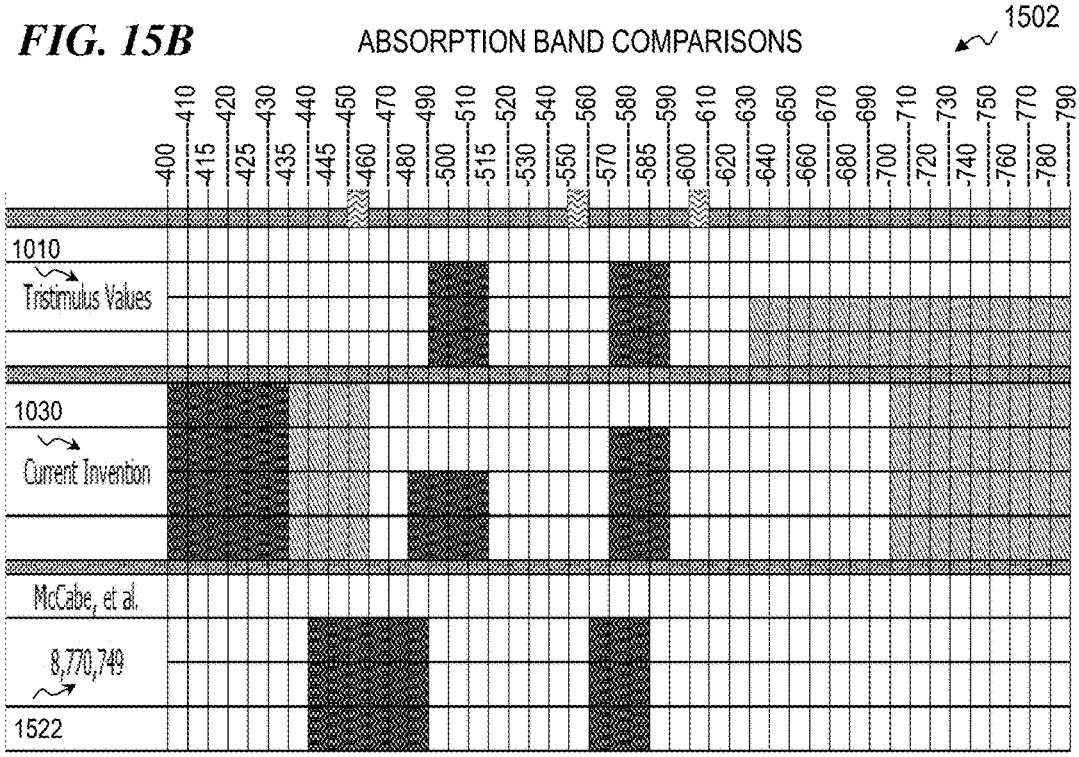
FIG. 15B is a set of graphs 1502 that compares the absorption and transmittance bands 1030 of the current invention to the tristimulus values 1010 and to the absorption and transmittance bands 1522 of U.S. Pat. No. 8,770,749.

FIG. 15B is a set of graphs 1502 that compares both the absorption and transmittance bands 1030 of the current invention to the tristimulus values 1010 and to the bands 1522 of U.S. Pat. No. 8,770,749.

Figure 15C:
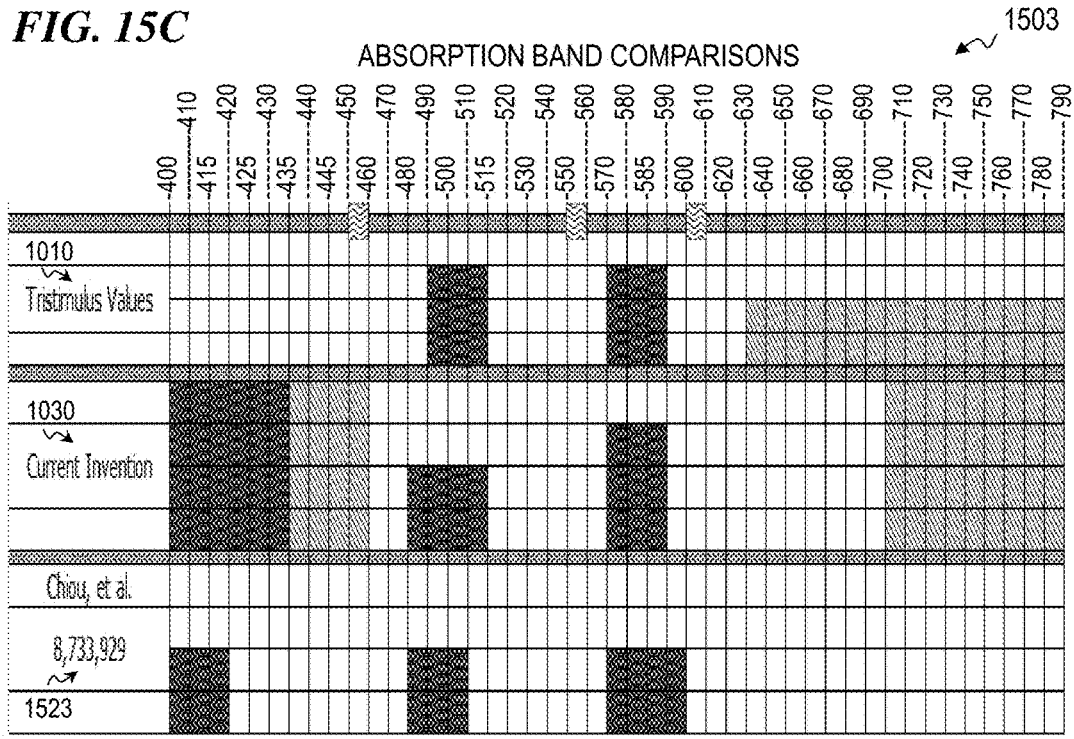
FIG. 15C is a set of graphs 1503 that compares the absorption and transmittance bands 1030 of the current invention to the tristimulus values 1010 and to the absorption and transmittance bands 1523 of U.S. Pat. No. 8,733,929.

FIG. 15C is a set of graphs 1503 that compares both the absorption and transmittance bands 1030 of the current invention to the tristimulus values 1010 and to the bands 1523 of U.S. Pat. No. 8,733,929.

Figure 15D:
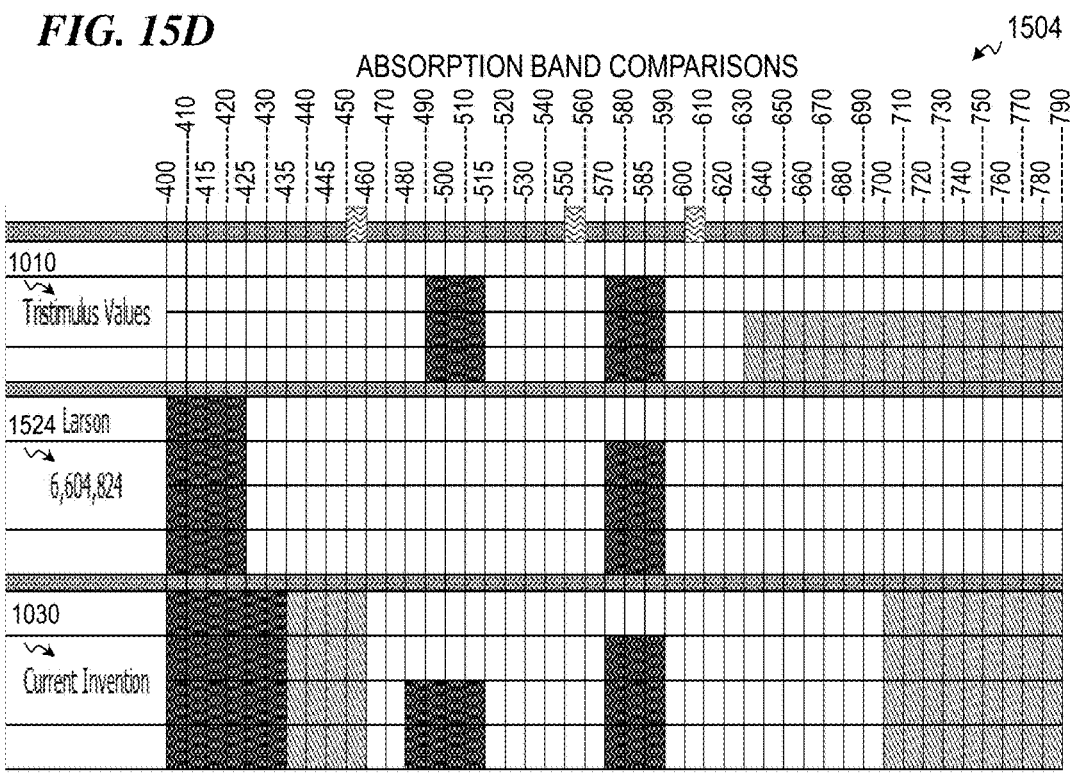
FIG. 15D is a set of graphs 1504 that compares the absorption and transmittance bands 1030 of the current invention to the tristimulus values 1010 and to the absorption and transmittance bands 1524 of U.S. Pat. No. 6,604,824.

FIG. 15D is a set of graphs 1504 that compares both the absorption and transmittance bands 1030 of the current invention to the tristimulus values 1010 and to the bands 1524 of U.S. Pat. No. 6,604,824.

Figure 15E:
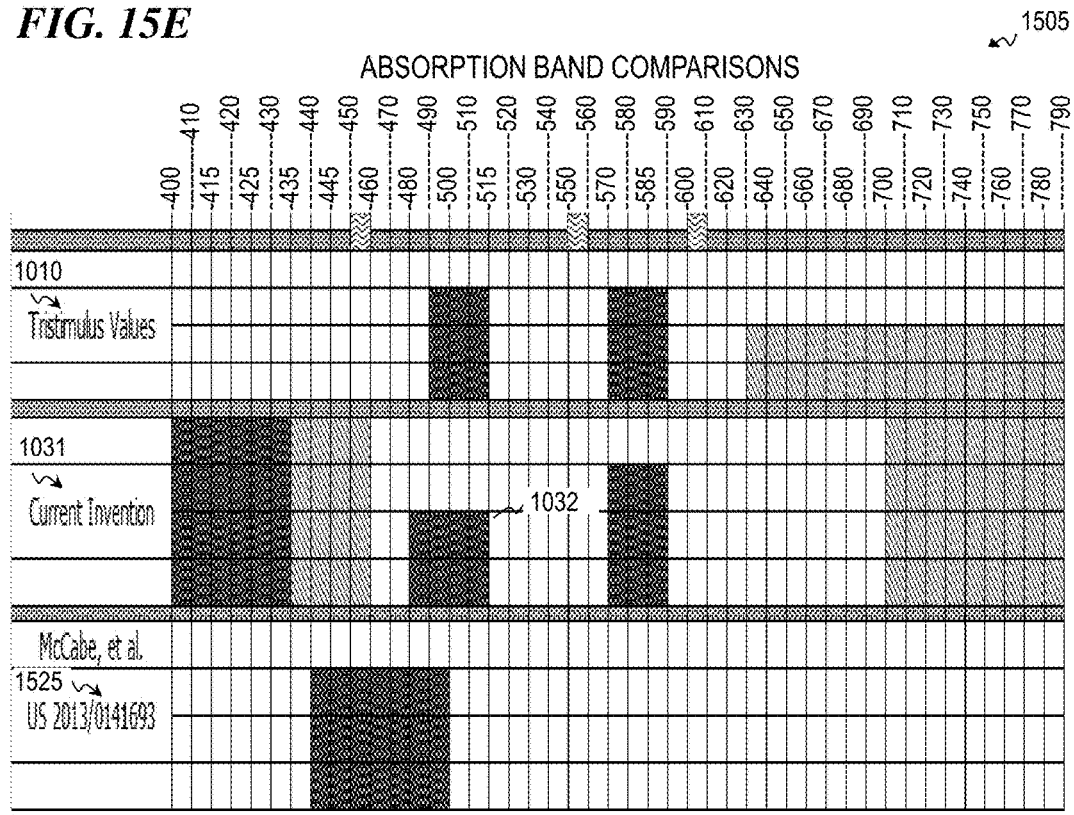
FIG. 15E is a set of graphs 1505 that compares the absorption and transmittance bands 1031 of the current invention to the tristimulus values 1010 and to the absorption and transmittance bands 1525 of U.S. Patent Application Publication 2013/0141693.

FIG. 15E is a set of graphs 1506 that compares both the absorption and transmittance bands 1031 of the current invention to the tristimulus values 1010 and to the bands 1525 of U.S. Patent Application Publication 2013/0141693.

In some embodiments, the present invention includes a multi-layered sunglass lens 1170 as detailed by the cross-sectional view of FIG. 1G. The two glass wafers, referred to as front wafer 101 and back, or rear, wafer 102, are laminated together with a polarizing filter layer 103 in between. In some embodiments, the lamination is secured by adhesive layers 104 and 105. In other embodiments (not shown here) the lamination is achieved by fusing the polarizing filter layer 103 directly to the glass wafer using, for example, heat and a vacuum. One preferred embodiment has the option of a mirror coating 106 placed on either the convex (outer) surface of front wafer 101 or the concave (inner) surface of front wafer 101. Additionally, one preferred embodiment has an anti-reflection coating 107 with a top hydrophobic layer 109. In some embodiments, a top hydrophobic layer 108 is applied to the convex surface of optional mirror coating 106, or if no mirror coating 106 is used on the convex (outer) surface of front wafer 101, then to the convex surface of front wafer 101.

The luminous transmittance of this lens is preferred to be 12%, but some embodiments have transmission in a range of 8% to 35%. When discussing spectral transmittance of lenses, this specification refers to the standards provided by ANSI Z80.3-2009 4.6.3.2 and ISO 12312-1 2013 5.3.2.2 and 5.3.2.3. In some embodiments, the measurements are made in accordance to CIE illuminant D65. As used herein, "average visible transmittance of a lens" is defined as the average light transmittance of the lens to all wavelengths in the range of 400 nm to 700 nm, inclusive.

The lens system found in FIG. 1 includes two glass wafers of preferred thicknesses between 0.8 mm and 1.0 mm. One preferred embodiment of the lens system shown in FIG. 1 uses ophthalmic-grade glass wafers and is assembled by well-known processes and specifications found in the sunglass market. The two-wafer system is preferred as the rear wafer 102 can have varied thicknesses to induce prism on the horizontal axis in order to off-set the optical center of the lens. In the sunglass industry this is typically known as de-centering the lens. The typical thickness variance within rear wafer 102 is about 0.8 mm to 1.2 mm. In some embodiments, the front wafer 101 has an even thickness, which is typically about 1.0 mm thick. The preferred luminous transmittance of the embodiments of rear wafer 102 that use oxide additives is about 65%. In some embodiments, it is preferred that the wavelength-selective light-absorbing oxide additives are in rear wafer 102. Both the Farwig U.S. Pat. No. 7,597,441 and Tsutsumi U.S. Pat. No. 6,773,816 include a lanthanide oxide called praseodymium for coloration and wavelength-selective attenuation between 420 nm and 440 nm. Farwig U.S. Pat. No. 7,597,441 describes 0.25 to 1.75 mole percent praseodymium, while Tsutsumi U.S. Pat. No. 6,773,816 describes a range of 3:1 to 1:1 ratio of neodymium to praseodymium, and Fung patent describes 3% praseodymium. In some embodiments, the current invention uses less than 0.0005% praseodymium by mole and over 2% neodymium by mole which gives a ratio of neodymium to praseodymium far more than 3:1; the ratio of neodymium to praseodymium in this embodiment of the present invention will be in the range of about 2000:1, which is far greater than the Tsutsumi U.S. Pat. No. 6,773,816 describes.

In one preferred embodiment, glass rear wafer 102 includes the following functional oxides: copper oxide at about 0.50% by mole, titanium oxides at about 0.16% by mole, praseodymium oxide at about 0.0004% by mole, and neodymium oxide at about 2.15% by mole. In some embodiments, the fusion of oxides and in addition to other oxides that are typically used in making ophthalmic glass lenses have a luminous transmission of about 65%, but in other embodiments, the present invention provides a luminous transmission in a range of 50% to 80%.

The functional oxides of the preferred embodiment do not complete the desired spectral curve 330 as shown in FIG. 8. In some embodiments, organic dyes are added in order to create the desired spectral curve. In some embodiments, organic dyes are added to the adhesive layer(s), to the polarizing film layer, or to both the adhesive layer(s) and the polarizing film layer. Organic dyes are typically available in a powder form and, in some embodiments, are diluted by 20 ppm in glycol ether. In some embodiments, an organic dye such as Exciton ABS 549 or Orco's Chinoline and Exciton's P 491 is used. In some embodiments, the quantity needed for ABS 549 is about 0.1 milligram per lens, and for P 491, about 0.05 milligram per lens. In some embodiments, the luminous transmittance of the organic dye mixture is about 95%, but in other embodiments, is in the range from 90% to 99%, inclusive.

Polyvinyl alcohol (PVA) is the sunglass-industry standard in material used to produce polarizing film for sunglasses. In some embodiments, the PVA film used for making polarized film for sunglasses of the present invention is quite thin and has a high transmission to visible light, ideally about 45% for some embodiments of the present invention. In some embodiments, dyeing PVA film requires rolling it into a dye tank to dye the polymers within the film. The most commonly used dyes are iodine and dichroic dyes. The density of dye is important to the polarization co-efficiency of the film. Once the PVA film is dyed it is stretched at least five-fold (5-fold) for polarization. In some embodiments, before stretching, the PVA polymers are oriented in a random way within the film. Once stretched, the PVA polymers are aligned in a single direction. In some embodiments, the organic dyes used for some embodiments of this current invention are added to the dye bath. To do this, the required dyes are mixed in their powder form, diluted, and added to the dye bath to a ratio appropriate to accommodate the desired spectral curve. There is considerable prior art for this process, including but not limited to U.S. Pat. Nos. 3,300,436 and 6,113,811. In some embodiments, the luminous transmittance of the polarized fill for the present invention is about 45%, but in other embodiments, can have a range of between 30% and 60%, inclusive.

When referencing "polarized filter coatings" that can be used on this current invention, some embodiments of the present invention use a process such as that detailed in U.S. Pat. No. 7,044,599.

In some embodiments, the present invention uses plastic lenses that include organic narrow-band absorbing dyes to block UV and certain specific bands of visible light in order to replicate the transmittance properties of the rare-earth oxides used in glass embodiments of the present invention. In some embodiments, organic dyes are used in molded thermoplastic polyurethane lenses of the present invention, while in other embodiments, other narrow-band dyes are used for molded thermoplastic polycarbonate lenses of the present invention. Adding dyes to plastic materials can be achieved through several options, including but not limited to:

1. Adding the functional dyes to the thermoplastic material before injection or casting;
2. Using a two-lens system and including the dyes in the adhesive layer that bonds the two lenses together;
3. Imbibing, which is the process of using heat to draw the organic dyes into the lens itself; and/or
4. Trans-Bonding™ to put the dyes on the lens surface.

Typical conventional polarized sunglass lenses have relatively flat spectral curves as seen in FIG. 8. In such conventional polarized sunglass lenses, there is no relationship to the tristimulus values. In some embodiments, the current invention adds functional oxides and/or organic dyes, while other embodiments optionally use only organic dyes that absorb specific wavelengths of light and structure the spectral curve to more closely simulate the tristimulus values.

1. Some embodiments of the present invention reduce spectral transmittance at certain wavelengths by creating an absorption peak before the peak sensitivity of the cones used for seeing the color blue at about 450 nm (i.e., absorption in wavelengths shorter than about 450 nm). In one preferred embodiment, rear glass wafer 102 is used for the preferred functional oxides. In some embodiments, this results in very low light transmittance (in some embodiments, a transmittance of about less than 1% of the luminous transmittance of the assembled lens of this current invention) for wavelengths in a range of about 300 nm to about 420 nm. In some embodiments, the desired cut-on wavelength of transmittance is about 430 nm, so to increase the absorbance between 420 nm and 430 nm, some embodiments add Exciton ABS 549 or Orco's Chinoline (Orco, R.I. Division, 65 Valley Street, East Providence, R.I. 02914, USA) organic dyes to either the adhesive or polarizing film or both to accomplish this.
   a. Some embodiments of the present invention omit the functional oxides and instead use one or more organic dyes with absorbance peaks between 380 nm and 430 nm to result in the same spectral curve shift as embodiments of the current invention that include glass wafers.
   b. Some embodiments of the present invention add further organic dyes that have an absorbance peak near 440 nm to increase the absorbance of blue light, but this can also affect how one perceives the color blue.

2. Some embodiments of the present invention further reduce spectral transmittance in the transitional zone between the colors blue and green at about 500 nm by using a narrow-band absorbent having a wavelength-absorption band of about 20 nm. In all present art an absorption-band peak between 490 and 510 nm is not described (note that U.S. Pat. No. 8,733,929 to Chiou et al. uses multi-layer coatings to reflect light in some wavelengths in this band). In some embodiments, an organic dye such as, or similar to, Exciton's P 491 (Exciton, P.O. Box 31126, Dayton, Ohio 45437) in a quantity of about 0.1 milligram per lens is used. In some embodiments, the absorbent peak desired for the present invention at about 500 nm is not as deep as the absorbance peaks found at about 430 nm and 580 nm. In some embodiments, this helps to maintains transmittance properties as found in ANSI Z80.3-2009 and ISO 12312-1 2013.

3. Some embodiments of the present invention further reduce the spectral transmittance by adding a narrow-band absorbent for wavelengths in the transitional zone between the colors green and red at about 580 nm. In some embodiments, a fairly steep and narrow absorbance peak is wanted. One preferred embodiment uses neodymium oxide with an amount of about 2.15 mole %.
   a. Some embodiments optionally omit the neodymium oxide, and instead use a narrow-band organic dye with an absorbance peak at about 580 nm. Some embodiments use the organic dye Exciton ABS 584 in a quantity of about 0.1 milligram per lens. In other embodiments, the amount of neodymium oxide is reduced and an organic dye such as Exciton ABS 584 is used to supplement absorption at wavelengths of about 580 nm.

4. Some embodiments optionally add additional organic dyes to attenuate the transmission of light between 700 nm and 780 nm.

Adding absorbance peaks as detailed in steps 1. through 3. in the paragraph immediately above creates the preferred spectral characteristics of some embodiments of this current invention. There are four distinct bands within the visible spectrum as detailed below.

Photochromic lenses refer to any lens whose luminous transmission adjusts through the introduction of energy. The adjustment occurs typically from a chemical reaction activated by UV exposure. Once the lens is exposed to increased levels of UV light a chemical reaction occurs within the lens, turning the lens darker. Prior art exists in this field and, for example, is detailed in Corning U.S. Pat. Nos. 4,549,894 and 4,979,976. In some embodiments, the assembled lens system of the present invention includes a photochromic lens. When included in this invention it would be preferred to use the photochromic lens as the front-side wafer 101 so that UV, which activates the photochromic-darkening function, would not be filtered out by a front-side glass such as described for other embodiments within this specification. Optionally this current invention could be used when front glass wafer 101 is photochromic, being directly exposed to the sun's rays allow the photochromic wafer to function appropriately. When wafer 101 is implemented as a photochromic wafer and has a variable luminous light transmittance from about 20% to about 40%, then increasing the luminous light transmittance of the polarizing filter from about 45% to about 60% would be most preferred. This would be necessary for complying with ANSI Z80.3-2009 transmittance standards.

Placing the optional mirror coating 106 on the concave surface of wafer 101 protects the mirror coating 106 from damage such as scratches, salt water, or peeling. The coating is deposited on the lens by an evaporation process conducted under a vacuum. The density of the coated lens depends on the thickness of the metallic oxide coating. Because the index of refraction of the metallic oxides is higher than the index of refraction of the underlying lens, the amount of light reflected from the absorptive coating is greater than the amount reflected uncoated surface of the glass.

Figure 16:
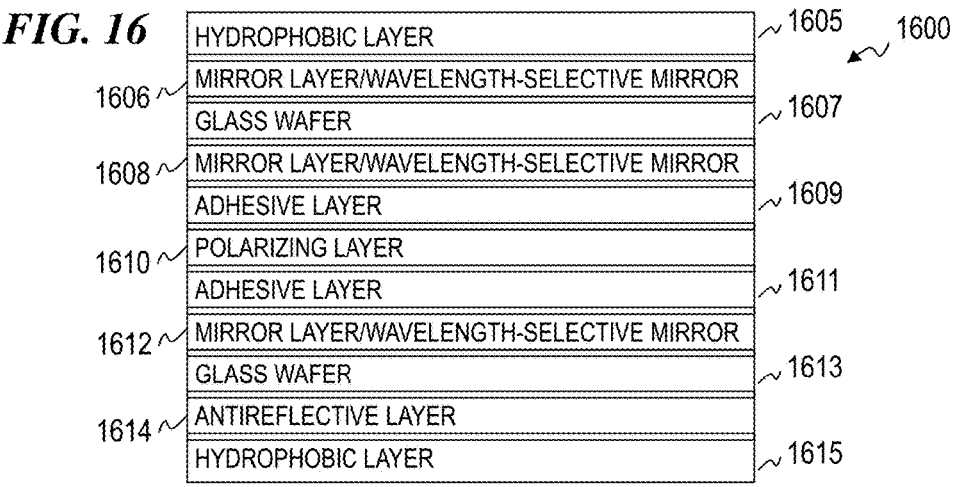
FIG. 16 is a schematic of a lens 1600 having a plurality of layers, some of which are optionally omitted, according to some embodiments of the present invention.

FIG. 16 is a schematic diagram of an ophthalmic spectacle lens 1600, according to some embodiments of the present invention. In FIG. 16, the top hydrophobic layer 1605 represents the front layer of lens 1600, and the bottom hydrophobic layer 1615 represents the back layer of lens 1600. In some embodiments, lens 1600 includes (from front to back): a first hydrophobic layer 1605, a first mirror layer 1606, a first ophthalmic-grade glass wafer 1607, a second mirror layer 1608 (in some embodiments, second mirror layer 1608 and third mirror layer 1612 are alternatives to first mirror layer 1606, so only one or the other is used, or in some embodiments, all mirror layers are omitted), a first adhesive layer 1609, a polarizing layer 1610, a second adhesive layer 1611, a third mirror layer 1612 deposited on a second ophthalmic-grade glass wafer 1613, an anti-reflective layer 1614, and a second hydrophobic layer 1615. In some embodiments, one or more layers of lens 1600 are omitted. In some embodiments, one or more of the mirror layers 1606, 1608, and/or 1612 includes a metal film. In other embodiments, one or more of the mirror layers 1606, 1608, and/or 1612 includes a plurality of dielectric layers such that the mirror layer(s) is/are wavelength-selective. (In some embodiments, using wavelength-selective mirror-reflectors produces undesirable reflections (i.e., for users who do not want mirror-type lenses), so using wavelength selective organic dyes or oxides is preferred to provide the absorbance at 400 nm-430 nm, 500 nm and 580 nm bands. In some embodiments, the 400 nm-430 nm absorbance band has zero or nearly zero transmittance from 400 nm to 420 nm, and a transmittance of 5% luminous or less.) In some embodiments, one or more of glass wafer 1613, adhesive layers 1609 and 1611, and/or polarizing layer 1610 includes transitional metal oxides, rare-earth metal oxides, and/or organic dyes. In various embodiments of the present invention, one or more of the layers shown in FIG. 16 are omitted. In some embodiments, a substitute element (such as a polymer layer substituted for one or more of the glass layers) is used for one or more of the layers shown in FIG. 16. In some embodiments, one or more additional layers (such as additional coatings) are provided. Note that while three mirror or reflective layers are shown as optional, in practice, only one reflective layer is implemented in most embodiments, and the other two reflective layers shown are omitted.

In some embodiments, the present invention provides an assembled lens that has a predetermined or given average visible light transmittance for wavelengths in the range of 400 nm-700 nm (Tv; also called the average transmission for all wavelengths between 400 nm and 700 nm inclusive).

In some embodiments, the transmittance of the lens for wavelengths between 400 nm and 409 nm inclusive is less than or equal to (i.e., no more than) 10% of Tv; the transmittance of the lens for wavelengths between 410 nm and 419 nm inclusive is no more than 15% of Tv, the transmittance of the lens for wavelengths between 420 nm and 429 nm inclusive is no more than 20% of Tv, the transmittance of the lens for wavelengths between 430 nm and 439 nm inclusive is no more than 30% of Tv, and the transmittance of the lens for wavelengths between 440 nm and 449 nm inclusive is no more than 40% of Tv.

Some embodiments of the assembled lens have an average transmittance for wavelengths in the range of 400 nm-420 nm that is less than 1% of the average visible light transmittance of the assembled lens. Some embodiments have an average transmittance for wavelengths in the range of 400 nm-420 nm that is less than 3% of the average visible light transmittance of the assembled lens. Some embodiments have an average transmittance for wavelengths in the range of 400 nm-420 nm that is less than 5% of the average visible light transmittance of the assembled lens.

Some embodiments of the assembled lens have an average transmittance for wavelengths in the range of 420 nm-430 nm that is less than 1% of the average visible light transmittance of the assembled lens. Some embodiments have an average transmittance for wavelengths in the range of 420 nm-430 nm that is less than 5% of the average visible light transmittance of the assembled lens. Some embodiments have an average transmittance for wavelengths in the range of 420 nm-430 nm that is less than 10% of the average visible light transmittance of the assembled lens.

Some embodiments of the assembled lens have an average transmittance for wavelengths in the range of 480 nm-510 nm that is less than 85% but more than 20% of the average visible light transmittance of the assembled lens and that is less than the average transmittance for wavelengths in the range of 450 nm-460 nm. Some embodiments of the assembled lens have an average transmittance for wavelengths in the range of 480 nm-510 nm that is less than 85% but more than 20% of the average visible light transmittance of the assembled lens and that is less than the average transmittance for wavelengths in the range of 440 nm-470 nm. Some embodiments of the assembled lens have an average transmittance for wavelengths in the range of 480 nm-510 nm that is less than 85% of the average visible light transmittance of the assembled lens. Some embodiments of the assembled lens have an average transmittance for wavelengths in the range of 480 nm-510 nm that is less than 75% of the average visible light transmittance of the assembled lens. Some embodiments of the assembled lens have an average transmittance for wavelengths in the range of 480 nm-510 nm that is less than 65% of the average visible light transmittance of the assembled lens. Some embodiments of the assembled lens have an average transmittance for wavelengths in the range of 480 nm-510 nm that is less than 50% of the average visible light transmittance of the assembled lens. Some embodiments of the assembled lens have an average transmittance for wavelengths in the range of 480 nm-510 nm that is less than 40% of the average visible light transmittance of the assembled lens. Some embodiments of the assembled lens have an average transmittance for wavelengths in the range of 480 nm-510 nm that is more than 20% of the average visible light transmittance of the assembled lens. Some embodiments of the assembled lens have an average transmittance for wavelengths in the range of 480 nm-510 nm that is more than 30% of the average visible light transmittance of the assembled lens.

Some embodiments of the assembled lens have an average transmittance for wavelengths in the range of 490 nm-510 nm that is less than 85% but more than 20% of the average visible light transmittance of the assembled lens and that is less than the average transmittance for wavelengths in the range of 450 nm-460 nm. Some embodiments of the assembled lens have an average transmittance for wavelengths in the range of 490 nm-510 nm that is less than 85% but more than 20% of the average visible light transmittance of the assembled lens and that is less than the average transmittance for wavelengths in the range of 440 nm-470 nm. Some embodiments of the assembled lens have an average transmittance for wavelengths in the range of 490 nm-510 nm that is less than 85% of the average visible light transmittance of the assembled lens. Some embodiments of the assembled lens have an average transmittance for wavelengths in the range of 490 nm-510 nm that is less than 75% of the average visible light transmittance of the assembled lens. Some embodiments of the assembled lens have an average transmittance for wavelengths in the range of 490 nm-510 nm that is less than 65% of the average visible light transmittance of the assembled lens. Some embodiments of the assembled lens have an average transmittance for wavelengths in the range of 490 nm-510 nm that is less than 50% of the average visible light transmittance of the assembled lens. Some embodiments of the assembled lens have an average transmittance for wavelengths in the range of 490 nm-510 nm that is less than 40% of the average visible light transmittance of the assembled lens. Some embodiments of the assembled lens have an average transmittance for wavelengths in the range of 490 nm-510 nm that is more than 20% of the average visible light transmittance of the assembled lens. Some embodiments of the assembled lens have an average transmittance for wavelengths in the range of 490 nm-510 nm that is more than 30% of the average visible light transmittance of the assembled lens.

Some embodiments of the assembled lens have an average transmittance for wavelengths in the range of 490 nm-500 nm that is less than 85% but more than 20% of the average visible light transmittance of the assembled lens and that is less than the average transmittance for wavelengths in the range of 450 nm-460 nm. Some embodiments of the assembled lens have an average transmittance for wavelengths in the range of 490 nm-500 nm that is less than 85% but more than 20% of the average visible light transmittance of the assembled lens and that is less than the average transmittance for wavelengths in the range of 440 nm-470 nm. Some embodiments of the assembled lens have an average transmittance for wavelengths in the range of 490 nm-500 nm that is less than 85% of the average visible light transmittance of the assembled lens. Some embodiments of the assembled lens have an average transmittance for wavelengths in the range of 490 nm-500 nm that is less than 75% of the average visible light transmittance of the assembled lens. Some embodiments of the assembled lens have an average transmittance for wavelengths in the range of 490 nm-500 nm that is less than 65% of the average visible light transmittance of the assembled lens. Some embodiments of the assembled lens have an average transmittance for wavelengths in the range of 490 nm-500 nm that is less than 50% of the average visible light transmittance of the assembled lens. Some embodiments of the assembled lens have an average transmittance for wavelengths in the range of 490 nm-500 nm that is less than 40% of the average visible light transmittance of the assembled lens. Some embodiments of the assembled lens have an average transmittance for wavelengths in the range of 490 nm-500 nm that is more than 20% of the average visible light transmittance of the assembled lens. Some embodiments of the assembled lens have an average transmittance for wavelengths in the range of 490 nm-500 nm that is more than 30% of the average visible light transmittance of the assembled lens.

Some embodiments of the assembled lens have an average transmittance for wavelengths in the range of 570 nm-590 nm that is less than 85% but more than 20% of the average visible light transmittance of the assembled lens and that is less than the average transmittance for wavelengths in the range of 540 nm-560 nm. Some embodiments of the assembled lens have an average transmittance for wavelengths in the range of 570 nm-590 nm that is less than 85% but more than 20% of the average visible light transmittance of the assembled lens and that is less than the average transmittance for wavelengths in the range of 520 nm-560 nm. Some embodiments of the assembled lens have an average transmittance for wavelengths in the range of 570 nm-590 nm that is less than 85% of the average visible light transmittance of the assembled lens. Some embodiments of the assembled lens have an average transmittance for wavelengths in the range of 570 nm-590 nm that is less than 75% of the average visible light transmittance of the assembled lens. Some embodiments of the assembled lens have an average transmittance for wavelengths in the range of 570 nm-590 nm that is less than 65% of the average visible light transmittance of the assembled lens. Some embodiments of the assembled lens have an average transmittance for wavelengths in the range of 570 nm-590 nm that is less than 50% of the average visible light transmittance of the assembled lens. Some embodiments of the assembled lens have an average transmittance for wavelengths in the range of 570 nm-590 nm that is less than 40% of the average visible light transmittance of the assembled lens. Some embodiments of the assembled lens have an average transmittance for wavelengths in the range of 570 nm-590 nm that is more than 20% of the average visible light transmittance of the assembled lens. Some embodiments of the assembled lens have an average transmittance for wavelengths in the range of 570 nm-590 nm that is more than 30% of the average visible light transmittance of the assembled lens.

Some embodiments of the assembled lens have an average transmittance for wavelengths in the range of 580 nm-590 nm that is less than 85% but more than 20% of the average visible light transmittance of the assembled lens and that is less than the average transmittance for wavelengths in the range of 540 nm-560 nm. Some embodiments of the assembled lens have an average transmittance for wavelengths in the range of 580 nm-590 nm that is less than 85% but more than 20% of the average visible light transmittance of the assembled lens and that is less than the average transmittance for wavelengths in the range of 520 nm-560 nm. Some embodiments of the assembled lens have an average transmittance for wavelengths in the range of 580 nm-590 nm that is less than 85% of the average visible light transmittance of the assembled lens. Some embodiments of the assembled lens have an average transmittance for wavelengths in the range of 580 nm-590 nm that is less than 75% of the average visible light transmittance of the assembled lens. Some embodiments of the assembled lens have an average transmittance for wavelengths in the range of 580 nm-590 nm that is less than 65% of the average visible light transmittance of the assembled lens. Some embodiments of the assembled lens have an average transmittance for wavelengths in the range of 580 nm-590 nm that is less than 50% of the average visible light transmittance of the assembled lens. Some embodiments of the assembled lens have an average transmittance for wavelengths in the range of 580 nm-590 nm that is less than 40% of the average visible light transmittance of the assembled lens. Some embodiments of the assembled lens have an average transmittance for wavelengths in the range of 580 nm-590 nm that is more than 20% of the average visible light transmittance of the assembled lens. Some embodiments of the assembled lens have an average transmittance for wavelengths in the range of 580 nm-590 nm that is more than 30% of the average visible light transmittance of the assembled lens.

Regarding infrared (IR) blocking, some embodiments of the assembled lens have an average transmittance for wavelengths in the range of 700 nm-780 nm that is less than 20% of the average visible light transmittance of the assembled lens. Some embodiments of the assembled lens have an average transmittance for wavelengths in the range of 700 nm-780 nm that is less than 10% of the average visible light transmittance of the assembled lens. Some embodiments of the assembled lens have an average transmittance for wavelengths in the range of 700 nm-780 nm that is less than 5% of the average visible light transmittance of the assembled lens. Some embodiments of the assembled lens have an average transmittance for wavelengths in the range of 700 nm-780 nm that is less than 2% of the average visible light transmittance of the assembled lens. Some embodiments of the assembled lens have an average transmittance for wavelengths in the range of 700 nm-780 nm that is less than 1% of the average visible light transmittance of the assembled lens. On the other hand, some embodiments of the assembled lens have an average transmittance for wavelengths in the range of 700 nm-780 nm that is less than 300% of the average visible light transmittance of the assembled lens. Some embodiments of the assembled lens have an average transmittance for wavelengths in the range of 700 nm-780 nm that is less than 200% of the average visible light transmittance of the assembled lens. Some embodiments of the assembled lens have an average transmittance for wavelengths in the range of 700 nm-780 nm that is less than 150% of the average visible light transmittance of the assembled lens. Some embodiments of the assembled lens have an average transmittance for wavelengths in the range of 700 nm-780 nm that is less than 100% of the average visible light transmittance of the assembled lens. Some embodiments of the assembled lens have an average transmittance for wavelengths in the range of 700 nm-780 nm that is less than 50% of the average visible light transmittance of the assembled lens.

Further regarding infrared (IR) blocking, some embodiments of the assembled lens have an average transmittance for wavelengths in the range of 700 nm-750 nm that is less than 20% of the average visible light transmittance of the assembled lens. Some embodiments of the assembled lens have an average transmittance for wavelengths in the range of 700 nm-750 nm that is less than 10% of the average visible light transmittance of the assembled lens. Some embodiments of the assembled lens have an average transmittance for wavelengths in the range of 700 nm-750 nm that is less than 5% of the average visible light transmittance of the assembled lens. Some embodiments of the assembled lens have an average transmittance for wavelengths in the range of 700 nm-750 nm that is less than 2% of the average visible light transmittance of the assembled lens. Some embodiments of the assembled lens have an average transmittance for wavelengths in the range of 700 nm-750 nm that is less than 1% of the average visible light transmittance of the assembled lens. On the other hand, some embodiments of the assembled lens have an average transmittance for wavelengths in the range of 700 nm-750 nm that is less than 300% of the average visible light transmittance of the assembled lens. Some embodiments of the assembled lens have an average transmittance for wavelengths in the range of 700 nm-750 nm that is less than 200% of the average visible light transmittance of the assembled lens. Some embodiments of the assembled lens have an average transmittance for wavelengths in the range of 700 nm-750 nm that is less than 150% of the average visible light transmittance of the assembled lens. Some embodiments of the assembled lens have an average transmittance for wavelengths in the range of 700 nm-750 nm that is less than 100% of the average visible light transmittance of the assembled lens. Some embodiments of the assembled lens have an average transmittance for wavelengths in the range of 700 nm-750 nm that is less than 50% of the average visible light transmittance of the assembled lens.

Further regarding infrared (IR) blocking, some embodiments of the assembled lens have an average transmittance for wavelengths in the range of 730 nm-780 nm that is less than 20% of the average visible light transmittance of the assembled lens. Some embodiments of the assembled lens have an average transmittance for wavelengths in the range of 730 nm-780 nm that is less than 10% of the average visible light transmittance of the assembled lens. Some embodiments of the assembled lens have an average transmittance for wavelengths in the range of 730 nm-780 nm that is less than 5% of the average visible light transmittance of the assembled lens. Some embodiments of the assembled lens have an average transmittance for wavelengths in the range of 730 nm-780 nm that is less than 2% of the average visible light transmittance of the assembled lens. Some embodiments of the assembled lens have an average transmittance for wavelengths in the range of 730 nm-780 nm that is less than 1% of the average visible light transmittance of the assembled lens. On the other hand, some embodiments of the assembled lens have an average transmittance for wavelengths in the range of 730 nm-780 nm that is less than 300% of the average visible light transmittance of the assembled lens. Some embodiments of the assembled lens have an average transmittance for wavelengths in the range of 730 nm-780 nm that is less than 200% of the average visible light transmittance of the assembled lens. Some embodiments of the assembled lens have an average transmittance for wavelengths in the range of 730 nm-780 nm that is less than 150% of the average visible light transmittance of the assembled lens. Some embodiments of the assembled lens have an average transmittance for wavelengths in the range of 730 nm-780 nm that is less than 100% of the average visible light transmittance of the assembled lens. Some embodiments of the assembled lens have an average transmittance for wavelengths in the range of 730 nm-780 nm that is less than 50% of the average visible light transmittance of the assembled lens.

Regarding ultraviolet (UV) blocking, some embodiments of the assembled lens have an average transmittance for wavelengths in the range of 300 nm-400 nm that is less than 20% of the average visible light transmittance of the assembled lens. Some embodiments of the assembled lens have an average transmittance for wavelengths in the range of 300 nm-400 nm that is less than 10% of the average visible light transmittance of the assembled lens. Some embodiments of the assembled lens have an average transmittance for wavelengths in the range of 300 nm-400 nm that is less than 5% of the average visible light transmittance of the assembled lens. Some embodiments of the assembled lens have an average transmittance for wavelengths in the range of 300 nm-400 nm that is less than 2% of the average visible light transmittance of the assembled lens. Some embodiments of the assembled lens have an average transmittance for wavelengths in the range of 300 nm-400 nm that is less than 1% of the average visible light transmittance of the assembled lens.

Further regarding ultraviolet (UV) blocking, some embodiments of the assembled lens have an average transmittance for wavelengths in the range of 350 nm-400 nm that is less than 20% of the average visible light transmittance of the assembled lens. Some embodiments of the assembled lens have an average transmittance for wavelengths in the range of 350 nm-400 nm that is less than 10% of the average visible light transmittance of the assembled lens. Some embodiments of the assembled lens have an average transmittance for wavelengths in the range of 350 nm-400 nm that is less than 5% of the average visible light transmittance of the assembled lens. Some embodiments of the assembled lens have an average transmittance for wavelengths in the range of 350 nm-400 nm that is less than 2% of the average visible light transmittance of the assembled lens. Some embodiments of the assembled lens have an average transmittance for wavelengths in the range of 350 nm-400 nm that is less than 1% of the average visible light transmittance of the assembled lens.

In some embodiments, the present invention provides an ophthalmic color-enhancing lens that provides transmittance properties which blocks UV light and some visible light, enhances blue colors, and provides greater contrast between blue green and green red wavelengths. Some embodiments include a lens assembly that has: a first zone, a second zone, a third zone, a fourth zone, a fifth zone, a sixth zone, a seventh zone and an eighth zone, wherein (a.) the first zone is a reduced-light-transmittance zone having a range of wavelengths that extends from 300 nm to 399 nm, inclusive, so that the value of the light transmission at any one "point" (e.g., wherein the point has a wavelength range of plus or minus 5 nm from a first-zone wavelength) in the first zone is less than 1% of the luminous transmission of the assembled lens system; wherein (b.) the second zone is a reduced-light-transmittance zone found between 400 nm-409 nm so that the value of the light transmission at any one point (e.g., wherein the point has a wavelength range of plus or minus 2 nm from a wavelength between 400 nm-409 nm) is less than 5% of the luminous transmission of the assembled lens system; wherein (c.) the third zone is a minimum-light-transmittance zone found between 410 nm-430 nm so that the value of the light transmission at any one point (e.g., wherein the point has a wavelength range of plus or minus 2 nm from a wavelength between 410 nm-430 nm) is less than 10% of the luminous transmission of the assembled lens system; wherein (d.) the lens system provides at least three higher-transmittance zones including the fourth zone having wavelengths in the range of 440 nm to 460 nm, the fifth zone having wavelengths in the range of 540 nm to 560 nm, and the sixth zone having wavelengths in the range of 600 nm to 630 nm, with each of the higher-transmittance zones having at least one wavelength that has a transmittance of 75% to 150% of the luminous transmission of the assembled lens system, and wherein (e.) the lens system provides at least two reduced-transmittance zones having wavelengths between the three higher-transmittance zones, and specifically including the seventh zone having wavelengths in the range of 485 nm to 510 nm and the eighth zone having wavelengths in the range of 570 nm to 590 nm and wherein the seventh zone and the eighth zone each has at least one wavelength within their respective wavelength ranges that has a light transmittance of between 20% and 90% of the luminous transmission of the assembled lens system.

In some embodiments, the ophthalmic color-enhancing lens includes an organic dye, a copper oxide, a titanium oxide, and a neodymium oxide.

In some embodiments, the ophthalmic color-enhancing lens includes an organic dye, a copper halide, a titanium oxide, and a neodymium oxide.

In some embodiments, the ophthalmic color-enhancing lens includes at least one light absorber selected from the group consisting of a copper halide, a copper oxide, a copper indium compound, a titanium dioxide, a neodymium oxide, praseodymium, an erbium oxide and an organic dye.

In some embodiments, the ophthalmic color-enhancing lens includes at least two light absorbers selected from the group consisting of a copper halide, a copper oxide, a copper indium compound, a titanium dioxide, a neodymium oxide, praseodymium, an erbium oxide and an organic dye.

In some embodiments, the ophthalmic color-enhancing lens includes at least three light absorbers selected from the group consisting of a copper halide, a copper oxide, a copper indium compound, a titanium dioxide, a neodymium oxide, praseodymium, an erbium oxide and an organic dye.

In some embodiments, the ophthalmic color-enhancing lens includes an organic dye and at least one element selected from the group consisting of copper, indium, titanium, neodymium, praseodymium, erbium and a halide.

In some embodiments, the ophthalmic color-enhancing lens includes an organic dye and at least one oxide selected from the group consisting of copper oxide, indium oxide, titanium oxide, neodymium oxide, praseodymium oxide, and erbium oxide.

In some embodiments, the ophthalmic color-enhancing lens includes an organic dye and at least two oxides selected from the group consisting of copper oxide, indium oxide, titanium oxide, neodymium oxide, praseodymium oxide, and erbium oxide.

In some embodiments, the ophthalmic color-enhancing lens includes an organic dye and at least three oxides selected from the group consisting of copper oxide, indium oxide, titanium oxide, neodymium oxide, praseodymium oxide, and erbium oxide.

In some embodiments, the ophthalmic color-enhancing lens includes an organic dye and at least four oxides selected from the group consisting of copper oxide, indium oxide, titanium oxide, neodymium oxide, praseodymium oxide, and erbium oxide.

In some embodiments, the ophthalmic color-enhancing lens includes at least two light absorbers selected from the group consisting of copper oxide, indium oxide, titanium oxide, neodymium oxide, praseodymium oxide, erbium oxide, and an organic dye.

In some embodiments, the ophthalmic color-enhancing lens includes at least three light absorbers selected from the group consisting of copper oxide, indium oxide, titanium oxide, neodymium oxide, praseodymium oxide, erbium oxide, and an organic dye.

In some embodiments, the ophthalmic color-enhancing lens is made using a two-wafer system with each wafer being about 1 mm in thickness and wherein the rear wafer contains wavelength-selective light-absorbing oxides, and wherein the two wafers are adhered together with a light-polarizing filter in between.

In some embodiments, the ophthalmic color-enhancing lens is made using a two-wafer system, wherein the two wafers are adhered together using an adhesive with a light-polarizing filter in between.

In some embodiments, the ophthalmic color-enhancing lens is made using a two-wafer system, wherein the two wafers are adhered together without an adhesive but with a light-polarizing filter in between. In some such embodiments, the two wafers are heat-fused to the two opposite faces of the polarizing filter. In some such embodiments, the heat fusing is done in a vacuum.

In some embodiments, the ophthalmic color-enhancing lens is made using a two-wafer system with each wafer being about 1 mm in thickness and the preferred wavelength-selective absorbing material embodiment containing oxides is positioned as the front wafer adhered together with a light polarizing filter in between.

In some embodiments, the two glass wafers are adhered together with a polarizing filter in between and all wavelength-selective absorbing material embodiments are included in either the adhesive or light polarizing filter.

In some embodiments, the wavelength-selective absorbing materials are included in the one of the glass wafers and in the adhesive or light polarizing layer.

In some embodiments, the ophthalmic color-enhancing lens includes a minimum light transmittance zone found between 430 nm-450 nm so that the value of the light transmission at any one point is less than 10% of the luminous transmission of the assembled lens system.

In some embodiments, the ophthalmic color-enhancing lens includes additional organic dyes to increase attenuation from 700 nm to 780 nm so that a minimum light transmittance zone found between 700 nm-780 nm has a value of the light transmittance at any one point that is not greater than 300% of the luminous transmittance of the assembled lens system. In some embodiments, the ophthalmic color-enhancing lens has a minimum light transmittance zone found between 700 nm-780 nm has a value of the light transmittance at any one point that is not greater than 200% of the luminous transmittance of the assembled lens system. In some embodiments, the ophthalmic color-enhancing lens has a minimum light transmittance zone found between 700 nm-780 nm has a value of the light transmittance at any one point that is not greater than 150% of the luminous transmittance of the assembled lens system. In some embodiments, the ophthalmic color-enhancing lens has a minimum light transmittance zone found between 700 nm-780 nm has a value of the light transmittance at any one point that is not greater than 100% of the luminous transmittance of the assembled lens system.

In some embodiments, the ophthalmic color-enhancing lens includes a mirror coating on either the convex or concave surface.

In some embodiments, the ophthalmic color-enhancing lens has the concave surface of the rear wafer having an anti-reflection coating.

In some embodiments, the ophthalmic color-enhancing lens adheres to all spectral requirements as found in ANSI Z80.3-2009 and ISO 12312-1 2013.

In some embodiments, the ophthalmic color-enhancing lens includes photochromic properties in the front wafer.

In some embodiments, the rear wafer is thicker in order to accommodate prescription surfacing.

In some embodiments, the spectral absorbents are selected from the group consisting of class dopants, plastic additives, dyes, stains, heat treatments, exposure to ultraviolet light, chemical baths, semi-transparent mirror coatings, and semi-transparent color coatings.

In some embodiments, the lens is an ophthalmic plastic lens.

In some embodiments, the spectral absorbents are selected from a list including but not limited to narrowband absorbing dyes, sharp-cut absorbing dyes, and optical-interference coatings.

Some embodiments include a light polarizing filter.
Some embodiments include a mirror coating.
Some embodiments include wavelength-selective multilayer-dielectric reflective coating.

Some embodiments include wavelength-selective multilayer-dielectric reflective coating for only one of four wavelength-absorption bands, and include an organic dye.

Some embodiments include an anti-reflection coating.

In some embodiments, the rear portion of the lens is thicker to allow for prescription surfacing.

In some embodiments, the rear wafer of the two-wafer lens is thicker than the front wafer to allow for prescription surfacing.

In some embodiments, the present invention provides an ophthalmic color-enhancing lens that provides transmittance properties which blocks UV light and some visible light, enhances blue colors, and provides enhanced perceived contrast between blue light and green light and provides enhanced perceived contrast between green light and red light, wherein, when assembled, the lens has a luminous transmission value that is defined by ANSI Z80.3-2009 4.6.3.2, the lens including: one or more color-absorbing materials that together provide: a first reduced-light-transmittance zone for a first range of wavelengths that extends from 300 nm to 399 nm, wherein light transmission at any wavelength in the first range is no more than 1% of the luminous transmission of the lens; a second reduced-light-transmittance zone for a second range of wavelengths that extends from 400 nm to 409 nm, wherein light transmission at any wavelength in the second range is no more than 5% of the luminous transmission of the lens; a third reduced-light-transmittance zone for a third range of wavelengths that extends from 410 nm to 430 nm, wherein light transmission at any wavelength in the third range is no more than 10% of the luminous transmission of the lens; and a plurality of light-transmittance zones for respective wavelength ranges of 440 to 460 nm, 540 to 560 nm, 600 to 630 nm with each said maximum transmittance zone having at least one wavelength that is 75% to 150%, inclusive, of the luminous transmission of the lens contrast-enhancing-light-transmittance zones coordinately found between the three maximum transmittance zones and specifically found in the wavelength ranges of 480 nm to 510 nm and 570 nm to 590 nm and each contrast-enhancing-light-transmittance zone having at least one wavelength having a light-transmittance value between 20% and 90%, inclusive, of the luminous transmission of the lens.

An ophthalmic color-enhancing lens that provides transmittance properties which blocks UV light and some visible light, enhances blue colors, and provides enhanced perceived contrast between blue light and green light and provides enhanced perceived contrast between green light and red light, wherein, when assembled, the lens has a luminous transmission value that is defined by ANSI Z80.3-2009 4.6.3.2, the lens including: one or more color-absorbing materials that together provide: a first reduced-light-transmittance zone for a first range of wavelengths that extends from 300 nm to 399 nm, wherein light transmission at any wavelength in the first range is no more than 1% of the luminous transmission of the lens; a second reduced-light-transmittance zone for a second range of wavelengths that extends from 400 nm to 409 nm, wherein light transmission at any wavelength in the second range is no more than 10% of the luminous transmission of the lens; a third reduced-light-transmittance zone for a third range of wavelengths that extends from 410 nm to 420 nm, wherein light transmission at any wavelength in the third range is no more than 15% of the luminous transmission of the lens; and a fourth reduced-light-transmittance zone for a fourth range of wavelengths that extends from 420 nm to 430 nm, wherein light transmission at any wavelength in the third range is no more than 20% of the luminous transmission of the lens; and a plurality of light-transmittance zones for respective wavelength ranges of 440 to 460 nm, 540 to 560 nm, 600 to 630 nm with each said maximum transmittance zone having at least one wavelength that is 40% to 150%, inclusive, of the luminous transmission of the lens contrast-enhancing-light-transmittance zones coordinately found between the three maximum transmittance zones and specifically found in the wavelength ranges of 480 nm to 510 nm and 570 nm to 590 nm and each contrast-enhancing-light-transmittance zone having at least one wavelength having a light-transmittance value between 20% and 90%, inclusive, of the luminous transmission of the lens.

In some embodiments, the assembled lens comprises all of or part of and not limited to copper halide, copper indium, and titanium dioxide, neodymium oxide, praseodymium, erbium oxide and organic dyes.

In some embodiments, the assembled lens is made using a two-wafer system including a front glass wafer and a rear glass wafer with each wafer being about 1 mm in thickness and the glass wafer containing wavelength-selective light-absorbing oxides is positioned as the rear wafer adhered together with a light polarizing filter in between.

In some embodiments, the assembled lens is made using a two-wafer system with each wafer being about 1 mm in thickness and the preferred embodiment containing oxides is positioned as the front wafer adhered together with a light polarizing filter in between.

In some embodiments, the assembled lens includes two glass wafers that are adhered together with a polarizing filter in between and all embodiments are included in either the adhesive or light polarizing filter.

In some embodiments, the wavelength-selective light-absorbing materials are included in the one of the glass wafers and in the adhesive or light polarizing layer.

In some embodiments, a minimum light transmittance zone is created between 430 nm-450 nm so that the value of the light transmission at any one point is less than 10% of the luminous transmission of the assembled lens system.

Some embodiments further include additional organic dyes to increase attenuation from 700 nm to 780 nm so that a minimum light transmittance zone found between 700 nm-780 nm has a value of the light transmittance at any one point that is not greater than 300% of the luminous transmittance of the assembled lens system.

Some embodiments further include a mirror coating on either the convex or concave surface or both.

In some embodiments, the concave surface of the rear wafer has an anti-reflection coating.

In some embodiments, the lens is adhesiveless (i.e., made without the use of adhesive within or between layers of the lens) but includes a polycarbonate polymer, and the wavelength blocking in the violet absorbance band, the cyan partial-absorbance band and the yellow absorbance band is provided only by at least one organic dye (i.e., wherein the lens has no adhesive layers and has substantially no wavelength-blocking rare-earth oxides).

In some embodiments, the lens is made such that it meets all spectral requirements as found in ANSI Z80.3-2009 and ISO 12312-1 2013.

In some embodiments, the front wafer is photochromic. In some embodiments, the rear wafer is thicker than the front wafer in order to accommodate prescription surfacing.

In some embodiments, said spectral characteristics are created by using materials selected from the group consisting of class dopants, plastic additives, dyes, stains, heat treatments, exposure to ultraviolet light, chemical baths, semi-transparent mirror coatings, and semi-transparent color coatings.

In some embodiments, the lens is an ophthalmic plastic lens. In some such embodiments, the wavelength-selective light-absorbing materials are selected from a list including but not limited to narrowband absorbing dyes, sharp cut absorbing dyes, and optical interference coatings. Some such embodiments further include a light polarizing filter. Some such embodiments further include a mirror coating. Some such embodiments further include anti-reflection coatings. In some such embodiments, the rear portion of the lens is thicker to allow for prescription surfacing.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first, " "second," and "third," etc., are used merely as labels, and are not intended to impose numerical requirements on their objects.

What is claimed is:

1. An ophthalmic color-enhancing lens that provides transmittance properties which blocks UV light and some visible light, enhances blue colors, and provides enhanced perceived contrast between blue light and green light and provides enhanced perceived contrast between green light and red light, wherein, when assembled, the lens has a luminous transmission value that is defined by ANSI Z80.3-2009 4.6.3.2, the lens comprising:

one or more color-absorbing materials that together provide:

a first reduced-light-transmittance zone for a first range of wavelengths that extends from 300 nm to 399 nm, wherein light transmission at any wavelength in the first range is no more than 1% of the luminous transmission of the lens;

a second reduced-light-transmittance zone for a second range of wavelengths that extends from 400 nm to 409 nm, wherein light transmission at any wavelength in the second range is no more than 10% of the luminous transmission of the lens;

a third reduced-light-transmittance zone for a third range of wavelengths that extends from 410 nm to 420 nm, wherein light transmission at any wavelength in the third range is no more than 15% of the luminous transmission of the lens; and a fourth reduced-light-transmittance zone for a fourth range of wavelengths that extends from 420 nm to 430 nm, wherein light transmission at any wavelength in the fourth range is no more than 20% of the luminous transmission of the lens; and a plurality of maximum-light-transmittance zones including three maximum-light-transmittance zones, one for each respective wavelength ranges of 440 to 460 nm, 540 to 560 nm, and 600 to 630 nm, with each said maximum-transmittance-zone having at least one wavelength that is 40% to 150%, inclusive, of the luminous transmission of the lens, and two contrast-enhancing-light-transmittance zones coordinately found between the three maximum-transmittance-zones and specifically found in the wavelength ranges of 480 nm to 510 nm and 570 nm to 590 nm, wherein each contrast-enhancing-light-transmittance zone has at least one wavelength having a light-transmittance value between 20% and 90%, inclusive, of the luminous transmission of the lens.

2. The lens according to claim 1, wherein the assembled lens includes at least one light absorber selected from the group consisting of copper halide, copper indium, titanium dioxide, neodymium oxide, praseodymium, erbium oxide, and organic dyes.

3. The lens of claim 1, wherein the assembled lens is made using a two-wafer system including a front glass wafer and a rear glass wafer with each wafer being about 1 mm in thickness, wherein the one or more color-absorbing materials include wavelength-selective light-absorbing oxides in the rear wafer, wherein the front glass wafer and the rear glass wafer are adhered together with a light polarizing filter in between the front glass wafer and the rear glass wafer.

4. The lens of claim 1, wherein the assembled lens is made using a two-wafer system including a front wafer and a rear wafer with each wafer being about 1 mm in thickness, wherein the one or more color-absorbing materials include wavelength-selective light-absorbing oxides in the front wafer, wherein the front wafer and the rear wafer are adhered together with a light polarizing filter in between the front wafer and the rear wafer.

5. The lens of claim 1, wherein the assembled lens includes two glass wafers that are adhered together using an adhesive with a light polarizing filter in between the two glass wafers, wherein the one or more color-absorbing materials are included in at least one selected from the group consisting of the adhesive and the light polarizing filter.

6. The lens of claim 1, wherein the assembled lens includes two glass wafers that are adhered together using an adhesive with a light polarizing layer in between the two glass wafers, and wherein the one or more color-absorbing materials are included in at least one selected from the group consisting of one of the glass wafers, the adhesive, and the light polarizing layer.

7. The lens of claim 1, wherein the lens includes a fifth reduced-light-transmittance zone that extends from 430 nm to 450 nm such that a value of the light transmission at any wavelength in the fifth reduced-light-transmittance zone is less than 10% of the luminous transmission value of the assembled lens system.

8. The lens of claim 1, wherein the lens includes additional organic dyes to increase attenuation from 700 nm to 780 nm such that a reduced infrared light transmittance zone that extends from 700 nm to 780 nm has a value of the light transmission at any wavelength in the reduced infrared light transmittance zone that is not greater than 300% of the luminous transmission value of the assembled lens system.

9. The lens of claim 1, wherein the assembled lens includes two wafers including a front wafer and a rear wafer, wherein the front wafer includes a mirror coating.

10. The lens of claim 1, wherein the assembled lens includes two wafers including a front wafer and a rear wafer, wherein the rear wafer includes a concave surface that has an anti-reflection coating.

11. The lens of claim 1, wherein the lens meets all spectral requirements found in ANSI Z80.3-2009 and ISO 12312-1 2013.

12. The lens of claim 1, wherein the transmittance properties are created by using at least one material selected from the group consisting of class dopants, plastic additives, dyes, stains, a material that changes on exposure to heat, a material that changes on exposure to ultraviolet light, a material that changes on exposure to chemical baths, a material that forms a semi-transparent mirror coating, and a material that forms a semi-transparent color coating.

13. The lens of claim 1, wherein the lens is an ophthalmic plastic lens.

14. The lens of claim 13, wherein the one or more color-absorbing materials includes at least one selected from the group consisting of narrowband absorbing dyes, sharp cut absorbing dyes, and optical-interference coatings.

15. The lens of claim 13, wherein the lens includes a light polarizing filter.

16. The lens of claim 1, wherein the lens includes a front glass wafer, a rear glass lens and an adhesive, located between the front lens and the rear lens, that adheres the front lens to the rear lens and that contains the one or more color-absorbing materials.

17. The lens of claim 1, wherein the lens includes a front glass wafer, a rear glass lens and an adhesive, located between the front lens and the rear lens, that adheres the front lens to the rear lens and that contains the one or more color-absorbing materials, and wherein the lens is polarizing.

18. The lens of claim 1, wherein the lens is adhesiveless but includes a polymer and at least one organic dye, wherein the lens has no adhesive layers and has substantially no rare-earth oxides.

19. The lens of claim 18, wherein the polymer includes a polycarbonate.

20. The lens of claim 18, wherein the polymer includes a polyurethane.

* * * * *